(12) United States Patent
Takenaka et al.

(10) Patent No.: US 8,428,788 B2
(45) Date of Patent: Apr. 23, 2013

(54) INVERTED PENDULUM TYPE MOVING BODY

(75) Inventors: Toru Takenaka, Wako (JP); Shinichiro Kobashi, Wako (JP); Taiji Koyama, Wako (JP); Hideharu Izumi, Wako (JP); Kazuya Kuwabara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 341 days.

(21) Appl. No.: 12/884,635

(22) Filed: Sep. 17, 2010

(65) Prior Publication Data

US 2011/0071752 A1 Mar. 24, 2011

(30) Foreign Application Priority Data

Sep. 18, 2009 (JP) ................ P2009-217925

(51) Int. Cl.
*G06F 19/00* (2006.01)
(52) U.S. Cl.
USPC .............................................. 701/1; 701/124
(58) Field of Classification Search .................. 701/124, 701/1; 212/272–275, 282–284
See application file for complete search history.

(56) References Cited

U.S. PATENT DOCUMENTS

| 3,757,899 | A | * | 9/1973 | Smith, Jr. ...................... 187/224 |
| 5,713,477 | A | * | 2/1998 | Wallace, Jr. et al. .......... 212/270 |
| 5,909,817 | A | * | 6/1999 | Wallace, Jr. et al. .......... 212/275 |
| 2010/0038960 | A1 | | 2/2010 | Takenaka et al. |
| 2010/0096905 | A1 | | 4/2010 | Takenaka et al. |

FOREIGN PATENT DOCUMENTS

| JP | 4-201793 | | 7/1992 |
| JP | 3070015 | B2 | 7/2000 |
| WO | 2008-132778 | A1 | 11/2008 |
| WO | 2008-132779 | A1 | 11/2008 |

* cited by examiner

*Primary Examiner* — Yonel Beaulieu
(74) *Attorney, Agent, or Firm* — Carrier Blackman & Associates, P.C.; Joseph P. Carrier; William D. Blackman

(57) ABSTRACT

An inverted pendulum type moving body moving over a floor surface in a self standing manner, the inverted pendulum type moving body comprising: an information acquisition unit obtaining a state information indicating a current state of an another moving body; and a movement control unit controlling a movement of a self moving body, based on the state information, so that a state of the self moving body with respect to the current state of the another moving body satisfies a predetermined condition established so that the self moving body and the another moving body moves in alignment.

8 Claims, 21 Drawing Sheets

HOWEVER,
$Ki\_x = (1-Kr\_x) \cdot Ki\_a\_x + Kr\_x \cdot Ki\_b\_x$
$Ki\_y = (1-Kr\_y) \cdot Ki\_a\_y + Kr\_y \cdot Ki\_b\_y$
$(i=1, 2, 3, \cdots, 5)$

INVERTED PENDULUM TYPE MOVING BODY

The present application claims priority on Japanese Patent Application No. 2009-217925, filed Sep. 18, 2009, the content of which is incorporated herein by reference.

BACKGROUND OF THE INVENTION

1. Field of the Invention

The present invention relates to an inverted pendulum type moving body, which can move in all directions (i.e., all directions in two dimensional space) on a floor surface. In particular, the present invention relates to an inverted pendulum type moving body which is movable in alignment with another moving body.

2. Description of the Related Art

An omnidirectional vehicle (an inverted pendulum type moving body) which can move in all directions (i.e., all directions in two dimensional space) on a floor surface has been suggested by the applicant, for example, in PCT International Publication No. WO 08/132,778 (hereinafter referred to as "Patent Document 1") and in PCT International Publication No. WO 08/132,779 (hereinafter referred to as "Patent Document 2"). According to the omnidirectional vehicle described in Patent Documents 1 and 2, a drive unit, which can move in all directions on a floor surface while contacting the floor surface and is spherically shaped, wheel shaped, or a crawler shaped, and an actuator comprising an electric motor and the like driving the drive unit are assembled to a base body of a vehicle. This vehicle moves over the floor surface by driving the drive unit with an actuator.

Further, a technology controlling a moving operation of this type of omnidirectional vehicle is suggested by the applicant, for example, in Japanese Patent No. 3070015 (hereinafter referred to as "Patent Document 3"). According to this technology, a base body of a vehicle is provided on a spherical drive unit so that the base body can freely tilt in a fore-and-aft and lateral directions. Further, by measuring the tilt angle of the base body, and by controlling the torque of an electric motor driving the drive unit so that this tilt angle is maintained to be a predetermined angle, the vehicle is moved according to tilting movement of the base body.

When a movement control of the omnidirectional vehicle seen in Patent Documents 1, 2, and 3 is performed, it is desirable to link the movements of a plurality of moving vehicles. It is also desirable to make a movement of a vehicle depend on a movement of another vehicle. For example, when an inverted pendulum type omnidirectional vehicle is used for a walking assisting device such as a crutch, the user will have to put his or her weight on two omnidirectional vehicles placed at both sides of the user, and will have to maneuver the two omnidirectional vehicles at the same time in alignment to one another. However, practically speaking, such use has been difficult.

SUMMARY OF THE INVENTION

The present invention is made considering the problems described above. Accordingly, an object of the present invention is to provide an inverted pendulum type moving body which is movable in alignment with another moving body.

(1) Namely, an inverted pendulum type moving body according to an aspect of the present invention moves over a floor surface in a self standing manner and comprises: an information acquisition unit obtaining a state information indicating a current state of an another moving body; and a movement control unit controlling a movement of a self moving body, based on the state information, so that a state of the self moving body with respect to the current state of the another moving body satisfies a predetermined condition established so that the self moving body and the another moving body moves in alignment.

According to this configuration, the movement of the self moving body is controlled so that a state of the self moving body with respect to a current state of another moving body satisfies a predetermined condition. As a result, the self moving body may be moved in alignment with another moving body following a predetermined condition. Therefore, a plurality of inverted pendulum type moving body may be moved in alignment with each other.

(2) In addition, the inverted pendulum type moving body may be configured as follows: the inverted pendulum type moving body further comprises an external force detection unit detecting an external force in a horizontal direction acting on a base body of the self moving body. Here, the movement control unit executes a feedback control of the self moving body so that the self moving body moves in a direction so as to reduce an external force detected by the external force detection unit.

According to this configuration, the self moving body is moved so as to reduce an external force detected by an external force detection unit. Therefore, it is possible to determine the direction in which the self moving body is moved according to the direction of the external force.

(3) In addition, the inverted pendulum type moving body may be configured as follows: the inverted pendulum type moving body further comprises a load detection unit detecting a load in a perpendicular direction acting on a body of the self moving body. Here, the movement control unit reduces the gain coefficient of the feedback control with respect to an increase in a load detected by the load detection unit.

According to this configuration, the gain of the feedback control is reduced in response to an increase in the load. Therefore, in a situation in which a load is applied to the base body of the self moving body, a change of the movement of the self moving body, with respect to the change in the external force being applied to the base body, is restricted. Therefore, in a situation in which the load exists, it is possible to make the movement of the self moving body in a quiet manner.

(4) In addition, the inverted pendulum type moving body may be configured as follows: the information acquisition unit obtains, as the state information, a position information representing a distance between the self moving body and the another moving body. Furthermore, the movement control unit controls a movement of the self moving body so that the distance between the self moving body and the another moving body converges to a predetermined target value provided as the predetermined condition.

According to this configuration, the movement of the self moving body is controlled so that the distance between the self moving body and another moving body converges to a predetermined target value which is provided as a predetermined condition. Therefore, it is possible to maintain a constant distance between the self moving body and another moving body. Therefore, the self moving body may move in alignment with another moving body while maintaining a constant distance between the self moving body and another moving body.

(5) In addition, the inverted pendulum type moving body may be configured as follows: the information acquisition unit obtains, as the state information, a posture information indicating a posture of the another moving body. Furthermore, the movement control unit controls a movement of the self moving body so that a posture of the self moving body and a posture of the another moving body are maintained at a posture provided as the predetermined condition.

According to this configuration, the movement of the self moving body is controlled so that a posture of each of the self moving body and another moving body satisfies a predetermined relation provided as a predetermined condition. As a result, the posture of each of the self moving body and another moving body becomes a posture which is set as a predetermined condition. Therefore, the self moving body may be moved in alignment with another moving body so that the posture of the self moving body is aligned with the posture of another moving body.

(6) In addition, the inverted pendulum type moving body may be configured as follows: the predetermined condition is established so that a tilt angle of the self moving body and a tilt angle of the another moving body are equal. According to this configuration, it is possible to maintain the self moving body and another moving body in a parallel manner.

(7) In addition, the inverted pendulum type moving body may be configured as follows: the predetermined condition is established so that a difference between a tilt angle of the self moving body and a tilt angle of the another moving body are equal to a predetermined value. According to this configuration, the state of the self moving vehicle and another moving vehicle may be maintained so that they are tilting in a direction different from one another.

(8) In addition, the inverted pendulum type moving body may be configured as follows: the predetermined condition is established so that a tilt angle of the self moving body is equal to a predetermined value. According to this configuration, the tilt angle of the self moving body and another moving body may each be maintained at their respective target tilt angles.

According to the inverted pendulum type moving body described in (1) above, the movement of the self moving body is controlled so that a state of the self moving body with respect to a current state of another moving body satisfies a predetermined condition. As a result, the self moving body may be moved in alignment with another moving body following a predetermined condition.

According to the inverted pendulum type moving body described in (2) above, the self moving body is moved so as to reduce an external force detected by an external force detection unit. Therefore, it is possible to determine the direction in which the self moving body is moved according to the direction of the external force.

According to the inverted pendulum type moving body described in (3) above, the gain of the feedback control is reduced in response to an increase in the load. Therefore, in a situation in which the load exists, it is possible to make the movement of the self moving body in a quiet manner.

According to the inverted pendulum type moving body described in (4) above, the movement of the self moving body is controlled so that the distance between the self moving body and another moving body converges to a predetermined target value which is provided as a predetermined condition. Therefore, the self moving body may move in alignment with another moving body while maintaining a constant distance between the self moving body and another moving body.

According to the inverted pendulum type moving body described in (5) above, the movement of the self moving body is controlled so that a posture of each of the self moving body and another moving body satisfies a predetermined relation provided as a predetermined condition. Therefore, the self moving body may be moved in alignment with another moving body so that the posture of the self moving body is aligned with the posture of another moving body.

According to the inverted pendulum type moving body described in (6) above, matching the tilt angle of the moving body is set as a predetermined condition. As a result, it is possible to maintain the self moving body and another moving body in a parallel manner. Thus, it is possible to match the postures of each moving body.

According to the inverted pendulum type moving body described in (7) above, a difference of the tilt angle of the self moving body being equal to a predetermined value is set to be a predetermined condition. Therefore, the state of the self moving vehicle and another moving vehicle may be maintained so that they are tilting in a direction different from one another.

According to the inverted pendulum type moving body described in (8) above, the tilt angle of the self moving body being equal to a predetermined value is set to be a predetermined condition. Therefore, the tilt angle of each moving body may each be maintained at their respective target tilt angles.

BRIEF DESCRIPTION OF THE DRAWINGS

FIG. 15 is a flowchart showing a subroutine of a processing in step S23 shown in

FIG. 14.

DETAILED DESCRIPTION OF THE PREFERRED EMBODIMENTS

An inverted pendulum type moving body according to an embodiment of the present invention is based upon a technology relating to a movement control for an omnidirectional vehicle. The inverted pendulum type moving body according to the present embodiment further comprises, as characterizing components, a configuration for allowing a moving body to move in alignment with another moving body. In other words, the inverted pendulum type moving body according to the present embodiment comprises a configuration relating to a basic movement control for an omnidirectional vehicle, and also comprises a configuration for moving in alignment with another moving body.

Therefore, in the following description of the present embodiment, the section entitled "1. Technology On Which An Inverted Pendulum Type Moving Body Is Based (Omnidirectional Vehicle)" provides an explanation of a seating type omnidirectional vehicle, which pertains to technology on which a pendulum type moving body is based. Next, the section entitled "2. Technology For Motion In Alignment" describes a technology concerning a motion in alignment. This technology is one of the characteristics of the inverted pendulum type moving body according to the present embodiment. In this section, an example is given in which the inverted pendulum type moving body is applied to a walking assistance device such as a crutch.

1. Technology on which an Inverted Pendulum Type Moving Body is Based (Omnidirectional Vehicle)

Hereunder, a configuration of an omnidirectional vehicle is described with reference to FIGS. 1-6. The inverted pendulum type moving body according to the present embodiment is based on the technology described in this section.

Figure 1:
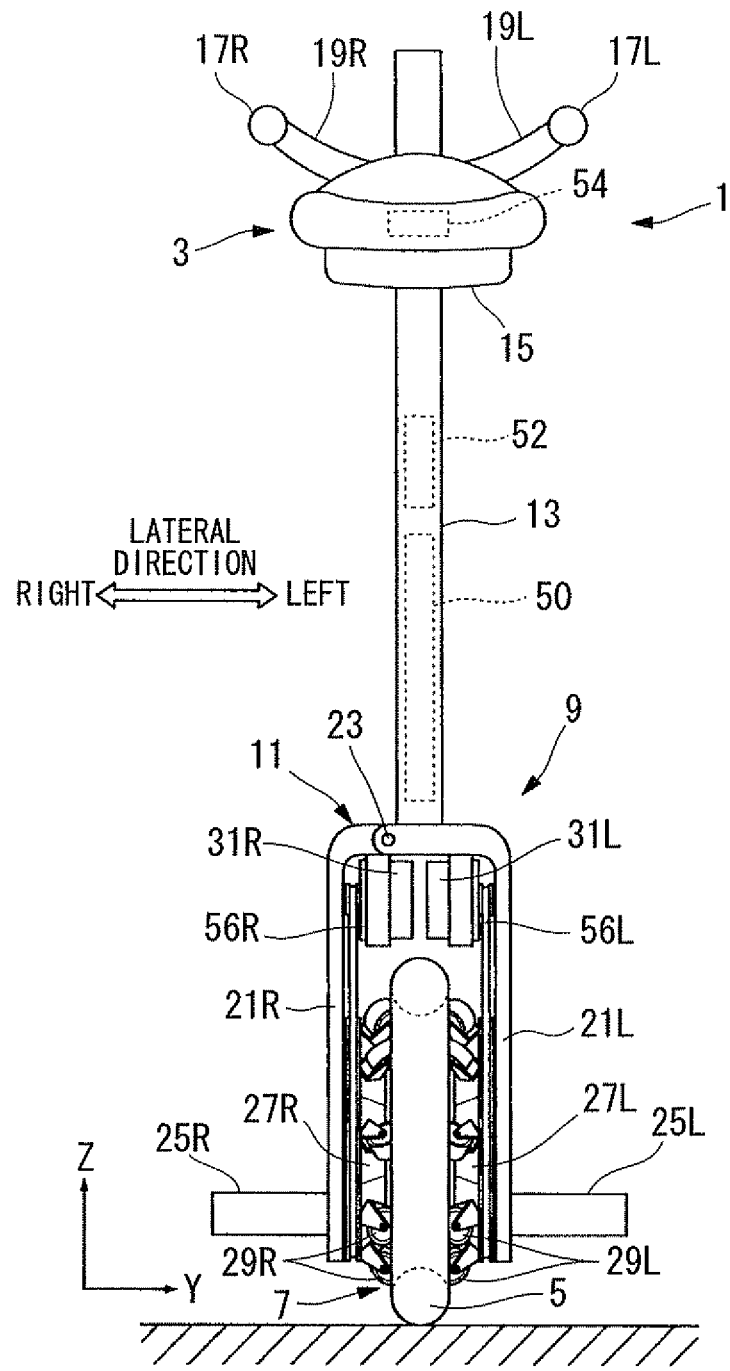
FIG. 1 is a frontal view of an omnidirectional vehicle according to an embodiment of the present invention.
Figure 2:
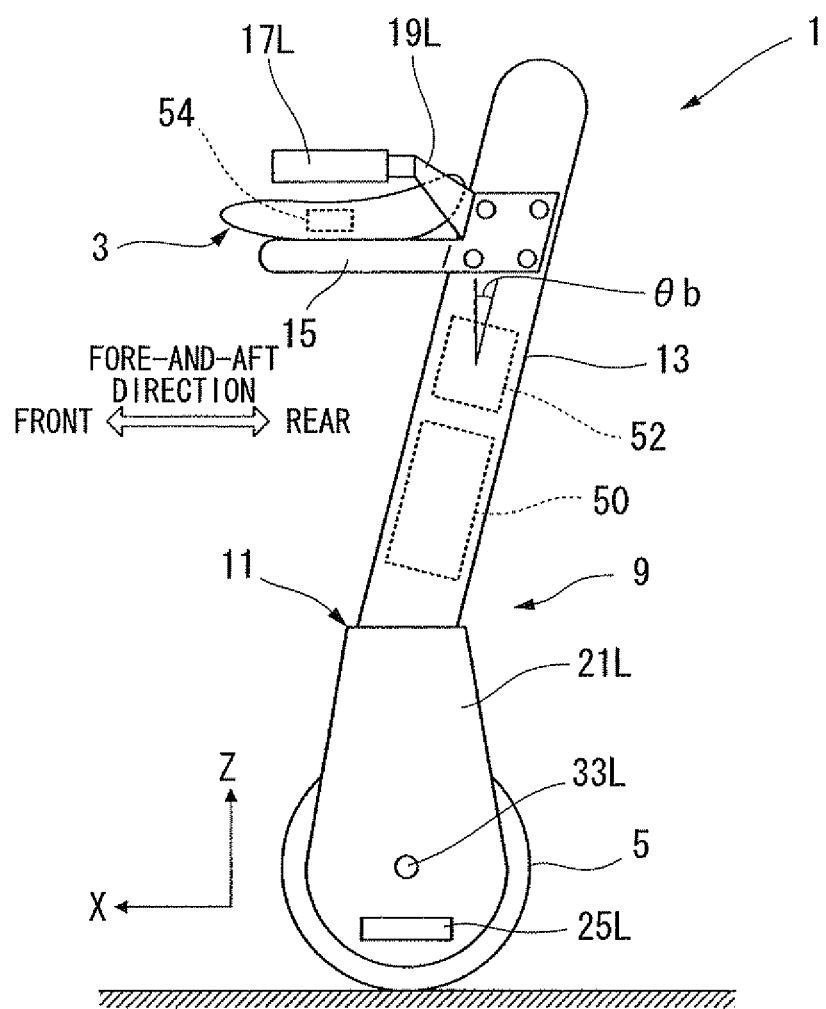
FIG. 2 is a side view of an omnidirectional vehicle according to an embodiment of the present invention.

As shown in FIGS. 1 and 2, the omnidirectional vehicle 1 (hereinafter may also be referred to as an inverted pendulum type moving body) according to the present embodiment comprises a payload supporting part 3 of an occupant, who may also be a driver, a drive unit 5, which can move in all directions (i.e., all directions in two dimensional space including the fore-and-aft direction and a lateral direction) on a floor surface while contacting the floor surface, an actuator 7 which supplies to the drive unit 5, a power for driving the drive unit 5, and a base body 9 assembled with the payload supporting part 3, the drive unit 5, and the actuator 7.

Here, in the description regarding the present embodiment, the "fore-and-aft direction" and the "lateral direction" respectively refer to a direction which is equal to or approximately matches the fore-and-aft direction and the lateral direction of an upper body of an occupant riding in a standard posture in the payload supporting part 3. Incidentally, a "standard posture" refers to a posture which can be estimated based on a configuration of the payload supporting part 3. This "standard posture" is such that the axis of the upper body of the occupant is aligned roughly in an upper-lower direction. Further, the upper body of the occupant is not twisted and the like.

Here, in FIG. 1, the "fore-and-aft direction" and the "lateral direction" respectively refer to a direction perpendicular to the paper and a lateral direction of the paper. In FIG. 2, the "fore-and-aft direction" and the "lateral direction" respectively refer to a lateral direction of the paper and a direction perpendicular to the paper. Further in the description regarding the present embodiment, a suffix "R" or a suffix "L" are appended to a reference numeral. The suffix "R" is used to refer to a component or a concept corresponding to a right side of the vehicle 1. The suffix "L" is used to refer to a component or a concept corresponding to a left side of the vehicle 1.

The base body 9 comprises a lower part frame 11, which is assembled to the drive unit 5 and the actuating unit 7, and a supporting frame 13, which is provided to extend upwards from an upper end of the lower part frame 11.

A seat frame 15 is fixed to an upper part of the supporting frame 13. The seat frame 15 protrudes towards the front from the supporting frame 13. In addition, a seat 3 is provided on the seat frame 15. An occupant sits on the seat 3. According to the present embodiment, this seat 3 is the riding unit of the occupant. Therefore, the omnidirectional vehicle 1 (hereinafter may also be referred simply as a "vehicle 1") according to the present embodiment moves over a floor surface while the occupant is seated on the seat 3.

In addition, a grip 17R and a grip 17L are placed on the left and right portions of the seat 3. The occupant seated on the seat 3 holds on to the grips 17R, or 17L, if necessary. Each of these grips 17R, 17L fixed respectively on a tip part of a bracket 19R, and a bracket 19L, which extend from the supporting frame 13 (or the seat frame 15).

The lower part frame 11 comprises a pair of cover members 21R and 21L. Each of the cover members 21R and 21L are placed to face one another in a two-pronged form while being separated in a lateral direction. The upper part of these cover members 21R and 21L (i.e., a branching portion of the two-pronged form) are connected via a hinge shaft 23 comprising a shaft center in the fore-and-aft direction. One of the cover members 21R and 21L can move around the hinge shaft 23 relative to the other one of the cover members. In this case, the cover members 21R and 21L are biased towards a direction by a spring (not diagramed) in a direction in which that the lower end portion of the cover members 21R and 21L (i.e., a tip portion of the two-pronged form) narrows towards one another.

Further, a step 25R at an external surface portion of each of the cover members 21R and 21L, a step 25R, on which the right foot of the occupant seated on the seat 3 is placed, and a step 25L, on which the left foot of the occupant is placed, are provided so as to protrude respectively towards the right and the left directions.

The drive unit 5 and the actuator 7 are placed between the cover members 21R, 21L of the lower part frame 11. A configuration of the drive unit 5 and the actuator 7 are described with reference to FIGS. 3-6.

According to the present embodiment, the drive unit 5 is a wheel assembly being a ring-shaped component comprising a rubber elastic material. The cross section of the drive unit 5 is approximately a circle. This drive unit 5 (hereinafter may also be referred to as a wheel assembly 5) can rotate around a center C1 of the circular cross section as indicated in arrow Y1 in FIGS. 5 and 6 due to the elastic deformation of the wheel assembly 5. In particular, the wheel assembly 5 rotates around a circumferential line which passes through the center C1 of the circular cross section and becomes concentric with the shaft core of the wheel assembly 5.

This wheel assembly 5 is placed between the cover members 21R and 21L while the shaft center C2 (a shaft center C perpendicular to the diameter direction of the wheel assembly 5 in general) faces the lateral direction. In addition, the wheel assembly 5 contacts the floor surface with the lower end part of the outer peripheral surface of the wheel assembly 5.

Figure 5:
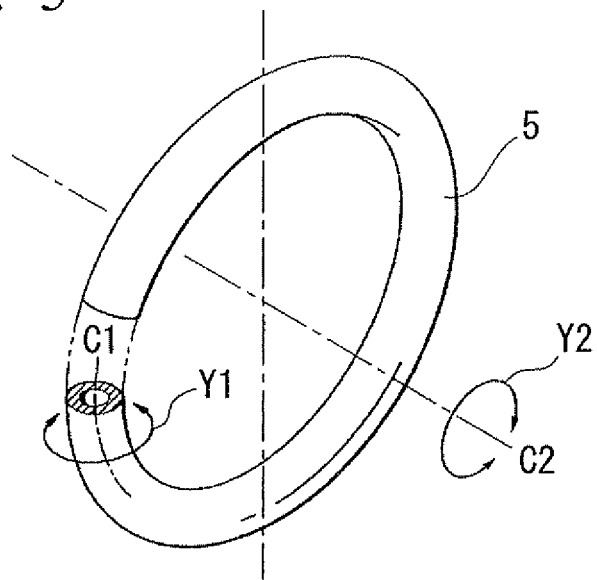
FIG. 5 is a perspective view of a drive unit (wheel assembly) of an omnidirectional vehicle according to an embodiment of the present invention.

Further, the wheel assembly 5 may perform a movement rotating around the shaft center C2 of the wheel assembly 5 as indicated in arrow Y2 in FIG. 5 (a movement rolling around the floor surface), and a movement rotating around the shaft center C1 of the cross section of the wheel assembly 5. As a result, the wheel assembly 5 may move in all directions on the floor surface by a combination of these rotating movements.

The actuator 7 comprises a free roller 29R and a rotating part 27R, provided between the wheel assembly 5 and the right cover member 21R, a free roller 29L and a rotating part 27L, provided between the wheel assembly 5 and the left cover member 21L, an electric motor 31R placed as an actuator above the rotating part 27R and the free roller 29R, and an electric motor 31L placed as an actuator above the rotating part 27L and the free roller 29L.

A housing of each of the electric motors 31R and 31L is attached respectively to the cover member 21R and 21L. Although not diagrammed, the power source (capacitor) of the electric motors 31R, 31L is provided on appropriate places on the base body 9 such as on the supporting frame 13 and the like.

The rotational member 27R is rotatably supported by the cover member 21R via the supporting axis 33R comprising a shaft center in the lateral direction. Similarly, the rotational member 27L is rotatably supported by the cover member 21L via the supporting axis 33L comprising a shaft center in the lateral direction. In this case, rotational shaft center of the rotational member 27R (the shaft center of the supporting axis 33R) and a rotational shaft center of the rotational member 27L (the shaft center of the supporting axis 33L) are coaxial.

Figure 3:
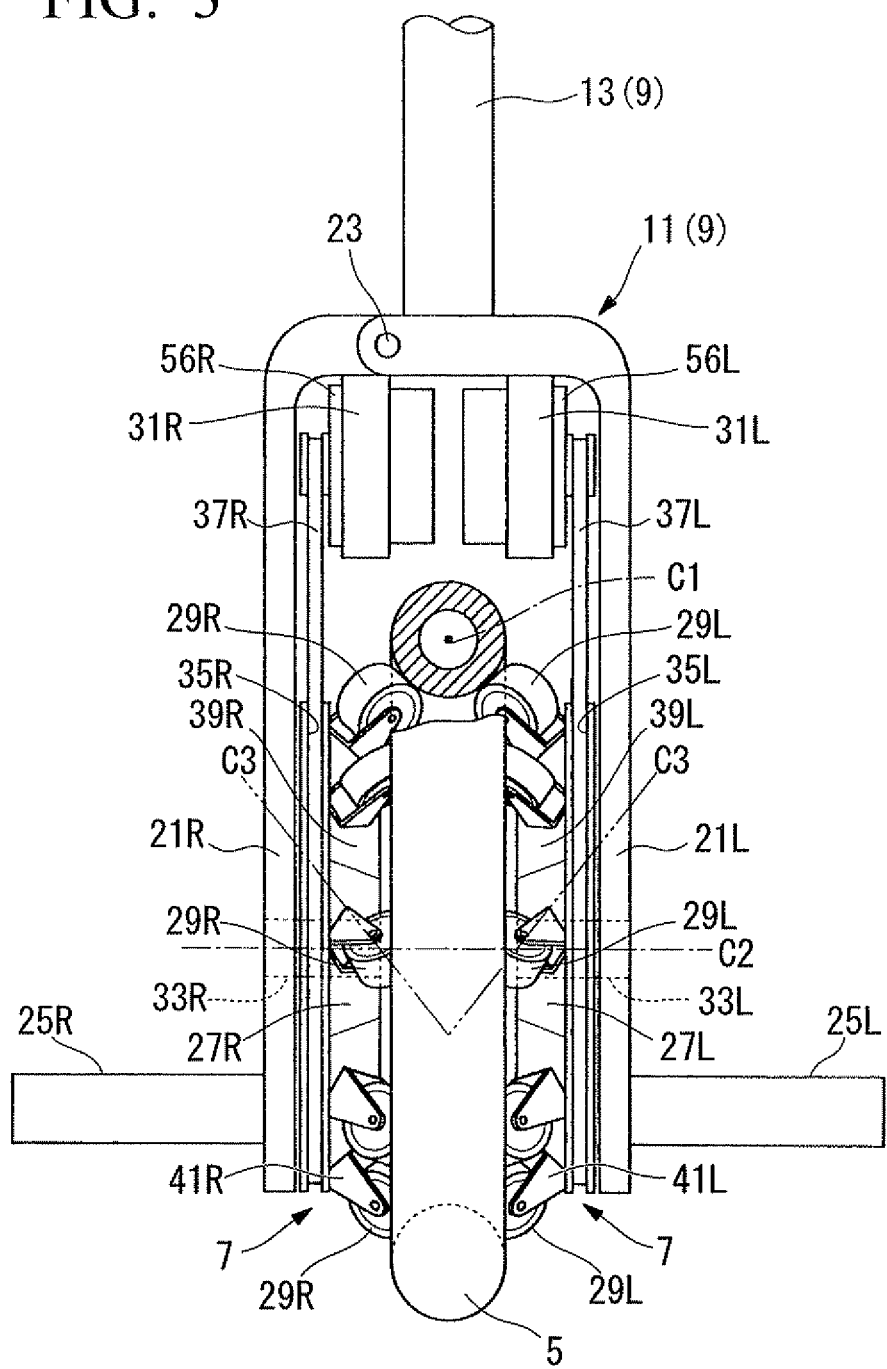
FIG. 3 is an expanded view of a lower portion of an omnidirectional vehicle according to an embodiment of the present invention.
Figure 4:
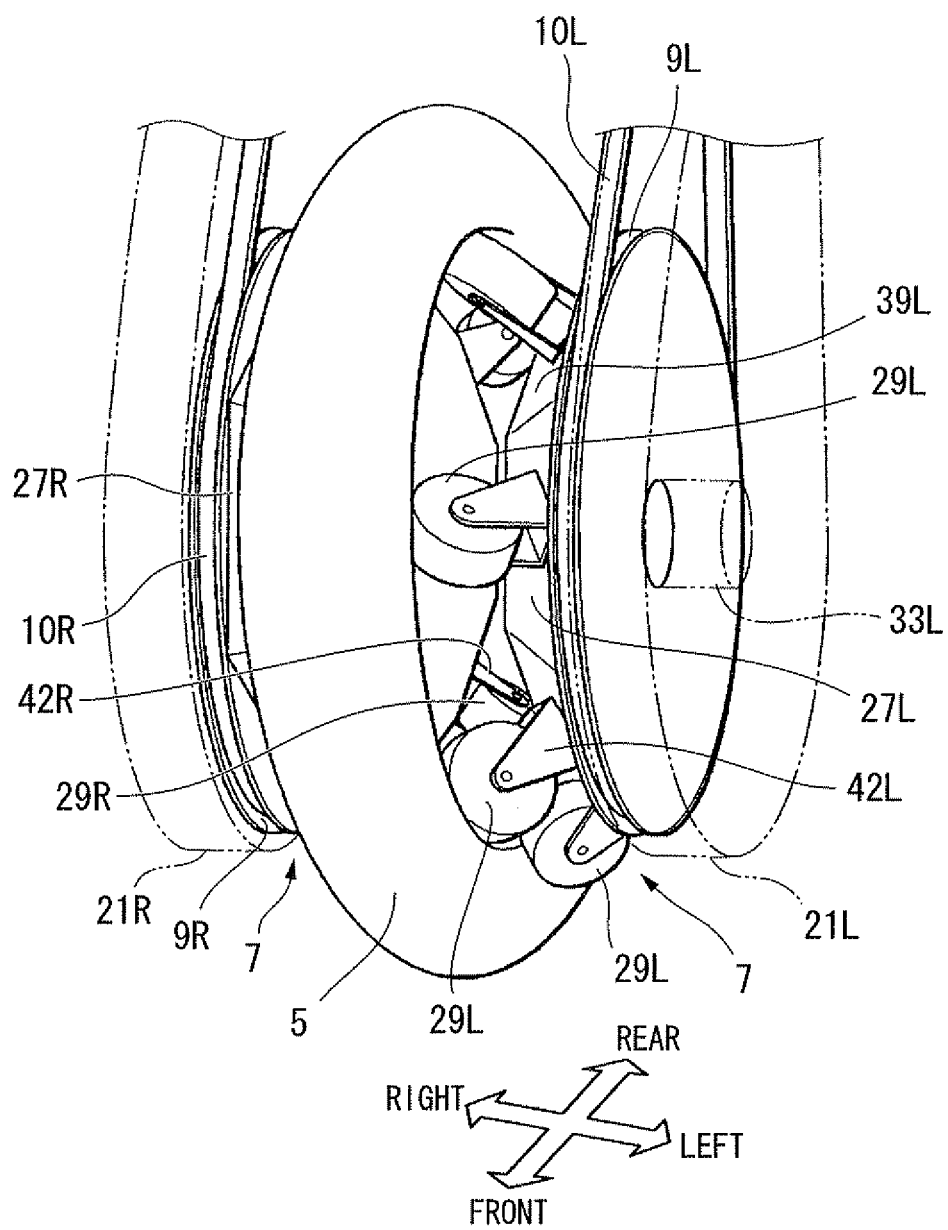
FIG. 4 is a perspective view of a lower portion of an omnidirectional vehicle according to an embodiment of the present invention.

The rotational members 27R, 27L are connected respectively to the output axis of the electric motors 31R, 31L via a power transmission mechanism comprising a decelerating mechanism. The rotational members 27R, 27L are rotated by a power (torque) transmitted by each of the electric motors 31R, 31L. Examples of the power transmission mechanism includes a pulley-type/belt-type device. In other words, as shown in FIG. 3, the rotational member 27R is connected to the output axis of the electric motor 31R via the pulley 35R and the belt 37R. Similarly, the rotational member 27L is connected to the output axis of the electric motor 31L via the pulley 35L and the belt 37L.

Further, the power transmission mechanism may, for example, be a device comprising a sprocket and a linking chain, or, a device comprising a plurality of gears. Further, for instance, the electric motors 31R and 31L may be placed so as to face the rotational members 27R and 27L respectively, so that the output axis of each of the electric motors 31R and 31L is coaxial with the rotational members 27R and 27L respectively. In addition, the output axis of each of the electric motors 31R, 31L may be connected to the rotational members 27R, 27L respectively, via a decelerating device such as a planetary gear drive and the like.

Each of the rotational members 27R and 27L are configured to be the same shape as a circular cone, the diameter of which decreases towards the side of the wheel assembly 5.

The outer peripheral surface of the rotational members 27R and 27L are the tapered outer peripheral surfaces 39R and 39L respectively.

A plurality of free rollers 29R are aligned around the tapered outer peripheral surface 39R of the rotational member 27R. Here, the plurality of free rollers 29R are aligned at equal intervals along the circumference of a circle which is coaxial with the rotational member 27R. Further, these free rollers 29R are attached respectively to the tapered outer peripheral surface 39R via the bracket 41R. Moreover, the free rollers 29R are rotatably supported by the bracket 41R.

Similarly, a plurality of free rollers 29L are aligned around the tapered outer peripheral surface 39L of the rotational member 27L. Here, the plurality of free rollers 29L are aligned at equal intervals along the circumference of a circle which is coaxial with the rotational member 27L. Further, these free rollers 29L are attached respectively to the tapered outer peripheral surface 39L via the bracket 41L. Moreover, the free rollers 29L are rotatably supported by the bracket 41L. The number of free rollers 29L is equal to the number of free rollers 29R.

The wheel assembly 5 is placed coaxial with the rotational member 27R and 27L so as to be sandwiched between the free roller 29R at the rotational member 27R side and the free roller 29L at the rotational member 27L side.

Figure 6:
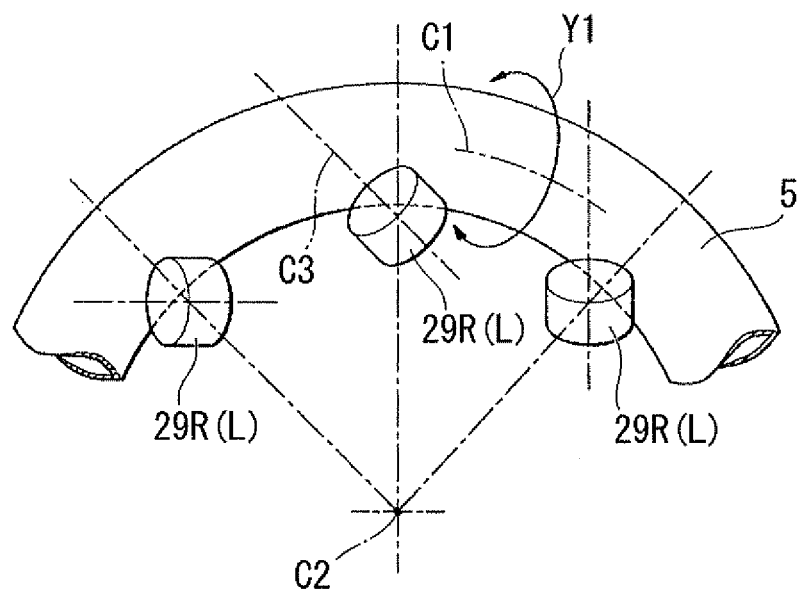
FIG. 6 is a view showing a relative position of a drive unit (wheel assembly) of an omnidirectional vehicle and a free roller according to an embodiment of the present invention.

In this case, as shown in FIGS. 1 and 6, the shaft center C3 of each of the free rollers 29R and 29L is tilted with respect to the shaft center C2 of the wheel assembly 5. At the same time, the shaft center C3 is placed so as to be tilted with respect to the diameter direction of the wheel assembly 5. Here, the "diameter direction" refers to a radial direction connecting the shaft center C2 and each of the free rollers 29R, 29L, viewing the wheel assembly 5 from a direction of the shaft center C2 of the wheel assembly 5. Further, in this position, the outer peripheral surface of each of the free rollers 29R, 29L are pressed against the inner peripheral surface of the wheel assembly 5 in a diagonal direction.

In more general terms, the free roller 29R at the right side is pressed against the inner peripheral surface of the wheel assembly 5 so that, when the rotational member 27R is driven to rotate around the shaft center C2, a frictional force element in a peripheral direction of the shaft center C2, and a frictional force element in a peripheral direction of the center C1 of the cross section of the wheel assembly 5, may be applied to the wheel assembly 5 at a surface at which the free roller 29R contacts the wheel assembly 5. Here, the frictional force element in the peripheral direction of the shaft center C2 refers to a frictional force element in a direction of a tangential line of an inner circumference of the wheel assembly 5. In addition, the frictional force element in a peripheral direction of the center C1 refers to a frictional force element in a direction of a tangential line of a circular cross section of the wheel assembly 5. The free roller 29L at the left side is configured in a similar manner.

As described above, the cover members 21R and 21L are biased towards a direction by a spring (not diagramed) in a direction in which that the lower end portion of the cover members 21R and 21L (i.e., a tip portion of the two-pronged form) narrows towards one another. Due to this biasing force, the wheel assembly 5 is held between the free roller 29R at the right side and the free roller 29L at the left side. At the same time, the condition of the free rollers 29R and 29L being pressed against the wheel assembly 5 is maintained. In particular, the condition in which frictional force may be applied between each of the free rollers 29R, 29L and the wheel assembly 5.

According to the vehicle 1 configured as described above, when the rotational members 27R, 27L are driven to rotate in the same direction at a same velocity by the electric motors 31R and 31L, the wheel assembly 5 rotates around the shaft center C2 in the same direction as the rotational member 27R, 27L. Therefore, the wheel assembly 5 rolls in a fore-and-aft direction on the floor surface. Thus, the entire vehicle 1 moves in a fore-and-aft direction. Incidentally, in this case, the wheel assembly 5 does not rotate around the center C1 of the lateral cross section.

Further, when the rotational members 27R, 27L are driven to rotate in directions opposite to one another and at a same speed, the wheel assembly 5 rotates around the center C1 of the lateral cross section. As a result, the wheel assembly 5 moves in a direction of the shaft center C2 (i.e., the lateral direction). Further, the entire vehicle 1 moves in the lateral direction. In this case, the wheel assembly 5 does not rotate around the shaft center C2.

Further, when the rotational members 27R, 27L are driven in different velocities in the same direction or in opposite directions, the vehicle wheel 5 rotates around the shaft center C2, and, at the same time, rotates round the center C1 of the lateral cross section of the vehicle wheel 5.

At this time, due to the combination of these rotational movements, the wheel assembly 5 moves in a direction tilted with respect to the fore-and-aft direction and a lateral direction. Moreover, the entire vehicle 1 moves in the same direction as the wheel assembly 5. The direction in which the wheel assembly 5 moves in this case varies depending on the difference between a rotational velocity of the rotational members 27R, 27L. Here, the rotational velocity refers to a rotational velocity vector such that the polarity is defined based on the rotational direction.

Since the moving operation of the wheel assembly 5 is conducted as described above, the velocity with which the vehicle 1 moves and the direction in which the vehicle 1 moves may be controlled by controlling the rotational velocity of each of the electrically operated motors 31R and 31L, and by controlling the rotational velocity of the rotational members 27R and 27L.

Next, a configuration for the moving operation of the vehicle 1 according to the present embodiment is described. In the following description, an xyz coordinate system is envisioned comprising the x axis, referring to the horizontal axis in the fore-and-aft direction, the y axis, referring to the horizontal axis in the lateral direction, and the z axis, referring to the orthogonal axis, as shown in FIGS. 1 and 2. The fore-and-aft direction may also be referred to as the x axis direction. The lateral direction may also be referred to as the y axis direction.

First, a moving operation of the vehicle 1 is described below in general terms. According to the present embodiment, when an occupant who sits on the seat 3 tilts his or her upper body, the base body 9 and the seat 3 tilts towards the direction that the occupant's upper body was tilted. In particular, the tilting of the occupant's upper body refers to a displacement of the position of the center-of-gravity point of a combination of the occupant and the vehicle 1 projected on a horizontal plane. Further, at this time, the moving operation of the wheel assembly 5 is controlled so that the vehicle 1 moves in a direction in which the base body 9 is tilted. For example, when the occupant tilts his or her upper body forward, and also tilts the base body 9 and the seat 3 forward, the moving operation of the wheel assembly 5 is controlled so that the vehicle 1 moves forward.

In other words, according to the present embodiment, the motion of the occupant moving his or her upper body and tilting the base body 9 along with the seat 3 is considered to be a basic maneuvering operation with respect to the vehicle 1. This motion is referred to as an operation request of the vehicle 1. According to this maneuvering operation, the moving operation of the wheel assembly 5 is controlled via the actuator 7.

Here, according to the vehicle 1 based on the present embodiment, a surface at which the wheel assembly 5 contacts the floor surface is a surface at which the entire vehicle 1 contacts the floor surface. This surface at which the wheel assembly 5 contacts the floor surface is a single local region and has a small area (i.e., size) compared to a region obtained by projecting the vehicle 1 and the occupant riding the vehicle 1 in their entirety to the floor surface. A floor reaction force applies only on this single local region. Therefore, in order to prevent the base body 9 from tilting and falling down, it is necessary to move the wheel assembly 5 so that the center-of-gravity point of the occupant and the vehicle 1 in their entirety is positioned approximately right above the surface at which the wheel assembly 5 touches the ground.

Therefore, according to the present embodiment, a target position is referred to as a position of the base body 9 under a condition in which the center-of-gravity point of the occupant and the vehicle 1 in their entirety is positioned approximately right above the center point of the wheel assembly 5 (i.e. the center point along the shaft center C2). In more accurate terms, the center-of-gravity point of the occupant and the vehicle 1 in their entirety is positioned approximately right above the surface at which the wheel assembly 5 contacts the ground. The moving operation of the wheel assembly 5 is controlled so that the actual position of the base body 9 converges with the target position.

Further, when the vehicle 1 is started to move forward and the like, and when the vehicle 1 receives a propulsion force due to the actuator 7 along with an additional external force such as a propulsion force provided by the occupant kicking the floor with his or her foot when necessary in order to increase the velocity at which the vehicle 1 moves, the moving operation of the wheel assembly 5 is controlled so that the velocity of the vehicle 1 increases along with the application of the propulsion force and an additional external force. In more precise terms, the moving operation of the wheel assembly is controlled so that the velocity of the center-of-gravity point of the occupant and the vehicle 1 in their entirety increases. Here, the additional external force provided by the occupant is a propulsion force due to the frictional force created by the back side of the occupant's foot and the floor.

Incidentally, in a condition in which the additional external force is not provided as a propulsion force, the moving operation of the wheel assembly 5 is controlled so that the moving velocity of the vehicle 1 is once retained at a certain velocity, the moving velocity of the vehicle 1 then decreases, and the vehicle 1 comes to a halt.

Further, in a condition in which the occupant is not riding the vehicle 1, a target position is referred to as a position of the base body 9 such that the center-of-gravity point of the vehicle 1 in its singular form is positioned approximately right above the center point of the wheel assembly 5 (i.e., the center point of the shaft center C2). In more precise terms, this center-of-gravity point is positioned approximately right above the surface at which the wheel assembly 5 contacts the floor. The moving operation of the wheel assembly 5 is controlled so that the actual posture of the base body 9 converges to the target position, and that the vehicle 1 may stand on its own without the base body 9 tilting.

According to the present embodiment, in order to control the movement of the vehicle 1 as described above, the vehicle 1 comprises a control unit 50, a tilting sensor 52, a load sensor 54, and a rotary encoder 56R, 56L at appropriate places, as indicated in FIGS. 1 and 2. The control unit 50 comprises an electric circuit unit comprising, for example, a micro computer and a drive circuit unit of the electric motor 31R, 31L. The tilting sensor 52 measures a tilt angle θb with respect to an orthogonal direction (gravitational direction) of a predetermined component of the base body 9. The tilting sensor 52 also measures a rate of change of the tilt angle (=dθb/dt). The load sensor 54 detects whether or not an occupant is boarding the vehicle 1. The rotary encoder 56R, 56L acts as an angle sensor to detect a rotational angle and a rotational angular velocity of an output axis of each of the electric motors 31R and 31L.

In this case, the control unit 50 and the tilting sensor 52 are, for example, assembled to the supporting frame 13 in a condition such that the control unit 50 and the tilting sensor 52 are contained inside the supporting frame 13 of the base body 9. In addition, the load sensor 54 is embedded in the seat 3. Further, each of the rotary encoders 56R and 56L are integrated respectively with the electrically motors 31R and 31L. In addition, each of the rotary encoders 56R and 56L may be integrated respectively with the rotating parts 27R and 27L.

In more detail, the tilting sensor 52 comprises a rate sensor (angular velocity sensor) such as an acceleration sensor and a gyro sensor and the like. The tilting sensor 52 outputs the detection signal of these sensors to the control unit 50. In addition, the control unit 50 carries out a predetermined measurement and computation procedure based on an output by the acceleration sensor and the rate sensor of the tilting sensor 52. The predetermined measurement and computation procedure may be a known computation. In this way, the control unit 50 computes a measured value of a tilt angle θb of the component equipped with the tilting sensor 52 with respect to an orthogonal direction and a measured value of a tilting angular velocity θbwdot, which is a rate of change, i.e., a differential of the tilt angle θb. According to the present embodiment, the component equipped with the tilting sensor 52 is the supporting frame 13.

In this case, the measured tilt angle θb (hereinafter, may be referred to as a base body tilt angle θb) each comprises an element $\theta b\_x$ in the y axis rotational direction (the pitch direction) and an element $\theta b\_y$ in the x axis rotational direction (the rolling direction). Similarly, the measured tilting angular velocity θbdot (hereinafter, may be referred to as a base body tilting angular velocity θbdot) also comprises an element $\theta bdot\_x$ ($=d\theta b\_x/dt$) in the y axis rotational direction (the pitch direction) and an element $\theta bdot\_y$ ($=d\theta b\_y/dt$) in the x axis rotational direction (the rolling direction).

Further, in the description of the present embodiment, a variable representing a quantity of a movement condition comprising an element in the x axis direction and in the y axis direction or a direction rotating around each of the axes such as the base body tilt angle θb is used. In addition, a variable representing a coefficient and the like relating to the quantity of a movement condition is used. When each element of these variables are expressed separately, a subscript "_x" or "_y" are appended to the reference numeral indicating these variables.

In this case, for variables concerning a translational movement, such as a translational velocity and the like, a subscript "_x" is appended to an element in the x axis direction, while a subscript "_y" is appended to an element in the y axis direction.

Meanwhile, for variables concerning a rotational movement such as an angle, a rotational velocity, i.e., an angular velocity, and an angular acceleration, a subscript "_x" is appended to an element in the y axis direction, while a subscript "_y" is appended to an element in the x axis direction, as a matter of convenience, in order to make the subscripts consistent with the subscripts of the variables concerning a translational movement.

Furthermore, when a variable is represented as a pair of elements in the x axis direction and in the y axis direction, or as a pair of elements rotating around the y axis and around the x axis, a subscript "_xy" is appended to the reference numeral indicating these variables. For example, when the base body tilt angle θb is represented as a pair of an element $\theta b\_x$ around the y axis and an element $\theta b\_y$ around the x axis, the subscript "_xy" is used as follows: "base body tilt angle $\theta b\_xy$."

The load sensor 54 is embedded in the seat 3 so that, when the occupant sits on the seat 3, the load sensor 54 receives a load due to the weight of the occupant. Thus, the load sensor 54 outputs to the control unit 50, a detection signal according to the load. Further, the control unit 50 determines whether or not the occupant is riding the vehicle 1 based on a measured value of a load represented by an output of this load sensor 54.

By the way, instead of the load sensor 54, a switch type sensor may be used such that the sensor is turned on when the occupant sits on the seat 3.

The rotary encoder 56R generates a pulse signal every time the output axis of the electric motor 31R rotates by a predetermined angle. Thus, the rotary encoder 56R outputs the pulse signal to the control unit 50. Further, the control unit 50 measures the rotational angle of the output axis of the electric motor 53R based on the pulse signal. Further, the control unit 50 measures the temporal rate of change, i.e., the differential of the measured value of the rotational angle as a rotational angular velocity of the electric motor 53R. The rotary encoder 56L at the side of the electric motor 31L is configured in a similar manner as well.

The control unit 50 determines a velocity command, which is a target value of the rotational angular velocity of each of the electric motors 31R and 31L by executing a predetermined computation procedure using the above measured values. The control unit 50 performs a feedback control of the rotational angular velocity of each of the electric motors 31R and 31L according to the velocity command.

Further, the relation between the rotational velocity of the output axis of the electric motor 31R and the rotational velocity of the rotating part 27R is a proportional relation according to a certain value of a deceleration ratio between the output axis and the rotational member 27R. In the description of the present embodiment, the rotational angular velocity of the electric motor 31R refers to a rotational angular velocity of the rotational member 27R. Similarly, the rotational angular velocity of the electric motor 31L refers to a rotational angular velocity of the rotational member 27L.

Hereinafter, a controlling process of the control unit 50 is further described in detail.

Figure 7:
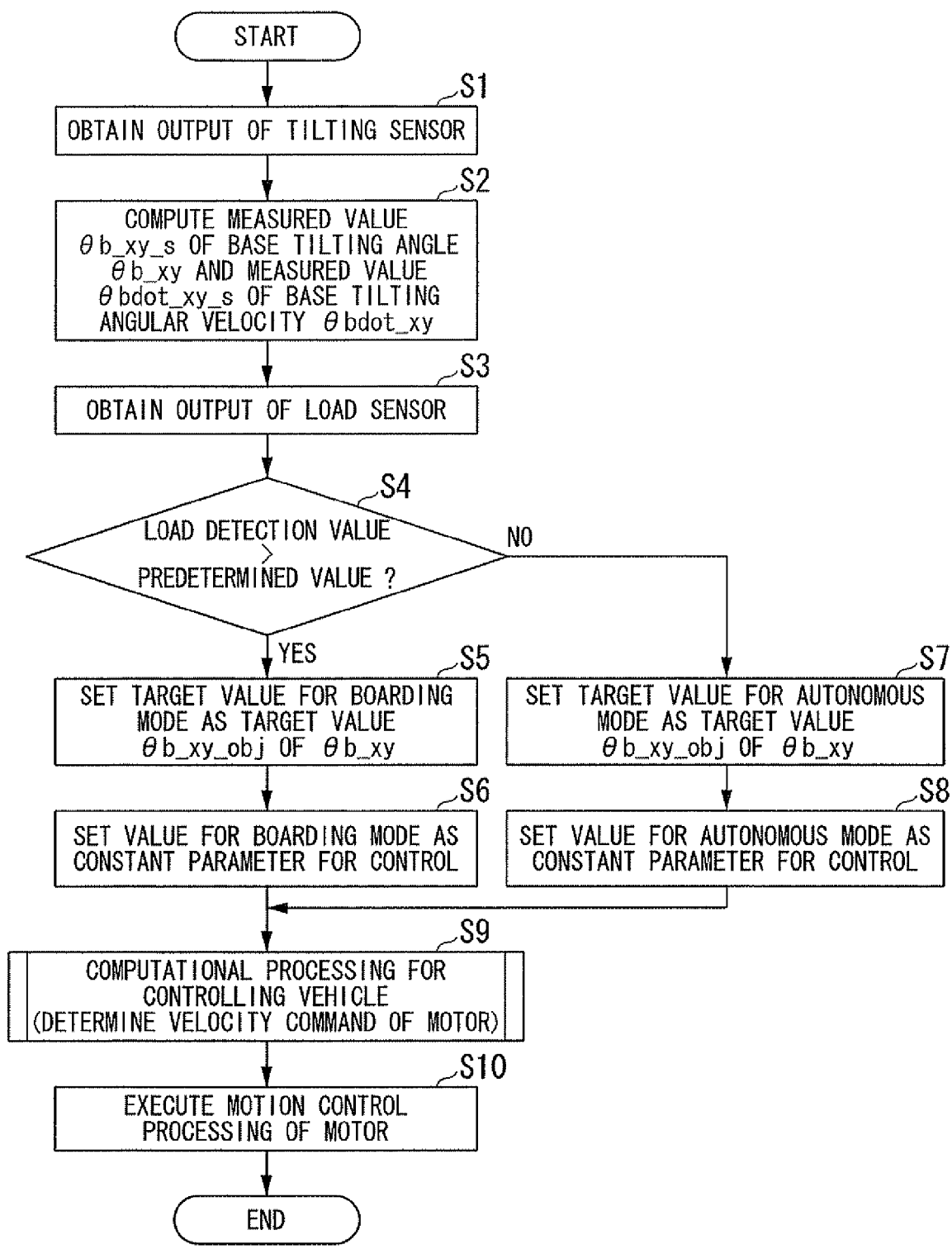
FIG. 7 is a flowchart showing a processing of a control unit of an omnidirectional vehicle according to an embodiment of the present invention.

The control unit 50 executes a procedure indicated in the flowchart shown in FIG. 7, at a predetermined control processing period. Here, the procedure indicated in the flowchart is referred to as a main routine processing.

First, in step S1, the control unit 50 obtains an output from the tilting sensor 52.

Next, the procedure moves on to step S2. In step S2, the control unit 50 computes a measured value $\theta b\_xy\_s$ of the base body tilt angle θb and the measured value $\theta bdot\_xy\_s$ of the base body tilting angular velocity θbdot based on an output obtained from the tilting sensor 52.

In the following description, when a measured value (a measured value or an estimated value) of an actual value of a variable representing a quantity of a condition such as the measured value θb_xy_s is referenced, a subscript "_s" is appended to the reference numeral of the variable.

In step S3, after the control unit 50 obtains an output of the load sensor 54, the control unit 50 performs a determination processing of the step S4. In this determination processing, the control unit 50 determines whether or not the occupant is riding the vehicle 1, i.e., whether or not the occupant is seated on the seat 3, based on whether or not a load observed value obtained by an output of the load sensor 54 is greater than a predetermined value.

Further, when the determination result of step S4 is in the positive, the control unit 50 performs a processing in step S5 in which the target value θb_xy_obj of the base body tilt angle θb is set. In addition, when the determination result of step S4 is in the positive, the control unit 50 performs a processing in step S6 in which a value of a constant parameter for controlling the movement of the vehicle 1 is set. An example of the constant parameter includes a basic value for each type of gain and the like.

In step S5, the control unit 50 sets a predetermined target value for a boarding mode as a target value θb_xy_obj of the base body tilt angle θb.

Here, a "boarding mode" refers to an operating mode of the vehicle 1 in a condition in which the occupant is riding the vehicle 1. The target value θb_xy_obj for this boarding mode is predetermined so as to be equal to or approximately equal to the measured value θb_xy_s of the base body tilt angle θb measured based on an output by the tilting sensor 52 in a position of the base body 9 in which a center-of-gravity point of the vehicle 1 and an occupant seated on the seat 3 in their entirety is located approximately right above the surface at which the wheel assembly 5 contacts the floor surface. Hereinafter, the center-of-gravity point of the vehicle 1 and an occupant seated on the seat 3 in their entirety is referred to as a "vehicle/occupant integrated center-of-gravity point."

Further, in step S6, the control unit 50 sets a value of a constant parameter for controlling the motion of the vehicle 1 as a predetermined value for a boarding mode. Incidentally, the constant parameter includes hx, hy, Ki_a_x, Ki_b_x, Ki_a_y, Ki_b_y (i=1, 2, 3, 4, 5, 6) and the like.

Meanwhile, when the determination result of step S4 is in the negative, the control unit 50 performs a processing in S7 in which the target value θb_xy_obj of the base body tilt angle θb_xy is set. In addition, when the determination result of step S4 is in the negative, the control unit 50 performs a processing in S8 in which the value of the constant parameter for controlling the movement of the vehicle 1 is set.

In step S7, the control unit 50 sets a predetermined target value for a autonomous mode as a target value θb_xy_obj of the tilt angle θb.

Here, a "autonomous mode" refers to a moving mode of the vehicle 1 in a condition in which the occupant is not riding the vehicle 1. The target value θb_xy_obj for the autonomous mode is predetermined so as to be equal to or approximately equal to the measured value θb_xy_s of the base body tilt angle θb measured based on an output by the tilting sensor 52 in a position of the base body 9 in which a center-of-gravity point of the vehicle 1 in its single form is located approximately right above the surface at which the wheel assembly 5 contacts the floor surface. Hereinafter, a center-of-gravity point of the vehicle 1 in its single form is referred to as a "singular vehicle body center-of-gravity point." In general, the target value θb_xy_obj for the autonomous mode is different from the target value θb_xy_obj for the boarding mode.

Further, in step S8, the control unit 50 sets a predetermined value for a autonomous mode as a value of a constant parameter for controlling the movement of the vehicle 1. The value of the constant parameter for the autonomous mode is different from the value of the constant parameter for the boarding mode.

The value of the constant parameter is differed in the boarding mode and in the autonomous mode, because the characteristics of how the movement of the vehicle 1 responds to a control input are different in the boarding mode and in the autonomous mode, since the height of the center-of-gravity point and the total mass and the like are different in the boarding mode and in the autonomous mode.

According to the processing performed in steps S4-S8, the target value θb_xy_obj of the base body tilt angle θb_xy and the value of the constant parameter is different for each movement mode, i.e., the boarding mode and the autonomous mode.

Incidentally, the processing in steps S5 and S6, or the processing in steps S7 and S8 need not be performed for every cycle of the control processing, and may be only performed when there is a change in the determination result of step S4.

Incidentally, in both the boarding mode and the autonomous mode, the target value of the element θbdot_x in a direction around the y axis and the target value of the element θbdot_y in a direction around the x axis of the base body tilting angular velocity θbdot are both "0." Therefore, it is not necessary to set the target value of the base body tilting angular velocity θbdot_xy.

As described above, after executing the processing in steps S5 and S6, or the processing in steps S7 and S8, the control unit 50 then moves on to step S9. In step S9, the velocity command of each of the electric motors 31R, 31L are determined by executing the computational processing for controlling the vehicle. This computational processing for controlling the vehicle is described later.

Next, the processing moves on to step S10. In step S10, the control unit 50 executes the control operation of the electric motors 31R and 31L according to the velocity command determined in step S9. In this control operation, the control unit 50 determines the target value of the output torque of the electric motor 31R so that a difference between a velocity command of the electric motor 31R determined in step S9 and the measured value of the rotational velocity of the electric motor 31R measured based on the output of the rotary encoder 56R is converged to "0." The target value of the output torque may also be referred to as the target torque. Furthermore, the control unit 50 controls the electric current supplied to the electric motor 31R so that the output torque of the target torque is outputted to the electric motor 31R. The movement control of the left electric motor 31L is configured in a similar manner.

Heretofore, an overall control processing executed by the control unit 50 has been described.

Next, the computational processing for controlling the vehicle executed in step S9 is described in detail.

Incidentally, in the following description, the vehicle/occupant integrated center-of-gravity point in the boarding mode and the singular vehicle body center-of-gravity point in the autonomous mode are collectively referred to as the "vehicle system center-of-gravity point." When the operating mode of the vehicle 1 is the boarding mode, the vehicle system center-of-gravity point refers to the vehicle/occupant integrated center-of-gravity point. When the operating mode of the vehicle 1 is the autonomous mode, the vehicle system center-of-gravity point refers to the singular vehicle body center-of-gravity point.

Further, in the following description regarding a value determined or renewed by the control unit 50 in each period of control processing, a value determined in the current, most recent period of control processing may be referred to as the current value. Meanwhile, a value determined in the period immediately prior to the current period of control processing may be referred to as the previous value. Further, when a value is referred to without specifying whether the value is a current value or a previous value, the value is meant to be a current value.

Further, regarding the velocity and acceleration in the x axis direction, the frontal direction is considered to be a positive direction. Regarding the velocity and acceleration in the y axis direction, the left direction is regarded as the positive direction.

Figure 8:
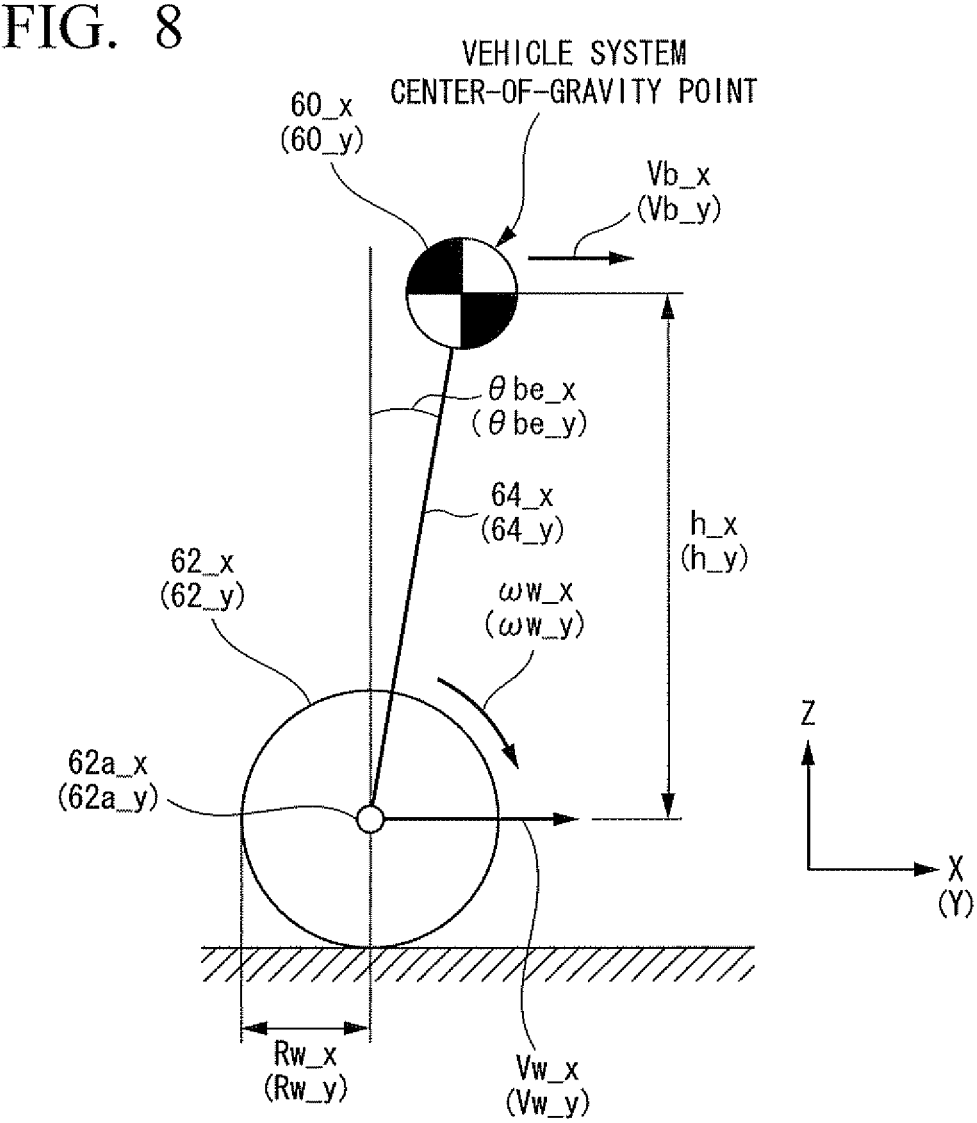
FIG. 8 is a diagram showing an inverted pendulum type model representing dynamic behavior of an omnidirectional vehicle according to an embodiment of the present invention.

According to the present embodiment, the computational processing for controlling the vehicle is executed in step S9 under the assumption that a dynamic movement of the vehicle system center-of-gravity point is represented approximately as a behavior of the inverted pendulum model as shown in FIG. 8. In particular, the dynamic movement of the center-of-gravity point refers to a movement viewed by projecting from a y axis direction to the xz surface which is perpendicular to the y axis, and also refers to a movement viewed by projecting from an x axis direction to the yz surface which is perpendicular to the x axis. Furthermore, the behavior of the inverted pendulum model mentioned above refers to a dynamic movement of the inverted pendulum.

Further, in FIG. 8, a reference numeral without a parenthesis is a reference numeral corresponding to an inverted pendulum model seen from a y axis direction. Meanwhile, a reference numeral with a parenthesis is a reference numeral corresponding to an inverted pendulum model seen from the x axis direction.

In this case, an inverted pendulum model representing a behavior seen from a y axis direction comprises a mass point $60\_x$ positioned at the vehicle system center-of-gravity point and an imaginary wheel $62\_x$. Here, the imaginary wheel $62\_x$ comprises a rotating axis $62a\_x$ parallel to the y axis direction. The imaginary wheel $62\_x$ and can rotate freely over a floor surface. Further, the mass point $60\_x$ is supported by the rotating axis $62a\_x$ of the imaginary wheel $62\_x$ via a rod $64\_x$ shaped like a straight line. In addition, the mass point $60\_x$ may swing freely around the rotating axis $62a\_x$, with the rotating axis $62a\_x$ being the fulcrum point.

According to this inverted pendulum model, the movement of the mass point $60\_x$ corresponds to the movement of the vehicle system center-of-gravity point seen from a y axis direction. In addition, the tilt angle $\theta be\_x$ of the rod $64\_x$ with respect to the orthogonal direction is equal to a difference $\theta be\_x\_s$ ($=\theta b\_x\_s-\theta b\_x\_obj$) between a measured value of a base body tilt angle $\theta b\_x\_s$ and a target value of a base body tilt angle $\theta b\_x\_obj$ in the direction around the y axis. Further, a rate of change ($=d\theta be\_x/dt$) of the tilt angle $\theta be\_x$ of the rod $64\_x$ equals the measured value $\theta bdot\_x\_s$ of the base body tilting angular velocity around the y axis. Further, the velocity $Vw\_x$ of the imaginary wheel $62\_x$ (the translational velocity in the x axis direction) is equal to the velocity of the wheel assembly 5 of the vehicle 1 in the x axis direction.

Similarly, the inverted pendulum model representing a movement seen from the x axis direction (see reference numeral in FIG. 8 with parenthesis) comprises a mass point $60\_y$ located at the vehicle system center-of-gravity point and an imaginary wheel $62\_y$, which comprises a rotational axis $62a\_y$ parallel in the x axis direction and can roll around freely on a floor surface. Further, the mass point $60\_y$ is supported by the rotational axis $62a\_y$ of the imaginary wheel $62\_y$ via a linear rod $64\_y$. Furthermore, the mass point $60\_y$ may freely wobble around the rotational axis $62a\_y$, with the rotational axis $62a\_y$ being a fulcrum point.

According to this inverted pendulum model, the movement of the mass point $60\_y$ corresponds to the movement of the vehicle system center-of-gravity point seen from an x axis direction. In addition, the tilt angle $\theta be\_y$ of the rod $64\_y$ with respect to the orthogonal direction is equal to a difference $\theta be\_y\_s$ ($=\theta b\_y\_s-\theta b\_y\_obj$) between a measured value of a base body tilt angle $\theta b\_y\_s$ and a target value of a base body tilt angle $\theta b\_y\_obj$ in the direction around the x axis. Further, a rate of change ($=d\theta be\_y/dt$) of the tilt angle $\theta be\_y$ of the rod $64\_y$ equals the measured value $\theta bdot\_y\_s$ of the base body tilting angular velocity around the x axis. Further, the velocity $Vw\_y$ of the imaginary wheel $62\_y$ (the translational velocity in the y axis direction) is equal to the velocity of the wheel assembly 5 of the vehicle 1 in the y axis direction.

Furthermore, the imaginary wheels $62\_x$ and $62\_y$ each have a predetermined radius of $Rw\_x$ and $Rw\_y$.

Furthermore, the rotational angular velocity $\omega w\_x$ and $\omega w\_y$ of each of the imaginary wheels $62\_x$ and $62\_y$, and a rotational angular velocity $w\_R$ and $w\_L$ of each of the electric motors 31R and 31L (in more precise terms, the rotational angular velocity $\omega\_R$ and $\omega\_L$ of the rotational members 27R and 27L) satisfy the following equations 01a and 01b.

$$\omega w\_x=(\omega\_R+\omega\_L)2 \quad \text{(Equation 01a)}$$

$$\omega w\_y=C\cdot(\omega\_R-\omega\_L)/2 \quad \text{(Equation 01b)}$$

Incidentally, "C" in the equation 01b refers to a predetermined constant which depends on a mechanical relationship and a slippage between the free roller 29R, 29L and the wheel assembly 5.

Here, the dynamics of the inverted pendulum model shown in FIG. 8 is represented by the following equations 03x and 03y. Incidentally, the equation 03x is an equation representing the dynamics of the inverted pendulum model seen from a y axis direction. The equation 03y is an equation representing the dynamics of the inverted pendulum model seen from an x axis direction.

$$d^2\theta be\_x/dt^2=\alpha\_x\cdot\theta be\_x+\beta\_x\cdot\omega wdot\_x \quad \text{(Equation 03x)}$$

$$d^2\theta be\_y/dt^2=\alpha\_y\cdot\theta be\_y+\beta\_y\cdot\omega wdot\_y \quad \text{(Equation 03y)}$$

Here, the $\omega wdot\_x$ in equation 03x represents a rotational angular acceleration of the imaginary wheel $62\_x$, i.e., the first differential of the rotational angular velocity $\omega w\_x$. In addition, $\alpha\_x$ represents a coefficient depending on the mass and the height $h\_x$ of the mass point $60\_x$. $\beta\_x$ is a coefficient depending on the inertia (the moment of inertia) of the imaginary wheel $62\_x$ and the radius $Rw\_x$. The above description also applies to $\omega wdoty\_y$, $\alpha\_y$, and $\beta\_y$ in equation 03y.

As indicated in equations 03x and 03y, the movement of the mass points $60\_x$ and $60\_y$ of the inverted pendulum is prescribed depending on the rotational angular acceleration $\omega wdot\_x$ of the imaginary wheel $62\_x$, and the rotational angular acceleration $\omega wdot\_y$ of the imaginary wheel $62\_y$.

Therefore, according to the present embodiment, the rotational angular acceleration $\omega wdot\_x$ of the imaginary wheel $62\_x$ is used as the manipulated variable (control input) for controlling the movement of the vehicle system center-of-gravity point seen from the y axis direction. At the same time, the rotational angular acceleration $\omega wdot\_y$ of the imaginary wheel $62\_y$ is used as the manipulated variable (control input) for controlling the movement of the vehicle system center-of-gravity point seen from the x axis direction.

Heretofore, a computational processing for controlling the vehicle, executed in step S9, is described in general. The control unit 50 determines an imaginary wheel rotational angular acceleration commands ωwdot_x_cmd and ωwdot_y_cmd, which are command values (target values) of the rotational angular acceleration ωwdot_x and ωwdot_y as an manipulated variable, so that the movement of the mass point 60_x seen from the x axis direction and the movement of the mass point 60_y seen from the y axis direction becomes a movement corresponding to a predetermined movement of the vehicle system center-of-gravity point. Furthermore, the control unit 50 determines a value obtained by integrating each of the imaginary wheel rotational angular acceleration commands ωwdot_x_cmd and ωwdot_y_cmd as the imaginary wheel rotational angular velocity commands ωw_x_cmd and ωw_y_cmd, which are the command values (target values) of the rotational angular velocity ωw_x and ωw_y of each of the imaginary wheels 62_x and 62_y.

In addition, the control unit 50 regards the velocity (=Rw_x·ωw_x_cmd) of the imaginary wheel 62_x corresponding to the imaginary wheel rotational angular velocity command ωw_x_cmd as the target velocity of the wheel assembly 5 of the vehicle 1 in the x axis direction. The control unit 50 also regards the velocity (=Rw_y·ωw_y_cmd) of the imaginary wheel 62_y corresponding to the imaginary wheel rotational angular velocity command ωw_y_cmd as the target velocity of the wheel assembly 5 of the vehicle 1 in the y direction. The control unit 50 determines the velocity commands ω_R_cmd and ω_L_cmd of respectively the electric motors 31R and 31L so as to reach these target velocities.

Further, according to the present embodiment, if the movement in alignment with another moving body described later is not taken into consideration, the imaginary wheel rotational angular acceleration commands ωwdot_x_cmd and ωwdot_y_cmd, being an manipulated variable (control input), is determined by adding up three operational components as indicated in Equations 07x and 07y described later.

Figure 9:
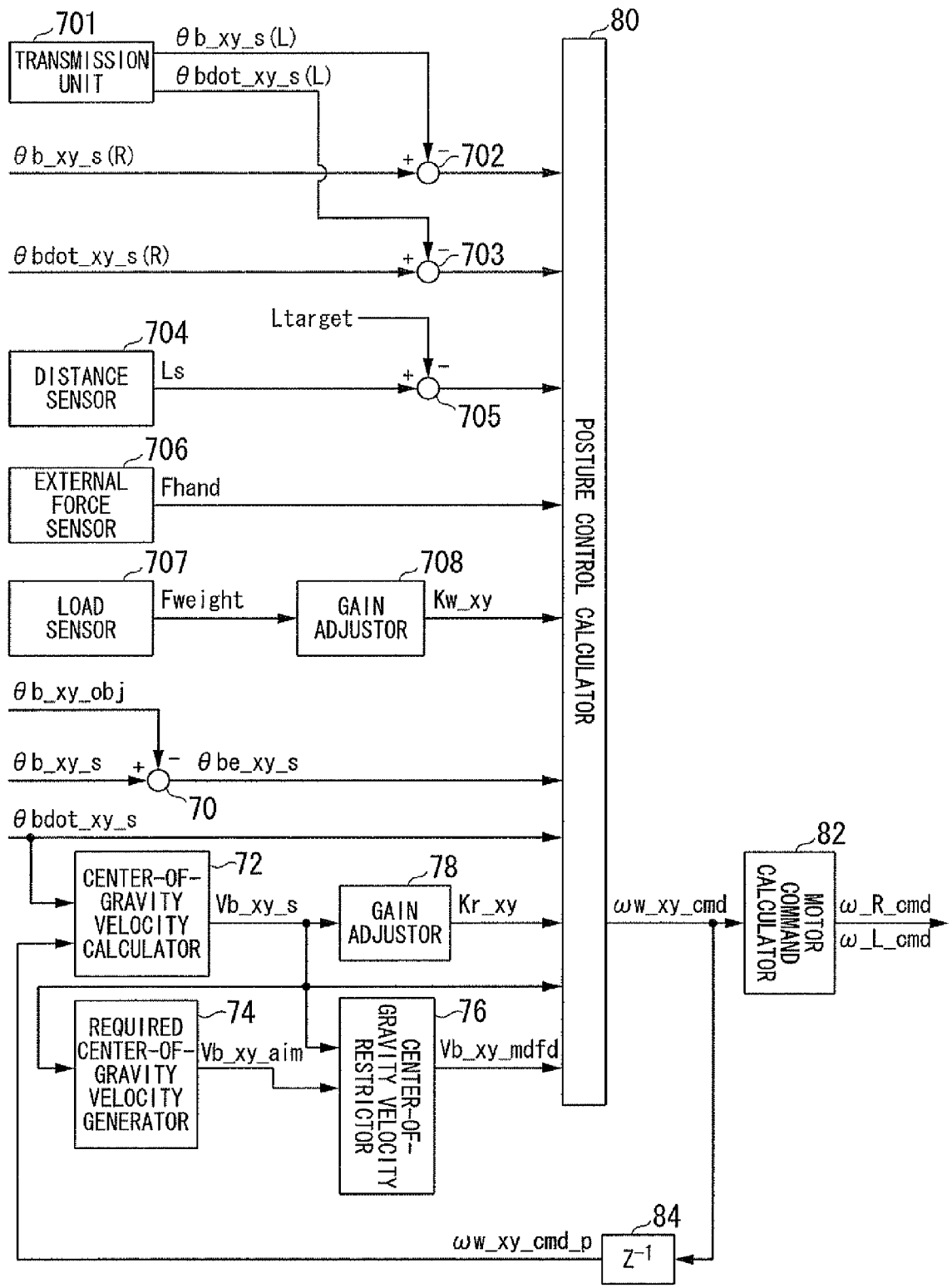
FIG. 9 is a block diagram showing a processing of step S9 shown in FIG. 7.

As described above, the control unit 50 comprises the feature represented in the block diagrams shown in FIG. 9 in order to execute the computational processing for controlling the vehicle in step S9.

Incidentally, in FIG. 9, the components with the reference numerals 70, 72, 74, 76, 78, 80, 82, and 84 are components relating to a basic movement control of the inverted pendulum type moving body according to the present embodiment as an omnidirectional vehicle. The components with the other reference numerals 701-708 are components relating to an alignment movement of the inverted pendulum according to the present embodiment. Here, among the components in FIG. 9, a description is provided regarding the components relating to the basic movement control as an omnidirectional vehicle. A detailed description of the components relating to an alignment movement is provided later in the section entitled "2. Technology For Motion In Alignment."

The control unit 50 comprises an error calculator 70, a center-of-gravity velocity calculator 72, a required center-of-gravity point velocity generator 74, a center-of-gravity point velocity restrictor 76, and a gain adjustor 78. The error calculator 70 computes the base body tilt angle deviation observed value θbe_xy_s, which is a deviation between the base body tilt angle observed value θb_xy_s and the base body tilt angle target value θb_xy_obj. The center-of-gravity velocity calculator 72 computes a center-of-gravity point velocity estimate value Vb_xy_s as an observed value of the center-of-gravity point velocity Vb_xy, which is the velocity of the vehicle system center-of-gravity point. The required center-of-gravity point velocity generator 74 generates a required center-of-gravity point velocity V_xy_aim as a required value of the center-of-gravity point velocity Vb_xy, which is estimated to be required according to the driving operation of the vehicle 1 by the occupant and the like (i.e., an operation adding an impellent force to the vehicle 1). The center-of-gravity point velocity restrictor 76 determines the target center-of-gravity point velocity for control Vb_xy_mdfd as a target value of the center-of-gravity point velocity Vb_xy based on the estimated center-of-gravity velocity value Vb_xy_s and the required center-of-gravity point velocity V_xy_aim taking into consideration the limitations according to the tolerable range of the rotational angular velocity of the electric motors 31R and 31L. The gain adjustor 78 determines a gain adjustment parameter Kr_xy to adjust the value of the gain coefficient of the equations 07x, 07y, 17x, and 17y.

The control unit 50 further comprises a posture control calculator 80 and a motor command calculator 82. The posture control calculator 80 computes the imaginary wheel rotational angular velocity command ωw_xy_cmd. The motor command calculator 82 converts the imaginary wheel rotational angular velocity command ωw_xy_cmd into a pair of right side velocity command ω_R_cmd of the electric motor 31R (the command value of the rotational angular velocity) and a left side velocity command ω_L_cmd of the electric motor 31L (the command value of the rotational angular velocity).

Incidentally, the reference numeral 84 in FIG. 9 indicates a delay element imputing an imaginary wheel rotational angular velocity command ωw_xy_cmd computed by the posture control calculator 80 for each control processing cycle. In each control processing cycle, the delay element 84 outputs the previous value ωw_xy_cmd_p of the imaginary wheel rotational angular velocity command ωw_xy_cmd.

Each of these operations are performed by each of the processors in the computational processing for controlling the vehicle in step S9.

In other words, the control unit 50 first executes a processing of the error calculator 70 and the center-of-gravity velocity calculator 72.

The error calculator 70 receives an input of the base body tilt angle observed value θb_xy_s (θb_x_s and θb_y_s) computed in the step S2. The error calculator 70 also receives an input of the target value θb_xy_obj (θb_x_obj and θb_y_obj) set in steps S5 or step S7. Further, the error calculator 70 computes the base body tilt angle deviation observed value θbe_x_s in the direction around the y axis by subtracting θb_x_obj from θb_x_s (=θb_x_s−θb_x_obj). At the same time, the error calculator 70 computes the base body tilt angle deviation observed value θbe_y_s in the direction around the x axis by subtracting θb_y_obj from θb_y_s (=θb_y_s−θb_y_obj).

In addition, the processing of the error calculator 70 may be executed before the computational processing for controlling the vehicle performed in step S9. For example, the processing by the error calculator 70 may be executed during the processing of steps S5 or S7.

The center-of-gravity velocity calculator 72 receives an input of the current value of the base body tilting angular velocity observed value θbdot_xy_s (θbdot_x_s and θbdot_y_s) computed in step S2. In addition, the center-of-gravity velocity calculator 72 receives an input of the previous value ωw_xy_cmd_p (ωw_x_cmd_p and ωw_y_cmd_p) of the imaginary wheel velocity command ωw_xy_cmd from the delay element 84. In addition, the center-of-gravity velocity calculator 72 computes the center-of-gravity point velocity estimation value Vb_xy_s (Vb_x_s and Vb_y_s) from these inputs according to a predetermined arithmetic equation based on the inverted pendulum model.

In detail, the center-of-gravity velocity calculator 72 computes each of Vb_x_s and Vb_y_s according to the following equations 05x and 05y.

$$Vb\_x\_s = Rw\_x \cdot \omega w\_x\_cmd\_p + h\_x \cdot \theta bdot\_x\_s \quad (05x)$$

$$Vb\_y\_s = Rw\_y \cdot \omega w\_y\_cmd\_p + h\_y \cdot \theta bdot\_y\_s \quad (05y)$$

In these equations 05x and 05y, Rw_x and Rw_y each represent the radius of the wheels 62_x and 62_y, and are predetermined values. Further, h_x and h_y each represent the height of the mass points 60_x and 60_y of the inverted pendulum model. In this case according to the present embodiment, the height of the vehicle system center-of-gravity point is maintained at an approximately constant level. Here, predetermined values are used for h_x and hy. Thus, the heights h_x and h_y are included in the constant parameter, the value of which is set in steps S6 or S8.

The first term of the right side of the equation 05x is a moving velocity of the imaginary wheel 62_x in the x axis direction, corresponding to the previous value ωw_x_cmd_p of the velocity command of the imaginary wheel 62_x. This velocity corresponds to the current value of the actual velocity of the wheel assembly 5 in the x axis direction. Further, the second term of the right side of the equation 05x corresponds to the current value of the velocity of the vehicle system center-of-gravity point in the x axis direction (the relative velocity with respect to the wheel assembly 5) due to the base body 9 tilting in the direction around the y axis in a tilting angular velocity of θbdot_x_s. These characteristics apply to equation 05y as well.

Further, a pair of observed values (current values) of the rotational angular velocity for each of the electric motors 31R and 31L measured based on the output of the rotary encoder 56R and 56L may be converted to a pair of rotational angular velocities for each of the imaginary wheels 62_x and 62_y. These rotational angular velocities may be used instead of ωw_x_cmd_p and ωw_y_cmd_p in equations 05x and 05y. However, in terms of eliminating the influence of noise included in the observed value of the rotational angular velocity, it is more preferable to use the target values ωw_x_cmd_p and ωw_y_cmd_p.

Next, the control unit 50 executes the processing in the required center-of-gravity point velocity generator 74 and the gain adjustor 78. In this case, the required center-of-gravity point velocity generator 74 and the gain adjustor 78 each receives an input of the center-of-gravity point velocity estimation value Vb_xy_s (Vb_x_s and Vb_y_s) computed as described above in the center-of-gravity velocity calculator 72.

Further, when the operation mode of the vehicle 1 is in a boarding mode, the required center-of-gravity point velocity generator 74 determines the required center-of-gravity point velocity V_xy_aim (V_x_aim, V_y_aim) based on the inputted center-of-gravity point velocity estimation value Vb_xy_s (Vb_x_s and Vb_y_s). Details of the computation are described later. Incidentally, according to the present embodiment, when the operation mode of the vehicle 1 is in an autonomous mode, the required center-of-gravity point velocity generator 74 sets the required center-of-gravity point velocity V_x_aim and V_y_aim to zero.

Further, the gain adjusting unit 78 determines the gain adjustment parameter Kr_xy (Kr_x and Kr_y) based on the inputted center-of-gravity point velocity estimation value Vb_xy_s (Vb_x_s and Vb_y_s).

The processing by the gain adjusting unit 78 is described below with reference to FIGS. 10 and 11.

Figure 10:
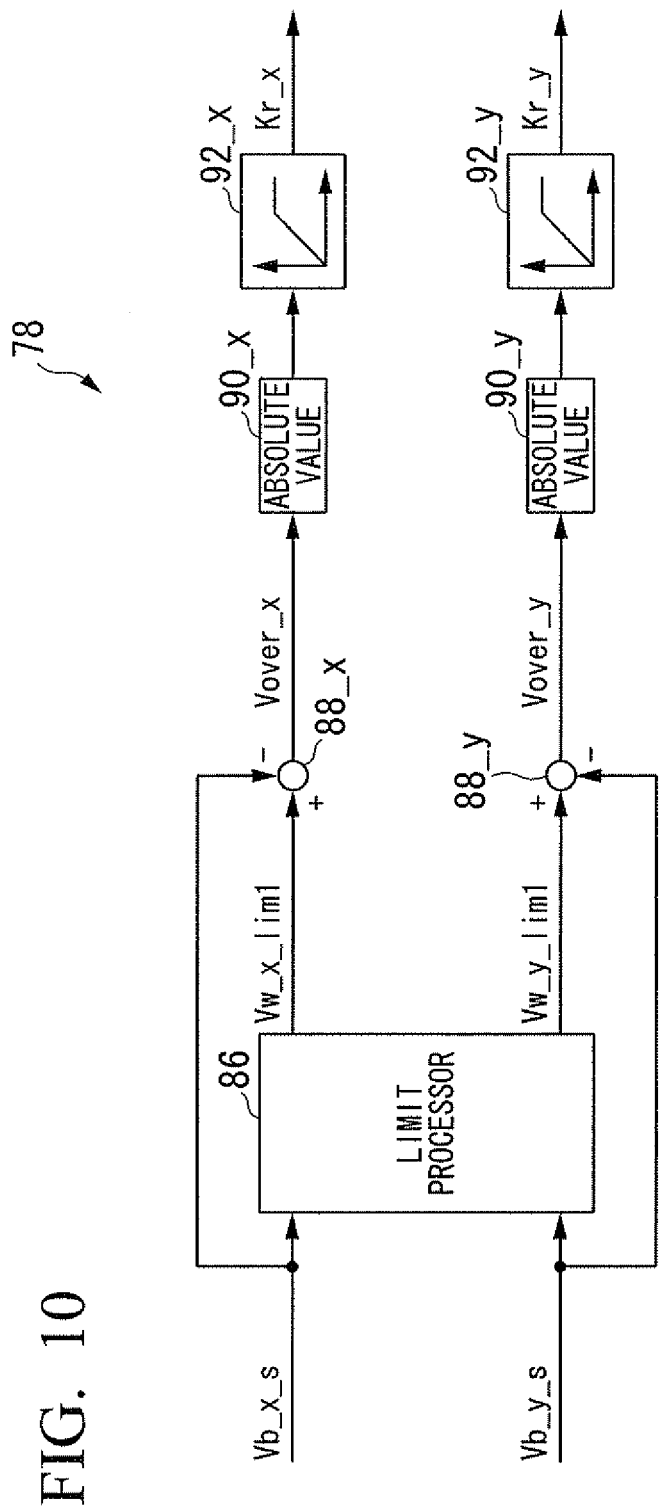
FIG. 10 is a block diagram showing a processing of a gain adjusting unit 78 shown in FIG. 9.
Figure 11:
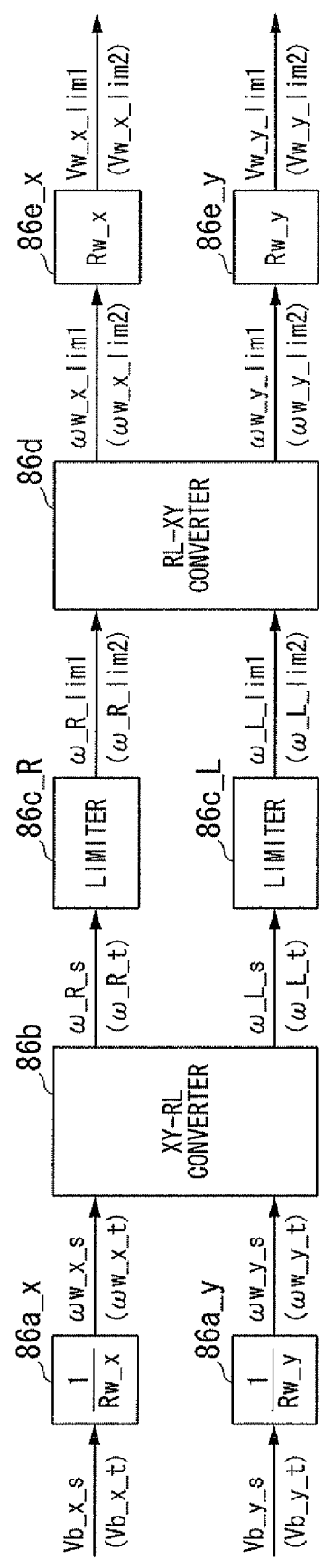
FIG. 11 is a block diagram showing a processing of a limiting processor shown in FIG. 10 (or a limiting processor shown in FIG. 12).

As shown in FIG. 10, the gain adjusting unit 78 enters the imputed center-of-gravity point velocity estimation values Vb_x_s and Vb_y_s to the limiting processor 86. This limiting processor 86 generates the output values Vw_x_lim1 and Vw_y_lim1 by adding a limitation according to the tolerable range of the rotational angular velocity of each of the electrically operated motors 31R and 31L to the center-of-gravity point velocity estimation value Vb_x_s and Vb_y_s. The output value Vw_x_lim1 indicates the value after the limitation imposed on the velocity Vw_x of the imaginary wheel 62_x in the x axis direction. The output value Vx_y_lim1 indicates the value after the limitation is imposed on the velocity Vw_y of the imaginary wheel 62_y in the y axis direction.

The processing by the limiting processor 86 is described in further detail with reference to FIG. 11. The parenthesized reference numerals in FIG. 11 represent a processing of the limiting processor 104 of the center-of-gravity point velocity restrictor 76, and may be ignored in the description concerning the procedure executed by the limiting processor 86.

The limiting processor 86 first enters the center-of-gravity point velocity estimation values Vb_x_s and Vb_y_s to the processors 86a_x and 86a_y. The processor 86a_x divides Vb_x_s with the radius Rw_x of the imaginary wheel 62_x, and computes the rotational angular velocity ωw_x_s of the imaginary wheel 62_x, in a case assuming that the moving velocity of the imaginary wheel 62_x in the x axis direction is matched with Vb_x_s. Similarly, the processor 86a_y computes the rotational angular velocity ωw_y_s (=Vb_y_s/Rw_y) of the imaginary wheel 62_y, in a case assuming that the moving velocity of the imaginary wheel 62_y in the y axis direction is matched with Vb_y_s.

Next, the limiting processor 86 converts the pair ωw_x_s and ωw_y_s into a pair of rotational angular velocity w_R_s of the electric motor 31R and the rotational angular velocity w_L_s of the electric motor 31L, via the XY-RL converter 86b.

According to the present embodiment, this conversion is performed by solving the simultaneous equation of the unknowns ω_R_s and ω_L_s obtained by replacing the variables ωw_x, ωw_y, ω_R, and w_L in the equations 01a and 01b into ωw_x_s, w_y_s, ω_R_s, and ω_L_s.

Next, the limiting processor 86 inputs the output values ω_R_s and ω_L_s of the XY-RL converter 86b respectively into the limiters 86c_R and 86c_L. At this time, when w_R_s is within a tolerable range for the right motor comprising a predetermined upper limit (>0) and a lower limit (<0), the limiter 86c_R outputs w_R_s directly as the output value ω_R_lim1. Meanwhile, when ω_R_s is outside of the tolerable range for the right motor, the limiter 86c_R outputs either one of the boundary values (the upper limit or the lower limit) of the tolerable range for the right motor closer to ω_R_s as the output value ω_R_lim1. As a result, the output value ω_R_lim1 of the limiter 86c_R is limited to a value within the tolerable range for the right motor.

Similarly, when ω_L_s is within a tolerable range for the left motor comprising a predetermined upper limit (>0) and a lower limit (<0), the limiter 86c_L outputs ω_L_s directly as the output value ω_L_lim1. Meanwhile, when ω_L_s is outside of the tolerable range for the left motor, the limiter 86c_L outputs either one of the boundary values (the upper limit or the lower limit) of the tolerable range for the left motor closer to ω_L_s as the output value ω_Lim1. As a result, the output value ω_Lim1 of the limiter 86c_L is limited to a value within the tolerable range for the left motor.

The tolerable range for the right motor is set in order to prevent the absolute value of the rotational angular velocity of the electric motor 31R at the right side from becoming too large, and to prevent the maximum value of the torque which can be outputted from the electric motor 31R from declining. This feature applies to the tolerable range for the left motor as well.

Next, the limiting processor 86 converts the pair of output values ω_R_lim1 and ω_L_lim1 of the limiters 86c_R and 86c_L to a pair of rotational angular velocity ωw_x_lim1 and ωw_y_lim1 of the imaginary wheels 62_x and 62_y through the RL-XY converter 86d.

This conversion is a reverse conversion process performed by the XY-RL converter 86b. This procedure is executed by solving the simultaneous equation of the unknowns ωw_x_lim1 and ωw_y_lim1 obtained by replacing the variables ωw_x, ωw_y, ω_R, and ω_L in the equations 01a and 01b into ωw_x_lim1, ωw_y_lim1, ω_R_lim1, and ω_L_lim1.

Next, the limiting processor 86 inputs the output values ωw_x_lim1 and ωw_y_lim1 from the RL-XY converter 86d into the processors 86e_x and 86e_y. The processor 86e_x multiplies ωw_x_lim1 with the radius Rw_x of the imaginary wheel 62_x, and thereby converts ωw_x_lim1 into the velocity Vw_y_lim1 of the imaginary wheel 62_x. Similarly, the processor 86e_y converts ωw_y_lim1 into the velocity Vw_y_lim1 (=ωw_y_lim1·Rw_y) of the imaginary wheel 62_y.

As a result of the processing executed by the limiting processor 86, when the velocity Vw_x of the imaginary wheel 62_x in the x axis direction and the velocity Vw_y of the imaginary wheel 62_y in the y axis direction are assumed to be respectively matched with the center-of-gravity point velocity estimation values Vb_x_s and Vb_y_s (i.e., when the velocity of the wheel assembly 5 in the x axis direction and the y direction is respectively matched with Vb_x_s and Vb_y_s), and when the rotational angular velocities ω_R_s and ω_L_s of the electric motors 31R and 31L necessary to attain the velocities are both within a tolerable range, the pair of output values Vw_x_lim1 and Vw_y_lim1 respectively matching Vb_x_s and Vb_y_s are outputted by the limiting processor 86.

Meanwhile, when both or either one of the rotational angular velocities ω_R_s and ω_L_s of the electric motors 31R and 31L is outside the tolerable range, both or either one of the rotational angular velocities is confined to be included in the tolerable range. Under this limitation, the pair of velocities Vw_x_lim1 and Vw_y_lim1 in the x axis direction and the y axis direction corresponding to the pair of rotational angular velocities ω_R_lim1 and ω_L_lim1 of the electric motors 31R and 31L is outputted from the limiting processor 86.

Therefore, under the compulsory, necessary condition that each of the rotational angular velocities of the electric motors 31R and 31L corresponding to the pair of output values Vw_x_lim1 and Vw_y_lim1 is not outside of the tolerable range, the limiting processor 86 generates a pair of output values Vw_x_lim1 and Vw_y_lim1 so that each of the output values Vw_x_lim1 and Vw_y_lim1 is matched respectively with Vb_x_s and Vb_y_s to the extent possible under the above necessary condition.

Returning to the description concerning FIG. 10, the gain adjusting unit 78 executes the processing of the calculators 88_x and 88_y. The calculator 88_x receives an input of the center-of-gravity point velocity estimation value Vb_x_s in the x axis direction and the output value Vw_x_lim1 of the limiting processor 86. Further, the calculator 88_x computes a value Vover_x by subtracting Vb_x_s from Vw_x_lim1 and outputs the value Vover_x. Further, the calculator 88_y receives an input of the center-of-gravity point velocity estimation value Vb_y_s in the y axis direction and the output value Vw_y_lim1 of the limiting processor 86. Further, the calculator 88_y computes a value Vover_y by subtracting Vb_y_s from Vw_y_lim1, and outputs the value Vover_y.

In this case, when the output values Vw_y_lim1 and Vw_y_lim1 were not compulsorily limited in the limiting processor 86, the following equations hold: Vw_x_lim1=Vb_x_s, Vw_y_lim1=Vb_y_s Therefore, the output values Vover_x and Vover_y of each of the computational units 88_x and 88_y both becomes zero.

On the other hand, when the output values Vw_y_lim1 and Vw_y_lim1 of the limiting processor 86 are generated by imposing a compulsory limitation on the input values Vb_x_s and Vb_y_s, the corrected value (=Vw_x_lim1−Vb_x_s) of Vw_y_lim1 with respect to Vb_x_s and the corrected value (=Vw_y_lim1−Vb_y_s) of Vw_y_lim1 with respect to Vb_y_s are outputted by the calculators 88_x and 88_y.

Next, the gain adjusting unit 78 runs the output value Vover_x of the calculator 88_x through the processors 90_x and 92_x in order. In this way, the gain adjusting unit 78 determines the gain adjusting parameter Kr_x. Further, the gain adjusting unit 78 determines the gain adjusting parameter Kr_y by running the output value Vover_y of the calculator 88_y through the processors 90_y and 92_y in order. Further, the gain adjusting parameters Kr_x and Kr_y are both values between 0 and 1.

The processor 90_x computes the absolute value of the inputted Vover_x, and outputs the absolute value. Further, the processor 92_x generates Kr_x so that the output value Kr_x increases monotonically with respect to the inputted value |Vover_x| and so that Kr_x has a saturation characteristic. According to this saturation characteristic, when the input value becomes large to a certain degree, the change in the output value with respect to the increase in the input value becomes equal to or close to zero.

In this case, according to the present embodiment, when the input value |Vover_x| is less than or equal to a predetermined value, the processor 92_x outputs the value obtained by multiplying the input value |Vover_x| with a predetermined proportionality coefficient as Kr_x. Further, when the input value |Vover_x| is greater than a predetermined value, the processor 92_x outputs "1" as Kr_x. Further, the proportionality coefficient is set so that, when |Vover_x| matches with a predetermined value, the product of |Vover_x| and the proportionality coefficient equals 1.

Further, the procedure performed by the processors 90_y and 92_y is similar to the procedure performed by the processors 90_x and 92_x as described above.

According to the procedure performed by the gain adjusting unit 78, when a compulsory limitation is not imposed on the output values Vw_y_lim1 and Vw_y_lim1 by the limiting processor 86, the gain adjusting parameters Kr_x and Kr_y are both set to zero. In other words, when the rotational angular velocity of each of the electric motors 31R and 31L fall within the tolerable range under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the gain adjusting parameters Kr_x and Kr_y are both set to zero.

Meanwhile, when the output values Vw_x_lim1 and Vw_y_lim1 of the limiting processor 86 is generated by imposing a compulsory limitation on the input values Vb_x_s and Vb_y_s, the values of the gain adjusting parameters Kr_x and Kr_y are determined according to the absolute values of the correction amount Vover_x and Vover_y. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the values of the gain adjusting parameters Kr_x and Kr_y are determined according to the absolute values of the correction amount Vover_x and Vover_y. In this case, Kr_x is determined so that the value of Kr_x increases as the absolute value of the corrected value Vx_over increases, with "1" being the upper limit. This characteristic applies to Kr_y as well.

Returning to the description regarding FIG. 9, the control unit 50 performs the procedure of the center-of-gravity point velocity restrictor 76 after performing the procedure of the center-of-gravity velocity calculator 72 and the required center-of-gravity point velocity generator 74 as described earlier.

The center-of-gravity point velocity restrictor 76 receives an input of the center-of-gravity point velocity estimation value Vb_xy_s (Vb_x_s and Vb_y_s) computed by the center-of-gravity velocity calculator 72 and the required center-of-gravity point velocity V_xy_aim (V_x_aim and V_y_aim) determined in the required center-of-gravity point velocity generator 74. The center-of-gravity point velocity restrictor 76 uses these input values, and carries out the procedure shown in the block diagram in FIG. 12, thereby determining the target center-of-gravity point velocity for control V_xy_mdfd (V_x_mdfd and V_y_mdfd).

In particular, the center-of-gravity point velocity restrictor 76 first executes the procedure of the steady state error calculator 94_x and 94_y.

In this case, the steady state error calculator 94_x receives an input of the center-of-gravity point velocity estimation value Vb_x_s in the x axis direction. At the same time, the steady state error calculator 94_x receives an input of the previous value Vb_x_mdfd_p of the target center-of-gravity point velocity for control Vb_x_mdfd in the x axis direction via the delay element 96_x. In addition, the steady state error calculator 94_x first inputs Vb_x_s to the proportional-differential compensation element (PD compensation element) 94a_x. This proportional-differential compensation element 94a_x is a compensation element such that the transfer function is expressed by 1+Kd·S. The proportional-differential compensation element 94a_x adds the inputted Vb_x_s along with a value obtained by multiplying a predetermined coefficient Kd with the differential (temporal rate of change) of Vb_x_s, and outputs sum obtained by the addition.

Next, the steady state error calculator 94_x computes, via the calculator 94b_x, a value obtained by subtracting the inputted Vb_x_mdfd_p from the output value of the steady state error calculator 94_x. Then, the steady state error calculator 94_x inputs the output value of the calculator 94b_x to the low pass filter 94c_x comprising a phase compensation feature. This low pass filter 94c_x is a filter such that the transfer function is represented by (1+Tg2·S)/(1+Tg1·S). Furthermore, the steady state error calculator 94_x outputs the output value Vb_x_prd of the low pass filter 94c_x.

Furthermore, the center-of-gravity point velocity estimation value Vb_y_s in the y axis direction is inputted to the steady state error calculator 94_y. At the same time, the previous value Vb_y_mdfd_p of the target center-of-gravity point velocity for control Vb_y_mdfd in the y axis direction is inputted via the delay element 96_y.

Moreover, similar to the steady state error calculator 94_x described above, the steady state error calculator 94_y performs, in series, the processing of the proportional-differential compensation element 94a_y, the calculator 94b_y, and the low pass filter 94c_y. In this way, the steady state error calculator 94_y outputs the output value Vb_y_prd of the low pass filter 94c_y.

Here, the output value Vb_x_prd of the steady state error calculator 94_x refers to a steady state differential of the to-be-converged value of the future center-of-gravity point velocity estimation value in the x axis direction with respect to the target center-of-gravity point velocity for control Vb_x_mdfd, estimated by the current condition of the movement of the vehicle system center-of-gravity point seen from the y axis direction (i.e., the condition of the movement of the mass point 60_x of the inverted pendulum model seen from the y axis direction). At the same time, the output value Vb_y_prd of the steady state error calculator 94_y refers to a steady state differential of the to-be-converged value of the future center-of-gravity point velocity estimation value in the y axis direction with respect to the target center-of-gravity point velocity for control Vb_y_mdfd, estimated by the current condition of the movement of the vehicle system center-of-gravity point seen from the x axis direction (i.e., the condition of the movement of the mass point 60_y of the inverted pendulum model seen from the x axis direction). Hereinafter, the output values Vb_x_prd and Vb_y_prd of the steady state error calculators 94_x and 94_y are called the center-of-gravity point velocity steady state deviation estimation value.

The center-of-gravity point velocity limiting unit 76 performs the process of the steady state error calculators 94_x and 94_y as described above. Then, the center-of-gravity point velocity limiting unit 76 performs a procedure adding the required center-of-gravity point velocity Vb_x_aim to the output value Vb_x_prd of the steady state error calculator 94_x by the calculator 98_x. The center-of-gravity point velocity limiting unit 76 performs a procedure adding the required center-of-gravity point velocity Vb_y_aim to the output value Vb_y_prd of the steady state error calculator 94_y by the calculator 98_y.

Therefore, the output value Vb_x_t of the calculator 98_x becomes a velocity obtained by adding the required center-of-gravity point velocity Vb_x_aim in the x axis direction to the center if gravity velocity steady state deviation estimation value Vb_x_prd in the x axis direction. Similarly, the output value Vb_y_t of the calculator 98_y becomes a velocity obtained by adding the required center-of-gravity point velocity Vb_y_aim in the y axis direction to the center if gravity velocity steady state deviation estimation value Vb_y_prd in the x axis direction.

Further, when the operation mode of the vehicle 1 is in a autonomous mode and the like, and the required center-of-gravity point velocity Vb_x_aim in the x axis direction is zero, the center-of-gravity point velocity steady state deviation estimation value Vb_x_prd in the x axis direction becomes the output value Vb_x_t of the calculator 98_x. Similarly, when the required center-of-gravity point velocity Vb_y_aim in the y axis direction becomes zero, the center-of-gravity point velocity steady state deviation estimation value Vb_y_prd in the y axis direction becomes the output value Vb_y_t of the calculator 98_y.

Next, the center-of-gravity point velocity restrictor 76 enters the output values Vb_x_t and Vb_y_t of the calculators 98_x and 98_y to the limiting processor 100. The procedure executed by the limiting processor 100 is the same as the procedure executed by the limiting processor 86 of the gain adjusting unit 78. In this case, as indicated by the parenthesized reference numerals shown in FIG. 11, only the input value and the output value of each processors of the limiting processor 100 differs from the limiting processor 86.

In particular, according to the limiting processor 100, the processors 86a_x and 86a_y each computes the rotational angular velocities ωw_x_t and ωw_y_t of the imaginary wheels 62_x and 62_y in a case in which the velocities Vw_x and Vw_y of the imaginary wheels 62_x and 62_y are matched with Vb_x_t and Vb_y_t. In addition, the pair of rotational angular velocities ωw_x_t and ωw_y_t are converted to a pair of rotational angular velocities ω_R_t and ω_L_t of the electric motors 31R and 31L by the XY-RL converter 86b.

Further, these rotational angular velocities ω_R_t and ω_L_t are respectively limited to a value within a tolerable range for the right motor and a value within a tolerable range for the left motor, due to the limiters 86c_R and 86c_L. Further, the values ω_R_lim2 and ω_L_lim2 obtained after this limitation process are converted to the rotational angular velocities ωw_x_lim2 and ωw_y_lim2 of the imaginary wheels 62_x and 62_y by the RL-XY converter 86d.

Next, the velocities Vw_x_lim2 and Vw_y_lim2 of each of the imaginary wheels 62_x and 62_y corresponding to each of the rotational angular velocities ωw_x_lim2 and ωw_y_lim2 are computed respectively by the processors 86e_x and 86e_y. These velocities Vw_x_lim2 and Vw_y_lim2 are outputted by the limiting processor 100.

Due to the procedure executed by the limiting processor 100, in a manner similar to the limiting processor 86, under the compulsory, necessary condition that each of the rotational angular velocities of the electric motors 31R and 31L corresponding to the pair of output values Vw_x_lim2 and Vw_y_lim2 is not outside of the tolerable range, the limiting processor 100 generates a pair of output values Vw_x_lim2 and Vw_y_lim2 so that each of the output values Vw_x_lim2 and Vw_y_lim2 is matched respectively with Vb_x_t and Vb_y_t to the extent possible under the above necessary condition.

Incidentally, each of the tolerable range for the right motor and the left motor regarding the limiting processor 100 need not be the same as each of the tolerable range for the right motor and the left motor regarding the limiting processor 86. Different tolerable ranges may be set for the limiting processors 86 and 100.

Figure 12:
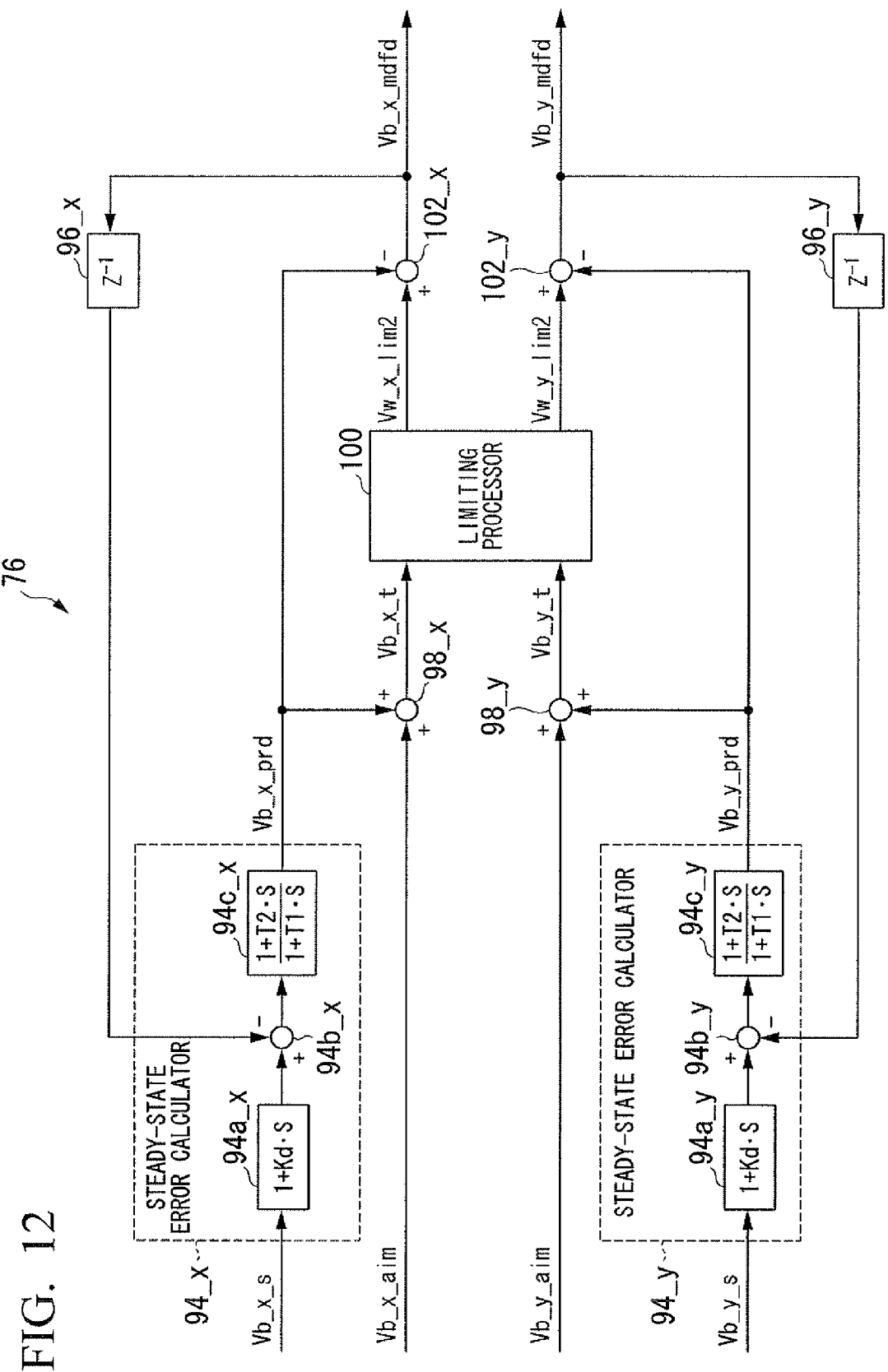
FIG. 12 is a block diagram showing a processing of a center-of-gravity point velocity limiting unit 76 shown in FIG. 9.

Returning to the description of FIG. 12, the center-of-gravity point velocity restrictor 76 computes the target center-of-gravity point velocities for control Vb_x_mdfd and Vb_y_mdfd, by performing the procedure of the calculators 102_x and 102_y. In this case, the calculator 102_x computes the target center-of-gravity point velocity for control Vb_x_mdfd in the x axis direction as a value obtained by subtracting the center-of-gravity point velocity steady state deviation estimation value Vb_x_prd in the x axis direction from the output value Vw_x_lim2 of the limiting processor 100. Similarly, the calculator 102_y computes the target center-of-gravity point velocity for control Vb_y_mdfd in the y axis direction as a value obtained by subtracting the center-of-gravity point velocity steady state deviation estimation value Vb_y_prd in the y axis direction from the output value Vw_y_lim2 of the limiting processor 100.

When a compulsory limitation is not imposed on the output values V_x_lim2 and V_y_lim2 by the limiting processor 100, the target center-of-gravity point velocity for control Vb_x_mdfd and Vb_y_mdfd determined as described above is set to be equal to the required center-of-gravity point velocity Vb_x_aim and Vb_y_aim. In other words, when the rotational angular velocity of each of the electric motors 31R and 31L fall within the tolerable range under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd and Vb_y_mdfd is set to be equal to the required center-of-gravity point velocity Vb_x_aim and Vb_y_aim.

Incidentally, in this case, when the required center-of-gravity point velocity Vb_x_aim in the x axis direction equals zero, the target center-of-gravity point velocity for control Vb_x_mdfd in the x axis direction also equals zero as well. Further, when the required center-of-gravity point velocity Vb_y_aim in the y axis direction equals zero, the target center-of-gravity point velocity for control Vb_y_mdfd in the y axis direction also equals zero as well.

Meanwhile, when the output values Vw_x_lim2 and Vw_y_lim2 of the limiting processor 100 is generated by imposing a compulsory limitation on the input values Vb_x_t and Vb_y_t, the target center-of-gravity point velocity for control Vb_x_mdfd in the x axis direction is determined to be a value obtained by correcting the required center-of-gravity point velocity Vb_x_aim by a correction amount of the output value Vw_x_lim2 of the limiting processor 100 with respect to the input value Vb_x_t (=Vw_x_lim2−Vb_x_t). Thus, the value is obtained by adding the correction amount to Vb_x_aim. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd in the x axis direction is determined to be a value obtained by correcting the required center-of-gravity point velocity Vb_x_aim by the correction amount described above.

Further, regarding the y axis direction, the target center-of-gravity point velocity for control Vb_y_mdfd in the y axis direction is determined to be a value obtained by correcting the required center-of-gravity point velocity Vb_y_aim by a correction amount of the output value Vw_y_lim2 of the limiting processor 100 with respect to the input value Vb_y_t (=Vw_y_lim2−Vb_y_t). Thus, the value is obtained by adding the correction amount to Vb_y_aim.

In this case, regarding the velocity in the x axis direction for example, when the required center-of-gravity point velocity Vb_x_aim is not zero, the target center-of-gravity point velocity for control Vb_x_mdfd either approaches zero to a greater extent compared to the required center-of-gravity point velocity Vb_x_aim, or becomes a velocity facing the opposite direction with respect to the required center-of-gravity point velocity Vb_x_aim. Further, when the required center-of-gravity point velocity Vb_x_aim equals zero, the target center-of-gravity point velocity for control Vb_x_mdfd becomes a velocity facing the opposite direction with respect to the center-of-gravity point velocity steady state deviation estimation value Vb_x_prd in the x axis direction outputted by the steady state error calculator 94_x. These characteristics apply to the velocity in the y axis direction.

The center-of-gravity point velocity limiting unit 76 executes the procedure as described above.

Returning to the description regarding FIG. 9, the control unit 50 performs the procedure of the posture control calculator 80 after performing the procedure of the center-of-gravity velocity calculator 72, the center-of-gravity point velocity restrictor 76, the gain adjusting unit 78, and the error calculator 70 as described earlier.

The procedure of the posture control calculator 80 is described below with reference to FIG. 13.

Figure 13:
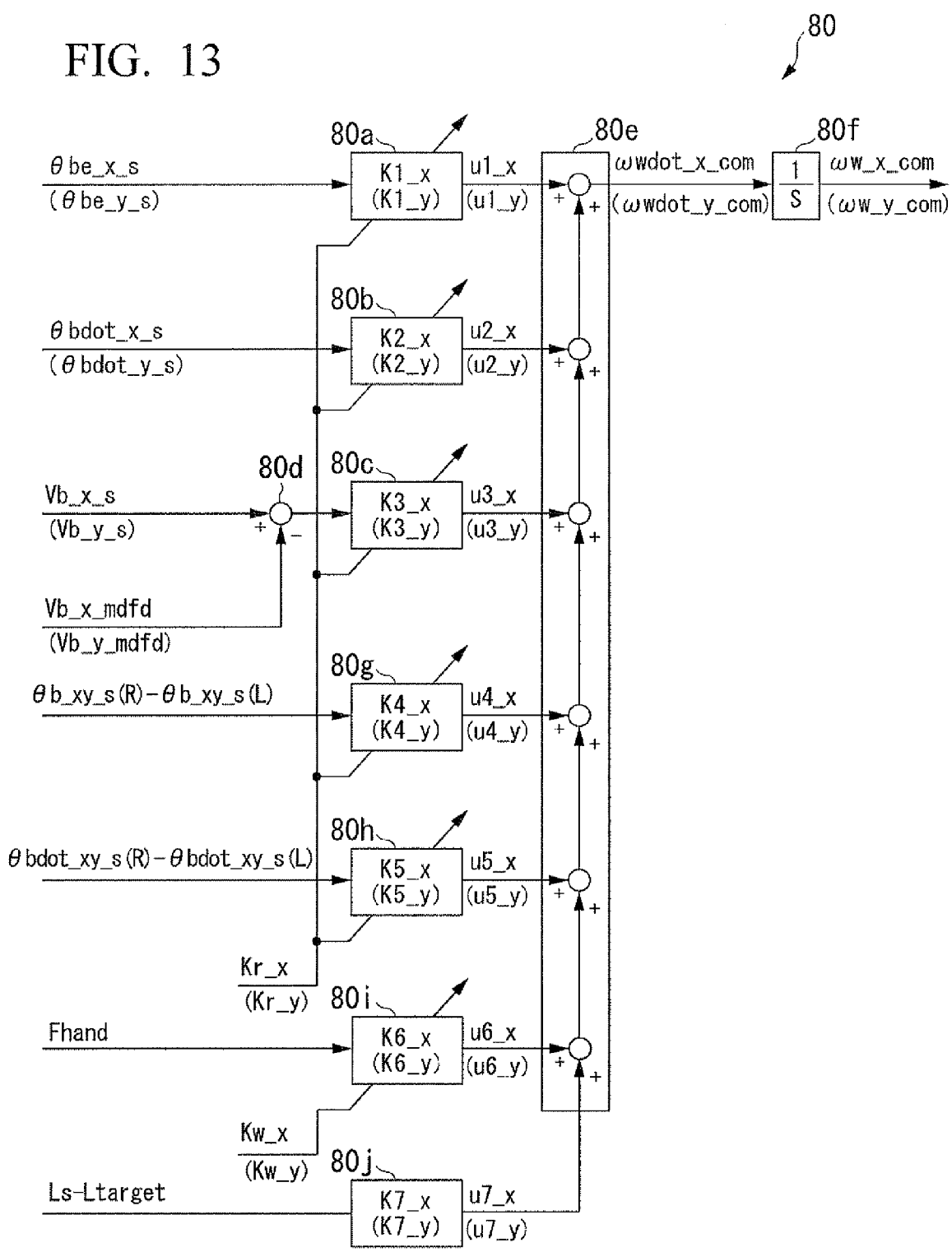
FIG. 13 is a block diagram showing a processing of a posture control calculator 80 shown in FIG. 9.

Incidentally, in FIG. 13, the components with reference numerals 80a-80f are components relating to a basic movement control of the inverted pendulum type moving body according to the present embodiment as an omnidirectional vehicle. The components with the other reference numerals 80g-80j are components relating to an alignment movement of the inverted pendulum according to the present embodiment. Here, among the components in FIG. 13, a description is provided regarding the components relating to the basic movement control as an omnidirectional vehicle. A detailed description of the components relating to an alignment movement is provided later in the section entitled "2. Technology For Motion In Alignment."

In addition, in FIG. 13, the reference numeral without a parenthesis relates to a procedure determining the imaginary wheel rotational angular velocity command ωw_x_cmd, which is a target value of the rotational angular moving velocity of the imaginary wheel 62_x rolling in the x axis direction. The parenthesized reference numeral relates to a procedure determining the imaginary wheel rotational angular velocity command ωw_y_cmd, which is a target value of a rotational angular moving velocity of the imaginary wheel 62_y rolling in the y axis direction.

The posture control calculator 80 receives an input of the base body tilt angle deviation observed value θbe_xy_s computed by the error calculator 70, the base body tilting angular velocity observed value θbdot_xy_s computed in step S2, a center-of-gravity point velocity estimation value Vb_xy_s computed by the center-of-gravity velocity calculator 72, the target center-of-gravity point velocity Vb_xy_cmd computed by the center-of-gravity point velocity restrictor 76, and the gain adjusting parameter Kr_xy computed by the gain adjusting unit 78.

Incidentally, in addition to the inputs described above, the posture control calculator receives the following input for controlling the movement in alignment: the deviation (θb_xy_s(R)−θb_xy_s(L)) of the base body tilting angular observed value computed by the error calculator 702 described later in FIG. 9; the deviation (θbdot_xy_s(R)−θbdot_xy_s(L)) of the base body tilting angular velocity observed value computed by the error calculator 703; a deviation in distance ($L_s - L_{target}$) computed by the error calculator 705; the value of the external force Fhand detected by the external force sensor 706; and the gain Kw_xy generated by the gain adjustor 708. Details regarding these characteristics are described in the section entitled "2. Technology For Motion In Alignment." Here, for ease of explanation, a description is provided without taking into consideration the input values for controlling the alignment movement.

The posture control calculator 80 first uses these input values (excluding the input values for controlling the alignment movement) to compute the imaginary wheel rotational angular acceleration command ωwdot_xy_cmd based on the following equations 07x and 07y.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{(equation 07x)}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{(equation 07y)}$$

Therefore, according to the present embodiment, the imaginary wheel rotational angular acceleration command ωwdot_x_cmd and the imaginary wheel rotational angular acceleration command ωwdot_y_cmd are both determined by adding up three elements of an operational amount (the three terms in the right side of the equations 07x and 07y). The imaginary wheel rotational angular acceleration command ωwdot_x_cmd is an operational amount (control input) for controlling the movement of the mass point 60_x of the inverted pendulum type model seen from the y axis direction (i.e., the movement of the vehicle system center-of-gravity point seen from the y axis direction). The imaginary wheel rotational angular acceleration command ωwdot_y_cmd is an operational amount (control input) for controlling the movement of the mass point 60_y of the inverted pendulum type model seen from the x axis direction (i.e., the movement of the vehicle system center-of-gravity point seen from the x axis direction).

In this case, the gain coefficients K1_x, K2_x, and K3_x relating to each element of the manipulated variable in the equation 07x is set variably according to the gain adjustment parameter Kr_x. The gain coefficients K1_y, K2_y, and K3_y relating to each element of the manipulated variable in equation 07y are set variably according to the gain adjustment parameter Kr_y. Hereinafter, each of the gain coefficients K1_x, K2_x, and K3_x in equation 07x may be referred to as the first gain coefficient K1_x, the second gain coefficient K2_x, and the third gain coefficient K3_x. This characteristic applies to the gain coefficients K1_y, K2_y, and K3_y in equation 07y as well.

The i-th gain coefficient Ki_x (i=1, 2, 3) in equation 07x and the i-th gain coefficient Ki_y (i=1, 2, 3) in equation 07y are determined, as indicated in the comments shown in FIG. 13, according to the gain adjustment parameters Kr_x and Kr_y based on the following equations 09x and 09y.

$$Ki\_x = (1 - Kr\_x) \cdot Ki\_a\_x + Kr\_x \cdot Ki\_b\_x \quad \text{(equation 09x)}$$

$$Ki\_y = (1 - Kr\_y) \cdot Ki\_a\_y + Kr\_y \cdot Ki\_b\_y \quad \text{(equation 09y)}$$

(i=1,2,3)

Here, Ki_a_x and Ki_b_x in equation 09x are constant values predetermined as a gain coefficient value at the side of the minimum value of the i-th gain coefficient Ki_x (closer to the "0" side) and a gain coefficient value at the side of the maximum value of the i-th gain coefficient Ki_x (toward the side moving away from "0"). This characteristic applies to Ki_a_y and Ki_b_y in equation 09y.

Therefore, each of the i-th gain coefficient Ki_x (i=1, 2, 3) used in the equation 07x is determined as a weighted average of the constants Ki_a_x and Ki_b_x corresponding to each of the i-th gain coefficient Ki_x. Further, in this case, the weight on each of Ki_a_x and Ki_b_x is varied according to the gain adjustment parameter Kr_x. Therefore, in the case of Kr_x=0, Ki_x becomes equal to Ki_a_x. In the case of Kr_x=1, Ki_x becomes equal to Ki_b_x. Further, as Kr_x becomes closer to "1" from "0," the i-th gain coefficient Ki_x becomes closer to Ki_b_x from Ki_a_x.

Similarly, each of the i-th gain coefficient Ki_y (i=1, 2, 3) used in the equation 07y is determined as a weighted average of the constants Ki_a_y and Ki_b_y corresponding to each of the i-th gain coefficient Ki_y. Further, in this case, the weight on each of Ki_a_y and Ki_b_y is varied according to the gain adjustment parameter Kr_y. Therefore, in a case similar to Ki_x, as the value of Kr_y varies between "0" and "1," the value of the i-th gain coefficient Ki_y varies between Ki_a_y and Ki_b_y.

To supplement, the constant values Ki_a_x, Ki_b_x, Ki_a_y, and Ki_b_y (i=1, 2, 3) are included in the constant parameters whose values are determined in step S6 or S8.

The posture control calculator 80 performs the computation in the equation 07x using the first to third gain coefficients K1_x, K2_x, and K3_x determined as described above. In this way, the posture control calculator 80 computes the imaginary wheel rotational angular acceleration command ωwdot_x_cmd relating to the imaginary wheel 62_x rotating in the x axis direction.

In further detail, in reference to FIG. 13, the posture control calculator 80 computes the manipulated variable component u1_x and the manipulated variable component u2_x respectively in the processors 80a and 80b. The manipulated variable component u1_x is obtained by multiplying the first gain coefficient K1_x with the base body tilt angle deviation observed value θbe_x_s. The manipulated variable component u2_x is obtained by multiplying the base body tilting angular velocity observed value θbdot_x_s with the second gain coefficient K2_x. Furthermore, the posture control calculator 80 computes the deviation between the center-of-gravity point velocity estimation value Vb_x_s and the target center-of-gravity point velocity for control Vb_x_mdfd (=Vb_x_s−Vb_x_mdfd) at the calculator 80d. The posture control calculator 80 then computes the manipulated variable element u3_x at the processor 80c obtained by multiplying the deviation with the third gain coefficient K3_x. Further, the posture control calculator 80 computes the imaginary wheel rotational angular acceleration command ωwdot_x_cmd by adding up these manipulated variable components u1_x, u2_x, and u3_x at the calculator 80e.

Similarly, the posture control calculator 80 performs the computation of the equation 07y by using the first to third gain coefficients K1_y, K2_y, and K3_y determined as described above. In this way, the posture control calculator 80 computes the imaginary wheel rotational angular acceleration command ωwdot_y_cmd concerning the imaginary wheel 62_y rolling in the y axis direction.

In this case, the posture control calculator 80 computes the manipulated variable component u1_y and the manipulated variable component u2_y respectively in the processors 80a and 80b. The manipulated variable component u1_y is obtained by multiplying the first gain coefficient K1_y with the base body tilt angle deviation observed value θbe_y_s. The manipulated variable component u2_y is obtained by multiplying the base body tilting angular velocity observed value θbdot_y_s with the second gain coefficient K2_y. Furthermore, the posture control calculator 80 computes the deviation between the center-of-gravity point velocity estimation value Vb_y_s and the target center-of-gravity point velocity for control Vb_y_mdfd (=Vb_y_s−Vb_y_mdfd) at the calculator 80d. The posture control calculator 80 then computes the manipulated variable element u3_y at the processor 80c obtained by multiplying the deviation with the third gain coefficient K3_y. Further, the posture control calculator 80 computes the imaginary wheel rotational angular acceleration command ωwdot_x_cmd by adding up these manipulated variable components u1_y, u2_y, and u3_y at the calculator 80e.

Here, the first element (=the first manipulated variable component u1_x) and the second element (=the second manipulated variable component u2_x) of the right side of the equation 07x is a feedback manipulated variable element for converging the base body tilting angular deviation observed value θbe_x_s around the y axis direction to zero according to the PD law (proportional-differential law), being the feedback control law. In other words, the base body tilt angle observed value θb_x_s is converged to the target value θb_x_obj.

Further, the third element (=the third manipulated variable component u3_x) of the right side of the equation 07x is a feedback manipulated variable element for converging the deviation between the center-of-gravity point velocity estimation value Vb_x_s and the target center-of-gravity point velocity Vb_x_mdfd to zero according to the proportionality law being the feedback control law. In other words, Vb_x_s is converged to Vb_x_mdfd.

These characteristics apply to the first to third elements (the first to third manipulated variable components u1_y, u2_y, and u3_y) of the right side of the equation 07y as well.

As described above, the posture control calculator 80 computes the imaginary wheel rotational velocity commands ωw_x_cmd and ωw_y_cmd by first computing the imaginary wheel rotational angular acceleration commands ωwdot_x_cmd and ωwdot_y_cmd, then integrating ωwdot_x_cmd and ωwdot_y_cmd by the integrator 80f.

Above is a detailed description of the processing by the posture control calculator 80, excluding the processing relating to the alignment movement.

In particular, the imaginary wheel rotational angular acceleration command ωwdot_x_cmd may be computed based on an equation obtained by separating the third element of the right side of the equation 07x to the manipulated variable component according to Vb_x_s (=K3_x·Vb_x_s) and the manipulated variable component according to Vb_x_mdfd (=−K3_x·Vb_x_mdfd). Similarly, the imaginary wheel rotational angular acceleration command ωwdot_x_cmd may be computed by the equation obtained by separating the third element of the right side of the equation 07x to the manipulated variable component according to Vb_y_s (=K3_y·Vb_y_s) and the manipulated variable component according to Vb_y_mdfd (=−K3_y·Vb_y_mdfd).

Further, in the present embodiment, the rotational angular acceleration commands ωw_x_cmd and ωw_y_cmd of the imaginary wheel 62_x and 62_y was used as the operational amount (control input) for controlling the behavior of the vehicle system center-of-gravity point. However, it is possible to use the driving torque of the imaginary wheels 62_x and 62_y or a translational force obtained by multiplying the driving torque with the radius Rw_x and Rw_y of the imaginary wheels 62_x and 62_y. Here, the translational force is the frictional force between the floor surface and the imaginary wheels 62_x and 62_y.

Returning to the description of FIG. 9, the control unit 50 next inputs the imaginary wheel rotational velocity commands ωw_x_cmd and ωw_y_cmd, determined at the posture control calculator 80 as described above, into the motor command calculator 82, and then executes the processing of this motor command calculator 82. In this way, the velocity command ω_R_cmd of the electric motor 31R and the velocity command ω_L_cmd of the electric motor 31L are determined The processing of this motor command calculator 82 is the same as the processing of the XY-RL converter 86b of the limiting processor 86 (see FIG. 11).

In particular, the motor command calculator 82 determines the velocity commands ω_R_cmd and ω_L_cmd of the electric motors 31R and 31L by solving the simultaneous equation of the unknowns ω_R_cmd and ω_L_cmd obtained by replacing the variables ωw_x, ωw_y, ω_R, and ω_L in the equations 01a and 01b into ωw_x_cmd, w_y_cmd, ω_R_cmd, and ω_L_cmd.

In this way, the computational processing for controlling the vehicle in step S9 is completed.

By executing the control computational process by the control unit 50 as described above, the imaginary wheel rotational angular acceleration command ωwdot_xy_cmd is determined as the operational amount (control input), so that, in both the boarding mode and the autonomous mode, the posture of the base body 9 is generally maintained so that both of the base body tilt angle deviation observed value θbe_x_s and θbe_y_s are equal to zero (this posture is hereinafter referred to as the basic posture). In other words, ωwdot_xy_cmd is maintained so that the position of the vehicle system center-of-gravity point (the vehicle/occupant integrated center-of-gravity point or the singular vehicle body center-of-gravity point) is placed approximately right above the surface at which the wheel assembly 5 contacts the ground surface. In more detail, the imaginary wheel rotational angular acceleration command ωwdot_xy_cmd is determined so that the posture of the base body 9 is maintained at the basic posture while the center-of-gravity point velocity estimation value Vb_xy_s as the velocity of the vehicle system center-of-gravity point is converged to the target center-of-gravity point velocity for control Vb_xy_mdfd. Incidentally, the target center-of-gravity point velocity for control Vb_xy_mdfd is normally zero (as long as the occupant, etc. does not apply an additional impellent force on the vehicle 1 in the boarding mode). In this case, the imaginary wheel rotational angular acceleration command ωwdot_xy_cmd is determined so that the posture of the base body 9 is maintained at the basic posture, and that the vehicle system center-of-gravity point is generally static.

Further, the rotational angular velocity of the electric motors 31R and 31L, obtained by converting the imaginary wheel rotational angular velocity command ωw_xy_cmd obtained by integrating each element of ωwdot_xy_cmd, is determined as the velocity commands ω_R_cmd and ω_L_cmd of the electric motors 31R and 31L. Further, according to this velocity commands ω_R_cmd and ω_L_cmd, the rotational velocity of each of the electric motors 31R and 31L is controlled. Furthermore, the velocity of the wheel assembly 5 in the x axis direction and the y axis direction is controlled so as to match respectively the moving velocity of the imaginary wheel 62_x corresponding to ωw_x_cmd, and the moving velocity of the imaginary wheel 62_y corresponding to ωw_y_cmd.

Therefore, for example, around the y axis direction, when the actual base body tilt angle θb_x deviates so as to tilt forward with respect to the target value θb_x_obj, the wheel assembly 5 moves forward so as to cancel out the deviation (i.e., so as to converge θbe_x_s to zero). Similarly, when the actual θb_x deviates so as to tilt backward with respect to the target value θb_x_obj, the wheel assembly 5 moves backward so as to cancel out the deviation (i.e., so as to converge θbe_x_s to zero).

In addition, for example, around the x axis direction, when the actual base body tilt angle θb_y deviates so as to tilt toward the right with respect to the target value θb_y_obj, the wheel assembly 5 moves toward the right so as to cancel out the deviation (i.e., so as to converge θbe_y_s to zero). Similarly, when the actual θb_y deviates so as to tilt toward the left with respect to the target value θb_y_obj, the wheel assembly 5 moves toward the left so as to cancel out the deviation (i.e., so as to converge θbe_y_s to zero).

Further, when both of the base body tilt angles θb_x and θb_y deviates respectively from the target values θb_x_obj and θb_y_obj, the movement of the wheel assembly 5 in the front and back directions for canceling out the deviation in θb_x and the movement of the wheel assembly 5 in the left and right directions for cancelling out the deviation in θb_y are combined. The wheel assembly 5 moves in the synthetic direction of the x axis direction and the y axis direction. This synthetic direction refers to a direction tilting with respect to both the x axis direction and the y axis direction.

In this way, when the base body 9 tilts with respect to the base body, the wheel assembly 5 moves in a direction towards which the base body 9 is tilting. Therefore, when, in a boarding mode for example, the occupant tilts his or her upper body intentionally, the wheel assembly 5 moves in a direction in which the tilting occurs.

Incidentally, when the target center-of-gravity point velocity for control Vb_x_mdfd and Vb_y_mdfd equals zero, and when the posture of the base body 9 converges to the basic posture, the movement of the wheel assembly 5 also halts. In addition, for example, when the tilt angle θb_x of the base body 9 in a direction around the y axis is maintained at a constant angle tilting from the basic posture, the velocity of the wheel assembly 5 in the x axis direction converges to the constant velocity corresponding to the angle. This velocity comprises a certain steady state deviation with respect to the target center-of-gravity point velocity for control Vb_x_mdfd. This characteristic applies when the tilt angle θb_y of the base body 9 around the x axis direction is maintained at a certain angle tilting from the basic posture.

In addition, for instance, when both of the required center-of-gravity point velocities Vb_x_aim and Vb_y_aim generated by the required center-of-gravity point velocity generator 74 are zero, when the amount of tilting of the base body 9 from the basic posture 9 (the base body tilt angle deviation observed value θbe_x_s and θbe_y_s) becomes relatively large, and when one or both velocities of the wheel assembly 5 in the x axis direction or the y axis direction necessary to cancel out the tilting or to maintain that amount of tilting (these velocities respectively correspond to the center-of-gravity point velocity steady state deviation estimation value Vb_x_prd and Vb_y_prd shown in FIG. 12) becomes too large so that one or both of the rotational angular velocities of the electric motors 31R, 31L will exceed the tolerable range, a velocity (in particular, Vw_x_lim2−Vb_x_prd and Vw_y_lim2−Vb_y_prd) in a direction opposite to the velocity of the wheel assembly 5 will be determined as a target center-of-gravity point velocity for control Vb_x_mdfd and Vb_y_mdfd. Furthermore, the manipulated variable components u3_x and u3_y amount the manipulated variable components comprised in the control input are determined so that the center-of-gravity point velocity estimation value Vb_x_s and Vb_y_s are respectively converged to the target center-of-gravity point velocity for control Vb_x_mdfd and Vb_y_mdfd. As a result, the base body 9 is prevented from tilting too far from the basic posture. In addition, one or both of the rotational angular velocities of the electric motors 31R, 31L is prevented from being too large.

In addition, at the gain adjusting unit 78, when one or both of the center-of-gravity point velocity estimation value Vb_x_s and Vb_y_s becomes large, and when one or both velocities of the wheel assembly 5 in the x axis direction and the y axis direction necessary to cancel out the tilting of the base body 9 from the basic posture or to maintain that amount of tilting becomes too large so that one or both of the rotational angular velocities of the electric motors 31R, 31L will exceed the tolerable range, one or both of the gain adjustment parameter Kr_x and Kr_y comes closer to 1 from 0 as the amount of the rotational angular velocity exceeding the tolerable range becomes strikingly large (in particular, as the absolute value of the Vover_x and Vover_y shown in FIG. 10 becomes large).

In this case, each of the i-th gain coefficient Ki_x (i=1, 2, 3) computed by the equation 09x becomes closer to the constant Ki_b_x at the maximum side from the constant Ki_a_x at the minimum side, as Kr_x approaches 1. This characteristic applies to each of the i-th gain coefficients Ki_y (i=1, 2, 3) computed by the equation 09y.

Further, because the absolute value of the gain coefficient becomes large, the sensitivity of the manipulated variable (the imaginary wheel rotational angular acceleration commands ωwdot_x_cmd and ωwdot_y_cmd) with respect to the change in the tilting of the base body 9 becomes high. Therefore, when the amount of tilting from the basic posture of the base body 9 becomes large, the velocity of the wheel assembly 5 will be controlled in order to swiftly resolve the large tilting. Therefore, the large tilting of the base body 9 from the basic posture is strongly restrained. Further, one or both of the velocities of the wheel assembly 5 in the x axis direction or the y axis direction is prevented from becoming too large so as to make one or both of the rotational angular velocities of the electric motors 31R, 31L deviate from the tolerant range.

Further, in the boarding mode, when the required center-of-gravity point velocity generator 74 generates a required center-of-gravity point velocity Vb_x_aim, Vb_y_aim (a required center-of-gravity point velocity such that one or both of the gravity velocities Vb_x_aim and Vb_y_aim is not "0") according to a request based on the driving operation of the occupant, the required center-of-gravity point velocities Vb_x_aim, Vb_y_aim are determined respectively as the target center-of-gravity point velocity for control Vb_x_mdfd and Vb_y_mdfd, as long as one or both of the rotational angular velocities of the electric motors 31R, 31L does not become a large rotational angular velocity so as to exceed the tolerant range (in particular, as long as Vw_x_lim2 and Vw_y_lim2 indicated in FIG. 12 respectively matches Vb_x_t and Vb_y_t). Therefore, the velocity of the wheel assembly 5 is controlled so as to attain the required center-of-gravity point velocity Vb_x_aim and Vb_y_aim (i.e., so that the actual center-of-gravity point velocity approaches the required center-of-gravity point velocities Vb_x_aim and Vb_y_aim).

Next, the processing by the required center-of-gravity point velocity generator 74 is described, which was mentioned briefly earlier.

According to the present embodiment, the required center-of-gravity point velocity generator 74 sets the required center-of-gravity point velocity Vb_x_aim and Vb_y_aim to zero as described above.

Meanwhile, when the operation mode of the vehicle 1 is in a boarding mode, the required center-of-gravity point velocity generator 74 determines the required center-of-gravity point velocity Vb_x_aim and Vb_y_aim, according to the driving operation of the vehicle 1 by the occupant and the like (i.e., an operation applying an impellent force to the vehicle 1), which is estimated to be necessary by the driving operation.

Here, for example, when the vehicle 1 is starting, and when the occupant of vehicle 1 tries to actively increase the velocity of the vehicle 1 (the velocity of the vehicle system center-of-gravity point), an impellent force is provided by the occupant kicking the floor with his or her foot in order to increase the velocity at which the vehicle 1 moves. This impellent force is due to the frictional force between the back side of the occupant's foot and the floor. Alternatively, for example, according to the request by the occupant of vehicle 1, an outside supporter and the like may add an impellent force to the vehicle 1 in order to increase the velocity of the vehicle 1.

In this case, the required center-of-gravity point velocity generator 74 determines whether or not a request for an acceleration has been made as a request to increase the velocity of vehicle 1 based on the temporal rate of change of the magnitude (absolute value) of the actual velocity vector of the vehicle system center-of-gravity point (hereinafter referred to as the center-of-gravity point velocity vector ↑Vb). Accordingly, the required center-of-gravity point velocity generator 74 sequentially determines the required center-of-gravity point velocity vector ↑Vb_aim as a target value of ↑Vb. Here, the required center-of-gravity point velocity vector ↑Vb_aim is a velocity vector having two elements of the required center-of-gravity point velocity Vb_x_aim and Vb_y_aim.

Describing the procedure in general terms, when the request for acceleration occurs, the required center-of-gravity point velocity vector ↑Vb_aim is determined so as to increase the magnitude of the required center-of-gravity point velocity vector ↑Vb_aim until the acceleration request is met. Further, when the acceleration request is met, the required center-of-gravity point velocity vector ↑Vb_aim is determined so that the magnitude of the required center-of-gravity point velocity vector ↑Vb_aim is reduced in series. In this case, according to the present embodiment, the magnitude of the required center-of-gravity point velocity vector ↑Vb_aim is basically held constant for a predetermined amount of time after the request for acceleration is met. Then, the magnitude of the required center-of-gravity point velocity vector ↑Vb_aim is thereafter diminished continuously to zero. Incidentally, during this diminishing phase, the direction of the required center-of-gravity point velocity vector ↑Vb_aim approaches the x axis direction where appropriate.

The required center-of-gravity point velocity generator 74, performing the procedures described above, is described in detail below with reference to the flow chart FIG. 14-20.

Figure 14:
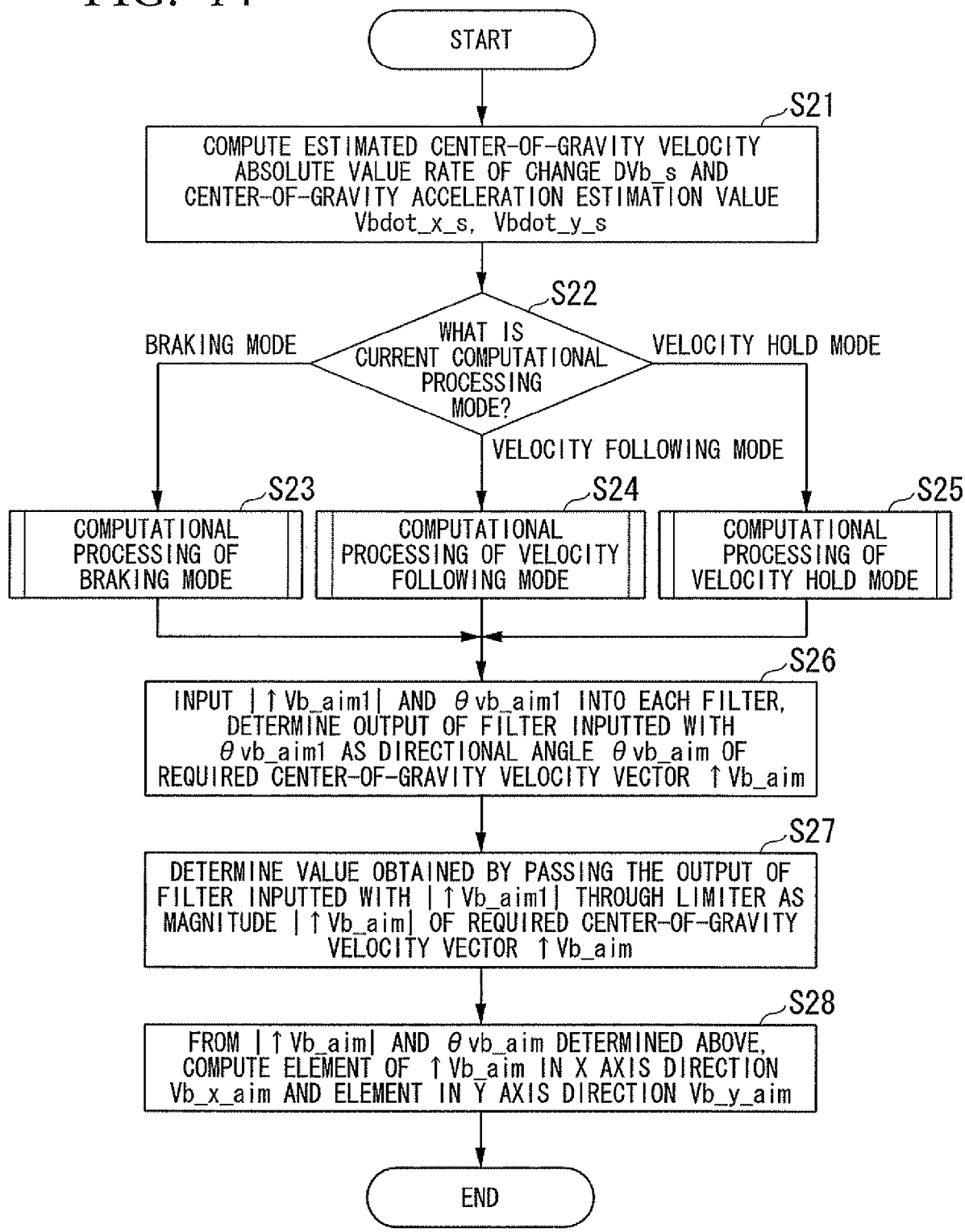
FIG. 14 is a flowchart showing a processing of a required center-of-gravity point velocity generator 74 shown in FIG. 9.

Referring to FIG. 14, the required center-of-gravity point velocity generator 74 first executes the procedure in step S21. According to this procedure, the required center-of-gravity point velocity generator 74 computes a temporal rate of change (differential value) DVb_s of the magnitude |↑Vb_s| (=sqrt (Vb_x_s$^2$+Vb_y_s$^2$)) of the estimated center-of-gravity point velocity vector ↑Vb_s, which is a velocity vector having the inputted center-of-gravity point velocity estimation values Vb_x_s and Vb_y_s as two components (the observed value of the actual center-of-gravity point velocity vector ↑Vb). This DVb_s refers to the observed value of the temporal rate of change of the magnitude of the actual center-of-gravity point velocity vector ↑Vb (estimation value). Hereafter, DVb_s is referred to as the estimated center-of-gravity point velocity absolute value rate of change DVb_s. Incidentally, the notation sqrt( ) refers to a square root function.

Further, in step S21, the required center-of-gravity point velocity generator 74 computes a center-of-gravity point acceleration estimation value Vbdot_x_s and Vvdot_y_s, which is a temporal rate of change (differential value) of each of the center-of-gravity point velocity estimation values Vb_x_s and Vb_y_s which is inputted. Incidentally, the vector comprising the two elements Vbdot_x_s and Vbdot_y_s refers to an actual observed value of the acceleration vector of the center-of-gravity point of the vehicle system.

Next, moving on to step S22, the required center-of-gravity point velocity generator 74 determines which mode the current computational processing mode is for computing the required center-of-gravity point velocity Vb_x_aim.

Here, according to the present embodiment, the required center-of-gravity point velocity generator 74 determines the required center-of-gravity point velocity vector ↑Vb_aim, after determining the base value of the required center-of-gravity point velocity vector ↑Vb_aim (hereinafter may be referred to as the base required center-of-gravity point velocity vector ↑Vb_aim1), so that the required center-of-gravity point velocity vector ↑Vb_aim follows the base required center-of-gravity point velocity vector ↑Vb_aim1 (i.e., so that the required center-of-gravity point velocity vector ↑Vb_aim steadily matches with the base required center-of-gravity point velocity vector ↑Vb_aim1).

The computation processing mode represents a type of procedure for determining the base required center-of-gravity point velocity vector ↑Vb_aim1. Further, according to the present embodiment, the computational processing mode includes three kinds of modes: the braking mode, the velocity following mode, and the velocity hold mode.

The braking mode is a mode such that the magnitude of the base required center-of-gravity point velocity vector ↑Vb_aim1 is diminished to "0," or the ↑Vb_aim1 is determined so as to keep the magnitude to zero. Further, the velocity following mode is a mode such that the base required center-of-gravity point velocity vector ↑Vb_aim1 is determined to follow the estimated center-of-gravity point velocity vector ↑Vb_s. Further, the velocity hold mode is a mode such that ↑Vb_aim1 is determined so as to keep the magnitude of the base required center-of-gravity point velocity vector ↑Vb_aim1.

Incidentally, the computational processing mode (initial computational processing mode) when the control unit 50 is initialized during a start up of the control unit 50 is the braking mode.

In the step S22 above, the required center-of-gravity point velocity generator 74 next performs the computational processing of step S23, the computational processing of step S24, and the computational processing of step S25 in respectively the cases in which the current computational processing mode is a braking mode, velocity following mode, and a velocity hold mode. In this way, the required center-of-gravity point velocity generator 74 determines the base required center-of-gravity point velocity vector ↑Vb_aim1.

The computational process corresponding to each mode is executed as follows.

Figure 15:
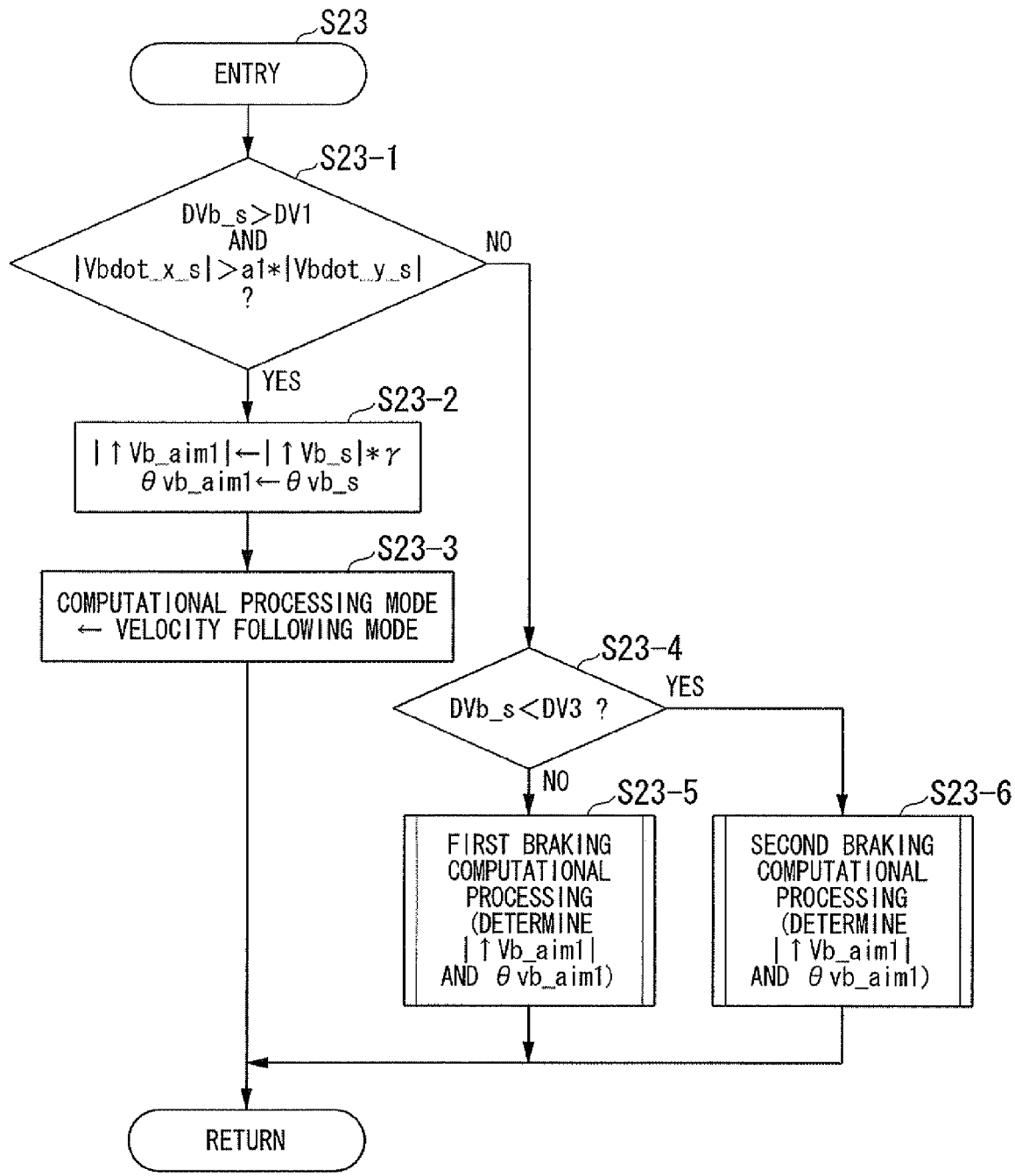

The computational process of the braking mode in the step S23 is executed as indicated in the flowchart of FIG. 15. In particular, regarding the center-of-gravity point acceleration estimation value Vbdot_x_s, Vbdot_y_s and the estimated center-of-gravity point velocity absolute value rate of change DVb_s computed in the step S21, the required center-of-gravity point velocity generator 74 first determines in the step 23-1 whether or not the conditions DVb_s>DV1 and |Vbdot_x_s|>a1*|Vbdot_y_µl. This decision process is a procedure determining whether or not there is an acceleration request to increase the velocity of the vehicle 1 in the approximately fore-and-aft direction of the vehicle.

Here, DV1 is a first threshold value DV1 (>0) of the predetermined positive value. Further, DVb_s>DV1 indicates that the actual magnitude |↑Vb| of the center-of-gravity point velocity vector ↑Vb is increasing at a greater temporal rate of change compared to the first threshold value.

In addition, a1 is a predetermined positive coefficient. Further, |Vbdot_x_s|>a1*|Vbdot_y_s| indicates that the actual acceleration vector of the vehicle system center-of-gravity point comprises an element in the x axis direction which is not zero, and that the angle ($=\tan^{-1}$(|Vbdot_y_s|/|Vbdot_x_s|) at the acute angle side with respect to the x axis direction of the acceleration vector is closer to "0" compared to a predetermined angle ($=\tan^{-1}$(1/a1)). According to the present embodiment, a1 is set to be, for example, equal to "1" or a value close to "1."

Therefore, in a condition in which the determination result of the step S23-1 becomes positive, an occupant or an external supporter is performing a controlling action to increase the magnitude of the center-of-gravity point velocity vector ↑Vb in generally the fore-and-aft direction. This controlling action adds an impellent force to the vehicle 1 in generally the fore-and-aft direction.

When the determination result of the step S23-1 is negative, i.e., when there is no request to accelerate the vehicle 1 (i.e., the request to accelerate the vehicle 1 in generally the fore-and-aft direction), the required center-of-gravity point velocity generator 74 next executes the determination procedure in step S23-4.

In the determination procedure in step S23-4, the required center-of-gravity point velocity generator 74 determines whether or not the estimated center-of-gravity point velocity absolute value rate of change DVb_s computed in step S21 is less than a predetermined negative third threshold value DV3 (<0). According to this determination process, it is determined whether or not a request for deceleration has been made, i.e., whether the occupant of the vehicle 1 has actively tried to reduce the magnitude of the center-of-gravity point velocity vector ↑Vb. In this case, the determination result of step S23-4 becomes positive when the occupant of the vehicle 1 has intentionally placed his or her foot on the ground, thereby creating a frictional force in the braking direction of the vehicle 1 between the occupant's foot and the floor.

Further, when the determination result of step S23-4 is negative (i.e., when the request for deceleration has not occurred), the required center-of-gravity point velocity generator 74 executes a first braking computational process in step S23-5, thereby determining the magnitude |↑Vb_aim1| of the base required center-of-gravity point velocity vector ↑Vb_aim1 (hereinafter, referred to as the base required center-of-gravity point velocity vector absolute value |↑Vb_aim1|) and the directional angle θvb_aim1 (hereinafter referred to as the base required center-of-gravity point velocity vector directional angle θvb_aim1), thereby completing the processing shown in FIG. 15. In addition, when the determination result of the step S23-4 is positive (i.e., when a request for deceleration has occurred), the required center-of-gravity point velocity generator 74 executes a second braking computational processing in step S23-6, determines a base required center-of-gravity point velocity vector absolute value |↑Vb_aim1| and the base required center-of-gravity point velocity vector directional angle θvb_aim1, thereby completing the processing shown in FIG. 15.

Incidentally, according to the present embodiment, the base required center-of-gravity point velocity vector directional angle θvb_aim1 is defined as an angle (−180°≦θvb_aim≦180°) satisfying sin(θvb_aim1)=Vb_x_aim1/|↑Vb_aim1|, cos(θvb_aim1)=Vb_y_aim1/|↑Vb_aim1|. When |↑Vb_aim|=0, it is assumed that θVb_aim=0°.

Figure 16:
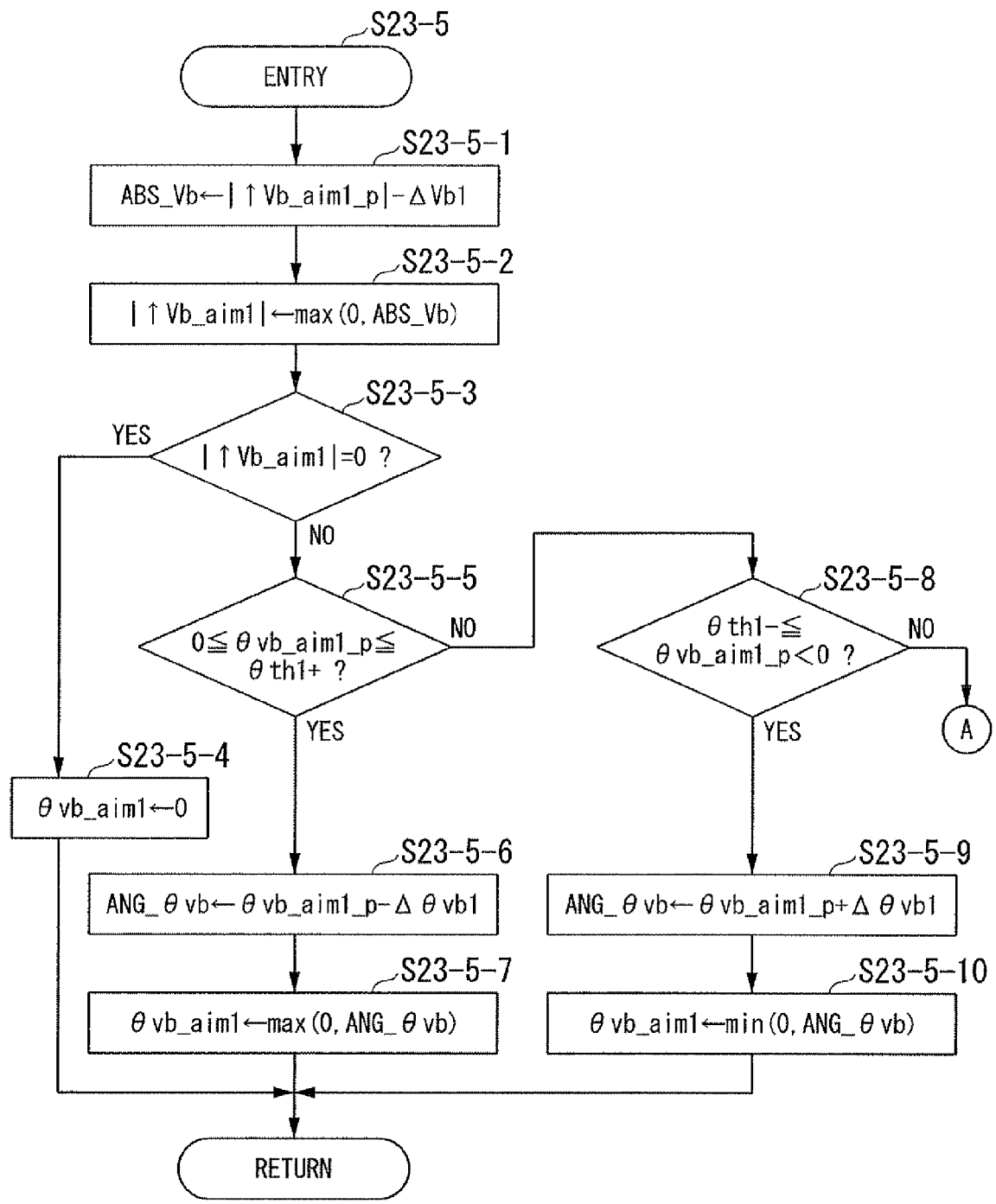
FIG. 16 is a flowchart showing a subroutine of a processing in step S23-5 shown in FIG. 15.
Figure 17:
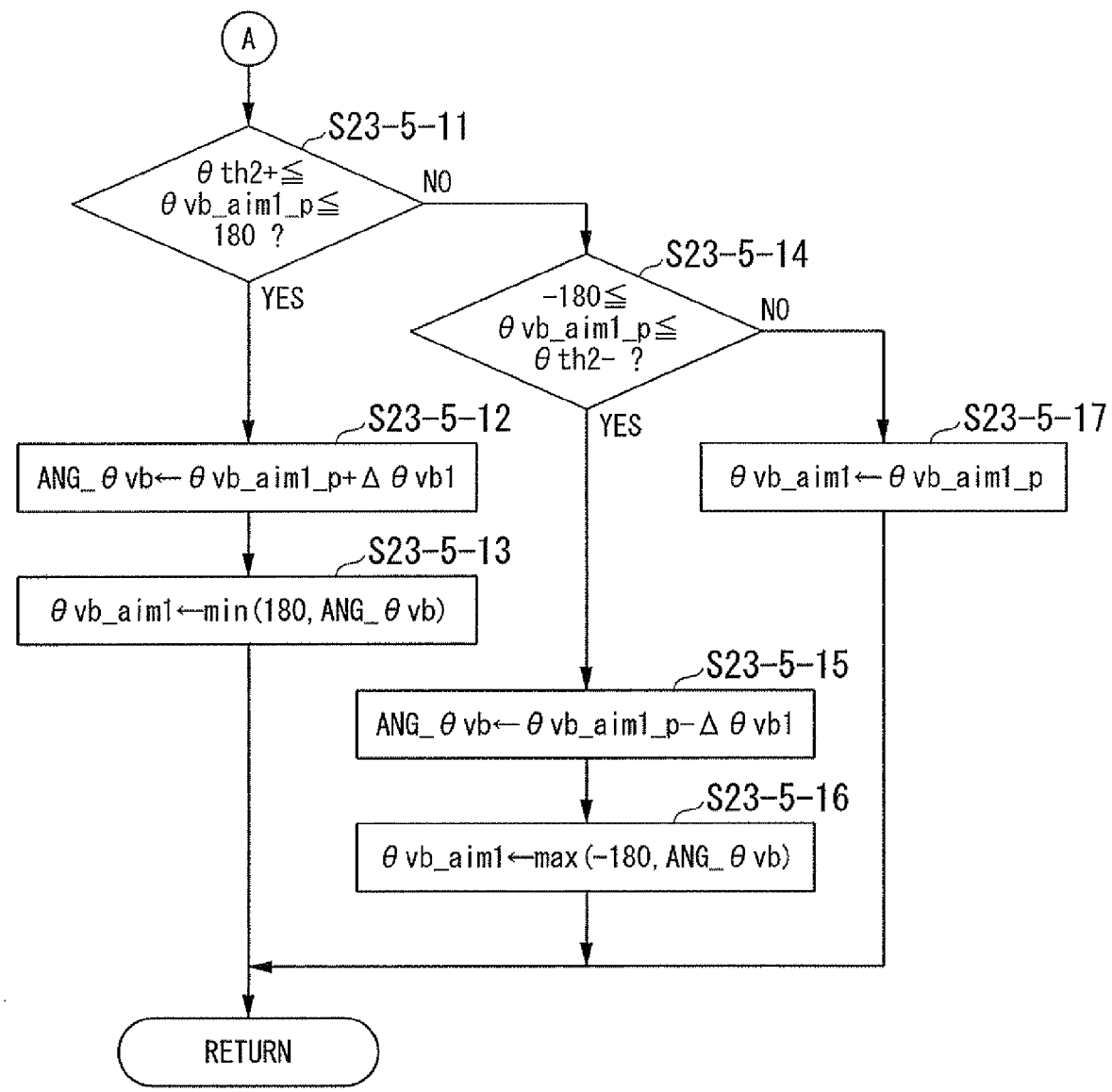
FIG. 17 is a flowchart showing a remaining part of a subroutine of a processing in step S23-5 shown in FIG. 15.

The first braking computational process of the step S23-5 is executed as shown in the flowcharts in FIG. 16 and FIG. 17.

According to this first braking computational process, the required center-of-gravity point generator 74 outputs a value obtained by subtracting a predetermined positive value ΔVb1 from the previous value |↑Vb_aim_p| of the base required center-of-gravity point velocity vector absolute value |↑Vb_aim1| in step S23-5-1 as the candidate value ABS_Vb of |↑Vb_aim1|. ΔVb1 is a predetermined value prescribing the amount of decrease (and the temporal rate of change of |↑Vb_aim1|) of |↑Vb_aim1| for each control processing period.

Next, in the step S23-5-2, the required center-of-gravity point velocity generator 74 determines the greater value max (0, ABS_Vb) of the candidate value ABS_Vb and 0 as the current value of |↑Vb_aim1|. Therefore, when ABS_Vb≧0, ABS_Vb is determined as the current value of $|\uparrow Vb\_aim1|$. When ABS_Vb≦0, the current value of $|\uparrow Vb\_aim1|$ is set to be zero.

Next, in step S23-5-3, the required center-of-gravity point velocity generator 74 determines whether or not the $|\uparrow Vb\_aim1|$ determined as described above is zero. When this determination result is positive, the required center-of-gravity point velocity generator 74 next sets the current value of θvb_aim1 to 0° in step S23-5-4, thereby completing the procedure in FIG. 16.

When the determination result of step S23-5-3 is negative, the required center-of-gravity point velocity generator 74 determines the current value of θvb_aim1 by the processing by step S23-5-5 according to whether or not the pervious value θvb_aim1_$p$ of θvb_aim1 is within either of the ranges of 0°≦θvb_aim1_$p$≦θth1+, θth1-≦θvb_aim1_$p$<0°, θth2+≦θvb_aim1_$p$≦180°, -180°≦θvb_aim1_$p$≦θth2-, θth1+<θvb_aim1_$p$<θth2+, θth2-<θvb_aim1_$p$<θth1-.

Here, θth1+ is a predetermined positive directional angle threshold value between 0° and 90°. θth1- is a predetermined negative directional angle threshold value between 0° and -90°. θth2+ is a predetermined positive directional angle threshold value between 90° and 180°. θth2- is a predetermined positive directional angle threshold value between -90° and -180°. According to the present embodiment, θth1+ and θth1- are set so that the absolute values of θth1+ and θth1- is equal to be, for example, 45° or an angle close to 45°. Further, θth2+ and θth2- are set so that the absolute values of θth2+ and θth2- is equal to be, for example, 135° or an angle close to 135°. Incidentally, the difference between θth1+ and θth1- (=(θth1+)-(θth1-)) and the difference between θth2+ and θth2- (=(θth2+)-(θth2-)) need not be equal.

The procedure from step S23-5-5 is executed as described below. In other words, in step S23-5-5, the required center-of-gravity point velocity generator 74 determines whether or not the inequality 0°≦θvb_aim1_$p$≦θth1+ holds. When this determination result is positive, the required center-of-gravity point velocity generator 74 computes in step S23-5-6, a value obtained by subtracting a predetermined positive value Δθvb1 from the previous value θvb_aim1_p of θvb_aim1 as the candidate value ANG_Vb of θvb_aim1. Δθvb1 is a predetermined value prescribing the variation of θvb_aim1 (and the temporal rate of change of θvb_aim1) for each control processing period.

Further, in step S23-5-7, the required center-of-gravity point velocity generator 74 determines the greater angular value max (0, ANG_Vb) of the candidate value ANG_Vb and 0° as the current value of θvb_aim1, and thereby completes the processing shown in FIG. 16. Therefore, when ANG_Vb≧0°, ANG_Vb is determined as the current value of θvb_aim1. Meanwhile, when ANG_Vb<0°, the current value of θvb_aim1 becomes 0°.

When the determination result of step S23-5-5 is negative, the required center-of-gravity point velocity generator 74 determines in step S23-5-8 whether or not the inequality θth1-≧θvb_aim1_$p$<0° holds. When this determination result is positive, the required center-of-gravity point velocity generator 74 computes in step S23-5-9 computes a value obtained by increasing the previous value θvb_aim1_$p$ of θvb_aim 1 by the predetermined value Δθvb1 as the candidate value ANG_Vb of θvb_aim1.

Further, in step S23-5-10, the required center-of-gravity point velocity generator 74 determines the smaller angular value min (0, ANG_Vb) of the candidate value ANG_Vb and 0° as the current value of θvb_aim1, thereby completing the procedure shown in FIG. 16. Therefore, when ANG_Vb≦0°, ANG_Vb is determined as the current value of θvb_aim1. When ANG_Vb>0°, the current value of θvb_aim1 is 0°.

When the determination result of step S23-5-8 is negative, the requesting center-of-gravity point velocity generator 74 determines in step S23-5-11 in FIG. 17 whether or not the inequality θth2+≦θvb_aim1_$p$≦180° holds. When the determination result is positive, the required center-of-gravity point velocity generator 74 computes in step S23-5-12 a value obtained by increasing the previous value θvb_aim1_$p$ of θvb_aim1 by the predetermined value Δθvb1 as the candidate value ANG_Vb of θvb_aim1.

Further, in step S23-5-13, the required center-of-gravity point velocity generator 74 determines the smaller angular value min (180, ANG_Vb) of the candidate value ANG_Vb and 180° as the current value of θvb_aim1, thereby completing the procedure shown in FIG. 17. Therefore, when ANG_Vb≦180°, ANG_Vb is determined as the current value of θvb_aim1. When ANG_Vb>180°, the current value of θvb_aim1 is 180°.

When the determination result of step S23-5-11 is negative, the requesting center-of-gravity point velocity generator 74 next determines in step S23-5-14 whether or not the inequality -180°≦θvb_aim1_$p$≦θth2- holds. When the determination result is positive, the required center-of-gravity point velocity generator 74 computes in step S23-5-15 a value obtained by decreasing the previous value θvb_aim1_$p$ of θvb_aim1 by the predetermined value Δθvb1 as the candidate value ANG_Vb of θvb_aim 1.

Further, in step S23-5-16, the required center-of-gravity point velocity generator 74 determines the greater angular value max (180, ANG_Vb) of the candidate value ANG_Vb and -180° as the current value of θvb_aim1, and thereby completes the processing shown in FIG. 17. Therefore, when ANG_Vb≧-180°, ANG_Vb is determined as the current value of θvb_aim1. Meanwhile, when ANG_Vb<-180°, the current value of θvb_aim1 becomes -180°.

When the determination result of step S23-5-14 is negative, i.e., when the inequality θth1+<θvb_aim1_$p$<θth2+ or θth2-≦θvb_aim1_$p$<θth1- holds, the required center-of-gravity point velocity generator 74 determines in step S23-5-17 the current value of θvb_aim1 as the same value as the previous value θvb_aim1_$p$, and thereby completes the processing shown in FIG. 17.

Above are the details of the first braking computational processing in step S23-5.

Figure 18:
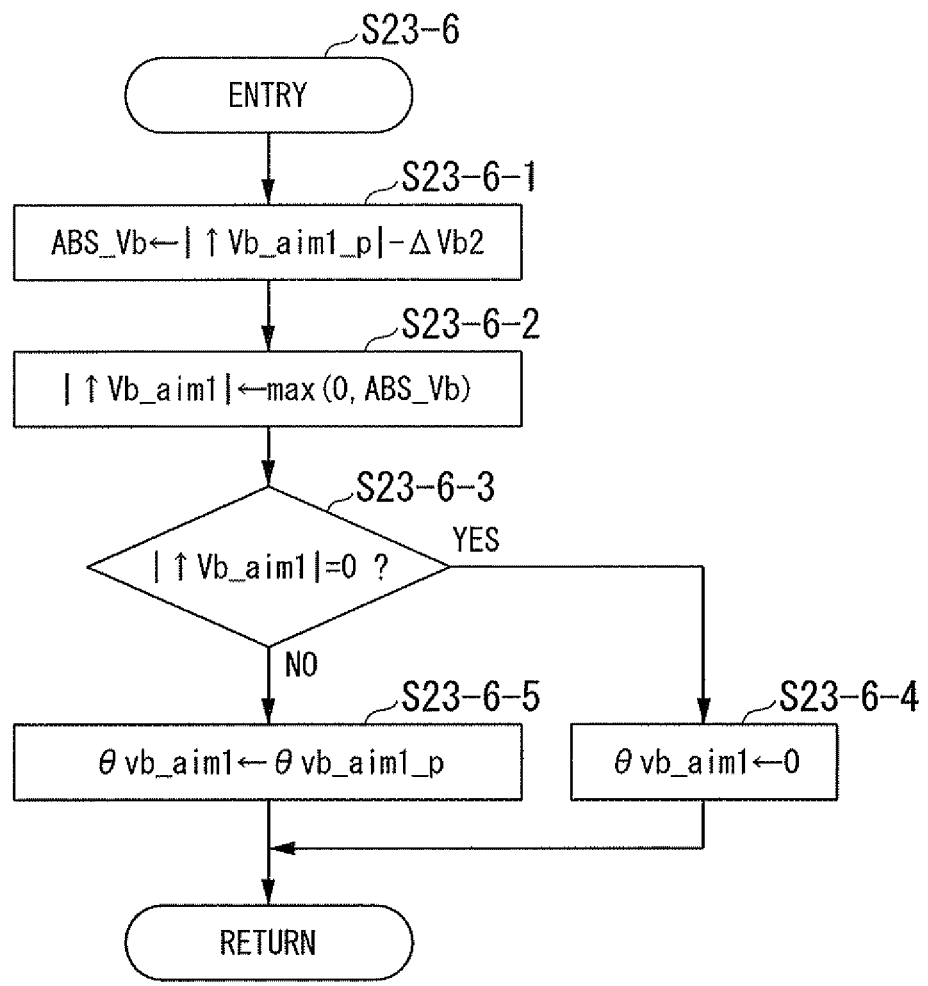
FIG. 18 is a flowchart showing a subroutine of a processing in step S23-6 shown in FIG. 15.

Meanwhile, the second braking computational processing in step S23-6 is executed as indicated in the flowchart shown in FIG. 18.

According to this second braking computational processing, the required center-of-gravity point velocity generator 74 first computes in step S23-6-1 a value obtained by subtracting a predetermined positive value ΔVb2 from the previous value $|\uparrow Vb\_aim\_p|$ of the base required center-of-gravity point velocity vector absolute value $|\uparrow Vb\_aim1|$ as the candidate value ABS_Vb of $|\uparrow Vb\_aim 1|$. ΔVb2 is a predetermined value prescribing the decrease amount of $|\uparrow Vb\_aim1|$ (i.e., the temporal rate of change of $|\uparrow Vb\_aim1|$) for each control processing period in the second braking computational processing. In this case, ΔVb2 is set to be a value larger than the predetermined value ΔVb1 used in the first braking computational process.

Next, in step S23-6-2, the required center-of-gravity point velocity generator 74 executes the same processing as in step S23-5-2, and determines the greater value max (0, ABS_Vb) of the candidate value ABS_Vb and 0 computed in step S23-6-1 as the current value of $|\uparrow Vb\_aim1|$.

Next, the required center-of-gravity point velocity generator 74 determines in step S23-6-3 whether or not |↑Vb_aim1| determined as described above is zero. When this determination result is positive, the required center-of-gravity point velocity generator 74 next sets the current value of θvb_aim1 to zero in step S23-6-4, thereby completing the processing of FIG. 18.

Further, when the determination result of step S23-6-3 is negative, the required center-of-gravity point velocity generator 74 next sets the current value of θvb_aim1 to the same value as the previous value θvb_aim1_p in step S23-6-5, and thereby completes the processing in FIG. 18.

Above are details of the second braking computational processing in step S23-6.

Returning to the description in FIG. 15, when the determination result of the step S23-1 is positive, i.e., when there is an acceleration request of the vehicle 1 in generally the fore-and-aft direction, the required center-of-gravity point velocity generator 74 determines in step S23-2, the base required center-of-gravity point velocity vector absolute value |↑Vb_aim1| and the base required center-of-gravity point velocity vector directional angle θvb_aim1. The required center-of-gravity point velocity generator 74 alters the computational processing mode in step S23-3 from the braking mode to the velocity following mode, thereby completing the processing of FIG. 15.

In step S23-2, in particular, the value obtained by multiplying the predetermined ratio γ to the magnitude |↑Vb_s| (=sqrt (Vb_x_s$^2$+Vb_y_s$^2$)) of the estimated center-of-gravity point velocity vector ↑Vb_s (current value) is determined as the base required center-of-gravity point velocity vector absolute value |↑Vb_aim1|. According to the present embodiment, the ratio γ is set to be a positive value which is slightly smaller than "1" such as 0.8.

Further, in step S23-2, the directional angle θvb_s (=sin$^{-1}$ (Vb_x_s/|↑Vb_s|)) of the estimated center-of-gravity point velocity vector ↑Vb_s is determined to be the base required center-of-gravity point velocity vector directional angle θvb_aim1. Therefore, in step S23-2, consequently, a vector obtained by multiplying the ratio γ with the estimated center-of-gravity point velocity vector ↑Vb_s is determined as the base required center-of-gravity point velocity vector ↑Vb_aim1.

Such a processing in step S23-2 matches the way in which |↑Vb_x_aim1| and θvb_aim1 is determined with the velocity following mode which starts from the next controlling processing cycle.

Incidentally, it is not necessary that the ratio γ be slightly smaller than "1." For example, the ratio γ may be set to "1" or to a value slightly larger than "1." According to the present embodiment, the value of the ratio γ is set to be a value slightly smaller than "1" in order to prevent the velocity of the vehicle 1 that the occupant physically feels (in a sensory aspect) is recognized as if it is larger than the actual velocity.

Above is the computational processing of the braking mode in step S23.

Incidentally, when the determination result of step S23-1 is negative, the computational processing mode is not altered. Therefore, in the next control processing cycle, the computational processing mode is maintained to be the braking mode.

Figure 19:
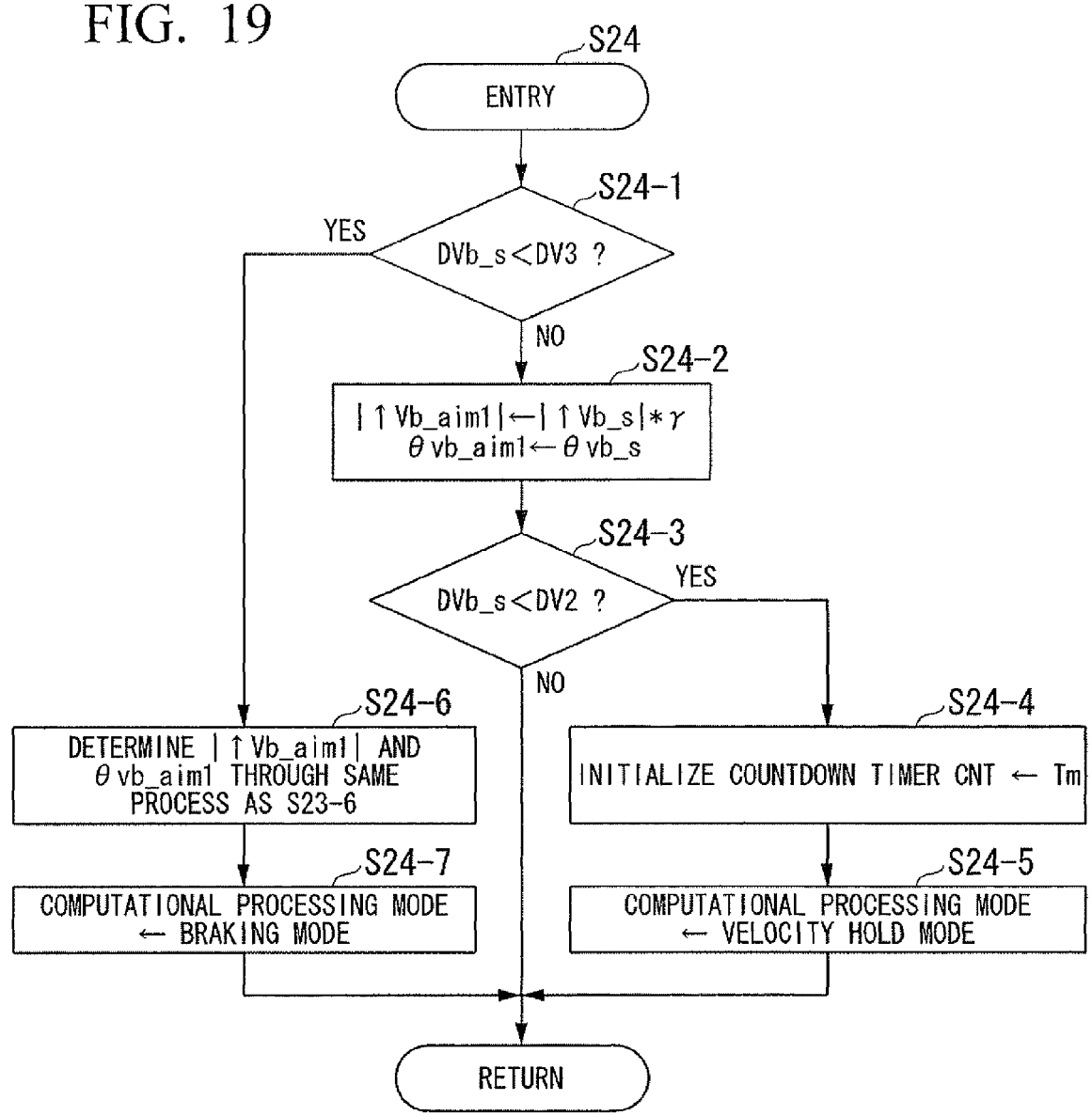
FIG. 19 is a flowchart showing a subroutine of a processing in step S24 shown in FIG. 14.

Next, the computational processing of the velocity following mode in step S24 is executed as indicated in the flowchart in FIG. 19. In particular, the required center-of-gravity point velocity generator 74 first performs in step S24-1, the same determination processing as step S23-4. In other words, the required center-of-gravity point velocity generator 74 executes a process determining whether or not a deceleration request of the vehicle 1 has been made.

When this determination result is positive, the required center-of-gravity point velocity generator 74 next executes in step S24-6, the same processing as step S23-6 (i.e., the processing shown in the flowchart in FIG. 18), thereby determining the base required center-of-gravity point velocity vector absolute value |↑Vb_aim1| and the base required center-of-gravity point velocity vector directional angle θvb_aim1. Further, the required center-of-gravity point velocity generator 74 changes, in step S24-7, the computational processing mode from the velocity following mode to the braking mode, thereby completing the processing in FIG. 19.

Meanwhile, when the determination result of the step S24-1 is negative, i.e., when the deceleration request of the vehicle 1 has not occurred, the required center-of-gravity point velocity generator 74 next executes the processing in step S24-2. In step S24-2, the required center-of-gravity point velocity generator 74 executes the same procedure as the step S23-2, and thereby determines the base required center-of-gravity point velocity vector absolute value |↑Vb_aim1| and the base required center-of-gravity point velocity vector directional angle θvb_aim1. In other words, |↑Vb_x_s|*γ is determined as |↑Vb_aim1|, and θvb_s is determined as θvb_aim1.

Next, in step S24-3, the required center-of-gravity point velocity generator 74 determines whether or not the estimated center-of-gravity point velocity absolute value rate of change DVb_s (the value computed in step S21) is smaller than the second threshold value DV2, which is predetermined According to the present embodiment, this second predetermined value DV2 is set to be a negative predetermined value which is larger than the third threshold value DV3 (i.e., being closer to 0 compared to DV3). Incidentally, the second threshold value DV2 may be set to be "0" or to a positive value slightly larger than "0." At the same time, however, DV2 is a value smaller than the first threshold value DV1.

The processing in step S24-3 determines the timing with which the velocity following mode is transferred to the velocity hold mode. Further, when the determination result of step S24-3 is negative, the required center-of-gravity point velocity generator 74 terminates the process shown in FIG. 19. In this case, the computational processing mode is not altered. Therefore, in the next control processing period, the computational processing mode is maintained to be the velocity following mode.

Further, when the determination result of step S24-3 is positive, the required center-of-gravity point velocity generator 74 regards the acceleration request of vehicle 1 to be met. Thus, the required center-of-gravity point velocity generator 74 initiates the countdown timer in step S24-4. Further, in step S24-5, the required center-of-gravity point velocity generator 74 changes the computational processing mode from the velocity following mode to the velocity hold mode, thereby completes the processing in FIG. 19.

The countdown timer is a timer measuring the amount of time that has passed since the start of the velocity hold mode beginning from the next control processing period. Further, in step S24-4, a predetermined initial value Tm is set to the measured time value CNT of this timer. The initial value Tm_x refers to a set value of time during which the velocity hold mode is to be continued.

Above is the computational processing of the velocity following mode in step S24.

Figure 20:
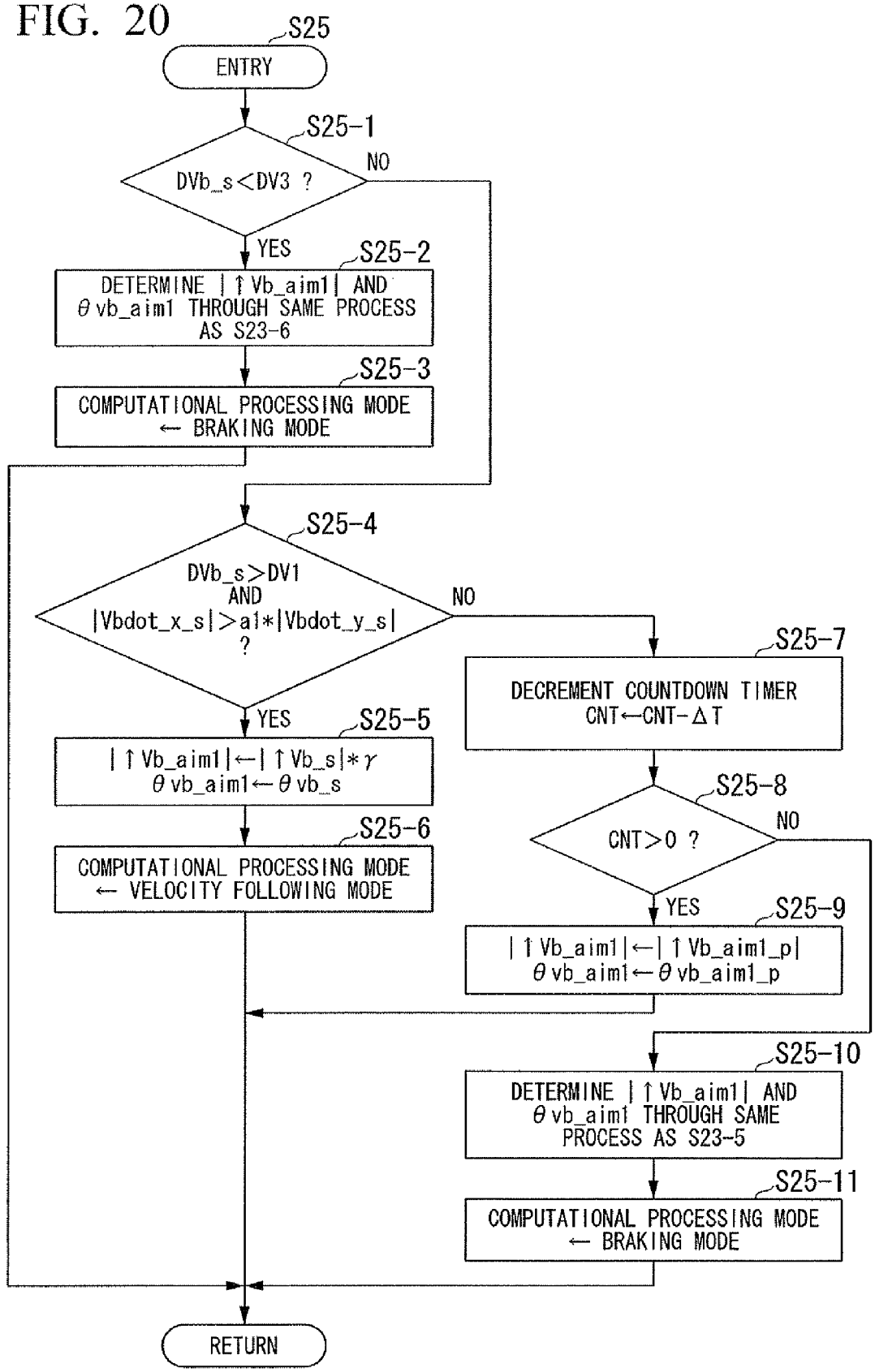
FIG. 20 is a flowchart showing a subroutine of a processing in step S25 shown in FIG. 14.

Next, the computational processing of the velocity hold mode in step S25 is executed as indicated in the flowchart shown in FIG. 20. In particular, in step S25-1, the required center-of-gravity point velocity generator 74 first performs the same decision process as in step S23-4. In other words, the required center-of-gravity point velocity generator 74 executes a process determining whether or not a deceleration request of the vehicle 1 has been made.

When the determination result of the step S25-1 is positive (i.e., when a deceleration request of the vehicle 1 has occurred), the required center-of-gravity point velocity generator 74 next executes, in step S25-2, the same procedure as in step S23-6 (i.e., the procedure shown in the flowchart in FIG. 18). As a result, the required center-of-gravity point velocity generator 74 determines the base required center-of-gravity point velocity vector absolute value |↑Vb_aim1| and the base required center-of-gravity point velocity vector directional angle θvb_aim1. Furthermore, the required center-of-gravity point velocity generator 74 changes, in step S25-3, the computational processing mode from the velocity hold mode to the braking mode, thereby completing the processing of FIG. 20.

Meanwhile, when the determination result of step S25-1 is negative (i.e., when a deceleration request of the vehicle 1 has not occurred), the required center-of-gravity point velocity generator 74 executes in step S25-4, the same determination process as step S23-1, determining whether or not there is an acceleration request of the vehicle 1 in roughly the fore-and-aft direction.

When the determination result of the step S25-4 is positive (i.e., when an acceleration request of the vehicle 1 has occurred again in generally the fore-and-aft direction), the required center-of-gravity point velocity generator 74 executes, in step S25-5, the same procedure as in step S23-2. As a result, the required center-of-gravity point velocity generator 74 determines the base required center-of-gravity point velocity vector absolute value |↑Vb_aim1| and the base required center-of-gravity point velocity vector directional angle θvb_aim1. Thus, |↑Vb_x_s|*γ is determined as |↑Vb_aim1|, and θvb_s is determined as θvb_aim1.

Further, the required center-of-gravity point velocity generator 74 changes in step S25-6, the computational processing mode from the velocity hold mode to the velocity following mode, thereby completing the procedure shown in FIG. 20.

When the determination result of step S25-4 is negative (i.e., when there remains to be no acceleration request in generally the fore-and-aft direction), the required center-of-gravity point velocity generator 74 decrements in step S25-7, the measured time value CNT of the countdown timer. In other words, the required center-of-gravity point velocity generator 74 updates the measured time value CNT by subtracting a predetermined value ΔT (the time of the control processing period) from the present value of the measured time value CNT.

Next, the required center-of-gravity point velocity generator 74 determines in step S25-8 whether or not the measured time value CNT of the countdown timer is greater than zero, i.e., whether or not the time measurement by the countdown timer has completed.

When the determination result of step S25-8 is positive, the amount of time represented by the initial value Tm of the countdown timer has not yet passed since the velocity hold mode has started. In this case, the required center-of-gravity point velocity generator 74 maintains the computational processing mode to the velocity hold mode by determining the base required center-of-gravity point velocity vector absolute value |↑Vb_aim1| and the base required center-of-gravity point velocity directional angle θvb_aim1 in step S25-9, thereby completing the processing of FIG. 20.

In this case, in step S25-9, the current value of |↑Vb_aim1| is determined to be the same value as the previous value |↑Vb_aim1_p|. Further, the current value of θvb_aim1 is determined to be the same value as the previous value θvb_aim1_p. Therefore, the previous value of the base required center-of-gravity point vector ↑Vb_aim1_p is determined as the velocity vector of the current value of ↑Vb_aim1.

Incidentally, when the determination result of step S25-8 is positive, the computational processing mode is not renewed. Therefore, in the next control processing period, the computational processing mode is maintained to be the velocity hold mode.

When the determination result of the step S25-8 is negative, i.e., when a predetermined amount of time represented by the initial value Tm of the countdown timer has passed since the velocity hold mode has started, the required center-of-gravity point velocity generator 74 performs in step S25-10 the same processing as in step S23-5 (i.e., the processing shown in the flowchart of FIGS. 16 and 17), thereby determining the base required center-of-gravity point velocity vector absolute value |↑Vb_aim1| and the base required center-of-gravity point velocity directional angle θvb_aim1.

Further, the required center-of-gravity point velocity generator 74 changes in step S25, the computational processing mode from the velocity hold mode to the braking mode, thereby completing the processing shown in FIG. 20.

Above is the computational processing of the velocity hold mode in step S25.

Returning to the description in FIG. 14, the required center-of-gravity point velocity generator 74 executes one of the computational processes steps S23-25 as described above, and thereafter executes a process in step S26 (i.e., a filtering process) inputting each of the |↑Vb_aim1| and θvb_aim1 determined in the computational process.

Here, the filter inputting |↑Vb_aim1| and θvb_aim1 is a first delay characteristic low pass filter in order to prevent the magnitude |↑Vb_aim| of the required center-of-gravity point velocity vector ↑Vb_aim and the directional angle θvb_aim suddenly changes to a step form immediately after the computational processing mode is changed from the braking mode to the velocity following mode. In this case, the time constant of the filter inputting |↑Vb_aim1| is set to a relatively short time constant. In a condition other than a sudden change in |↑Vb_aim1|, the output value of the filter matches or approximately coincides with |↑Vb_aim1|. This characteristic applies to a filter inputting θvb_aim1 as well.

Further, in step S26, the output value of the filter inputting θvb_aim 1 is determined as the directional angle θvb_aim of the required center-of-gravity point velocity vector ↑Vb_aim (hereinafter, the required center-of-gravity point velocity vector directional angle θvb_aim).

Next, the procedure moves on to step S27. The required center-of-gravity point velocity generator 74 finally determines the value obtained by passing the output value of the filter inputted with |↑Vb_aim1| through the limiter as the magnitude |↑Vb_aim| (hereinafter referred to as the required center-of-gravity point velocity vector absolute value |↑Vb_aim|) of the required center-of-gravity point velocity vector ↑Vb_aim. In this case, the limiter prevents |↑Vb_aim| from being too large. When the output value of the filter inputted with |↑Vb_aim| is less than or equal to a predetermined upper limit value, the output value of this filter is outputted as |↑Vb_aim|. In addition, when the output value of the filter exceeds the upper limit value, the limiter outputs the upper limit value as |↑Vb_aim|. In other words, the limiter outputs the smaller value of the output value of the filter and the upper limit value as $|\uparrow Vb\_aim|$.

Next, the procedure moves on to step S28. From $|\uparrow Vb\_aim|$ and θvb_aim determined as described above, the required center-of-gravity point velocity generator 74 computes the element of the required center-of-gravity point velocity vector $\uparrow Vb\_aim$ in the x axis direction Vb_x_aim (i.e. the required center-of-gravity point velocity in the x axis direction) and the element in the y axis direction Vb_y_aim (the required center-of-gravity point velocity in the y axis direction). In further detail, $|\uparrow Vb\_aim|*\sin(\theta vb\_aim)$ is computed as Vb_x_aim, and $|\uparrow Vb\_aim|*\cos(\theta vb\_aim)$ is computed as Vb_y_aim.

Above are the details of the processing of the required center-of-gravity point velocity generator 74.

Due to the processing by the required center-of-gravity point velocity generator 74 described above, the required center-of-gravity point velocity vector $\uparrow Vb\_aim$ (thus, the required center-of-gravity point velocity Vb_x_aim, Vb_y_aim) is determined according to an embodiment described below.

In other words, for example, in order to increase the velocity of the vehicle 1, suppose an impellent force in the x axis direction (in particular, an impellent force such that the determination result of step S23-1 becomes positive) is applied to the vehicle 1 by the occupant kicking the floor with the back side of his or her foot or by a supporter and the like pushing the vehicle 1.

Incidentally, the computational processing mode before applying the impellent force is assumed to be the braking mode. In addition, to facilitate the reader's understanding in this case, the output value of the filter inputting $|\uparrow Vb\_aim1|$ in step S26 in FIG. 14 is assumed to be a value contained within a range so that a compulsory limitation by the limiter in step S27 is not applied. In other words, the output value is assumed to be a value less than or equal to the upper limit of the limiter. As the same time, the center-of-gravity point velocity estimation values Vb_x_s and Vb_y_s are contained within a range such that a compulsory limitation is not applied to the output values V_x_lim2 and V_y_lim2 in the limiting processor 104.

In this case, when the determination result of step S23-1 becomes positive by applying an impellent force to the vehicle 1, the processing in step S23-3 shown in FIG. 15 changes the computational processing mode from the braking mode to the velocity following mode.

In the velocity following mode, in a condition such that a deceleration request does not occur (i.e., in a condition in which the determination result of step S24-1 is negative), a vector obtained by multiplying a predetermined ratio γ to the current value (i.e., present value) of the estimated center-of-gravity point velocity vector $\uparrow Vb\_s$ is determined as the base required center-of-gravity point velocity vector $\uparrow Vb\_aim1$. This vector obtained by multiplying a predetermined ratio γ to the current value (i.e., present value) of the estimated center-of-gravity point velocity vector $\uparrow Vb\_s$ is a velocity vector such that the magnitude is slightly smaller than the magnitude of $\uparrow Vb\_s$ and the direction is the same as $\uparrow Vb\_s$.

Therefore, the required center-of-gravity point velocity vector $\uparrow Vb\_aim$ determined successively by the required center-of-gravity point velocity generator 74 is determined so as to follow the velocity vector $\uparrow Vb\_aim1 (=\gamma*\uparrow Vb\_s)$ which matches approximately the actual center-of-gravity point velocity vector $\uparrow Vb$ which increases in size due to the impellent force applied to the vehicle 1.

The element in the x axis direction and the element in the y axis direction of the required center-of-gravity point velocity vector $\uparrow Vb\_aim$ determined as described above is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, the velocity of the wheel assembly 5 is controlled so that the increase in the actual velocity of the vehicle system center-of-gravity point due to the impellent force applied to the vehicle 1 by the occupant (i.e., the increase in velocity in generally the fore-and-aft direction) is swiftly executed in response to the request based on the impellent force. Therefore, the vehicle 1 accelerates smoothly due to the applied impellent force.

Further, in the velocity following mode, when the determination result of step S24-1 in FIG. 19 becomes positive (i.e., a deceleration request occurs) due to the application of the braking force to the vehicle 1, the computational processing mode changes to the braking mode. As a result, the velocity of the vehicle 1 decreases. in this case, while the deceleration request is occurring, $|\uparrow Vb\_aim1|$ and θvb_aim1 are determined by the second braking computational processing (the processing in FIG. 18) of step S23-6. As a result, the base required center-of-gravity point velocity vector $\uparrow Vb\_aim1$, or a required center-of-gravity point velocity vector $\uparrow Vb\_aim$ following $\uparrow Vb\_aim1$ are determined so that the directions of $\uparrow Vb\_aim1$ and $\uparrow Vb\_aim$ are held constant, and that the magnitude decreases at a constant temporal rate of change (the temporal rate of change prescribed by the predetermined value ΔVb2).

Next, in the velocity following mode, when the application of the impellent force on the vehicle 1 stops, and the estimated center-of-gravity point velocity absolute value rate of change DVb_s becomes smaller than the second threshold value DV2 (i.e., when the determination result of step S24-3 of FIG. 19 becomes positive), the computational processing mode changes from the velocity following mode to the velocity hold mode based on the processing in step S24-5 in FIG. 19.

According to this velocity hold mode, in a condition in which the acceleration request and the deceleration request are not made (i.e., in a condition in which the determination results of the steps S25-1 and 25-4 in FIG. 19 are both negative), the base required center-of-gravity point velocity vector $\uparrow Vb\_aim1$ is set to be the same velocity vector as the velocity vector $\uparrow Vb\_aim1\_p$ of the previous value until the time measurement of the countdown timer is completed.

Therefore, after the velocity hold mode starts, within a period of time until the time measurement of the countdown timer is completed (during the time of the initial value Tm of the countdown timer), the base required center-of-gravity point velocity vector $\uparrow Vb\_aim1$ is maintained to be the same constant velocity vector as the velocity vector determined before the velocity hold mode starts.

Therefore, the required center-of-gravity point velocity vector $\uparrow Vb\_aim$ determined to follow $\uparrow Vb\_aim1$ is determined to be maintained at a constant velocity vector (i.e., a velocity vector which matches or approximately matches with $\uparrow Vb\_aim$ which was determined immediately before the velocity hold mode started).

Further, the element in the x axis direction and the element in the y axis direction of the required center-of-gravity point velocity vector $\uparrow Vb\_aim$ determined as described above is determined to be the target center-of-gravity point velocity for control Vb_x_mdfd and Vb_y_mdfd. Moreover, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, after the vehicle 1 increases its velocity, during a period of time in which the time measurement by the countdown timer is completed (the period of time represented by the initial value Tm), the velocity of the wheel assembly 5 is controlled so that the magnitude and the direction of the actual velocity vector ↑Vb of the vehicle system center-of-gravity point is maintained to be constant without requiring the posture of the upper body of the occupant to be adjusted frequently. Therefore, the actual driving condition of this vehicle under this situation is such that the vehicle 1 runs at an approximately constant velocity vector even if the occupant does not perform a maneuvering operation by actively moving his or her upper body.

Incidentally, in the velocity hold mode, when an impellent force in approximately the fore-and-aft direction is applied to the vehicle 1 again, thereby making the determination result of step S25-4 of FIG. 20 positive (i.e., an acceleration request occurring), the computational processing mode returns to the velocity following mode. Therefore, the vehicle 1 accelerates again in approximately the fore-and-aft direction.

In the velocity hold mode, when the determination result of step S25-1 of FIG. 20 becomes positive by adding a braking force to the vehicle 1 (i.e., when a deceleration request occurs), the computational processing mode changes to the braking mode. As a result, the velocity of the vehicle 1 decreases. In this case, similar to the case in which a deceleration request occurs in the velocity following mode, while the deceleration request is occurring, the |↑Vb_aim1| and θvb_aim1 is determined based on the second braking computational processing (i.e., the processing in FIG. 18) of step S23-6.

Next, in the velocity hold mode, when the condition in which neither the acceleration request nor the deceleration request occurs is maintained (i.e., the condition in which the determination results of the steps S25-1 and 25-4 in FIG. 20 are both negative), and the time measurement of the countdown timer is completed, the computational processing mode is altered from the velocity hold mode to the braking mode due to the processing of step S25-11 in FIG. 20.

In this braking mode, under a condition in which neither the acceleration request nor the deceleration request occurs (i.e., a condition in which the determination results of steps S23-1 and 23-4 in FIG. 15 are both negative), the processing of steps S23-5-1 and 23-5-2 in FIG. 16 are performed in each control processing period. As a result, the base required center-of-gravity point velocity vector absolute value ||↑Vb_aim1| decreases continuously to zero at a constant temporal rate of change (a temporal rate of change prescribed by ΔVb1 mentioned above). Further, after |↑Vb_aim1| decreases to zero, |↑Vb_aim1| is maintained to be zero.

Further, in the braking mode, in a condition in which neither the acceleration request nor the deceleration request has occurred, the processing after step S23-5-3 in FIG. 16 is executed in each control processing period. In this case, when the direction of the base required center-of-gravity point velocity vector ↑Vb_aim1 determined immediately before the transition from the velocity hold mode to the braking mode (i.e., the direction of ↑Vb_aim1 determined in a control processing period immediately preceding the control processing period in which the determination result of step S25-8 of FIG. 20 is negative) is different from the x axis direction and is relatively close to the x axis direction (in more precise terms, when the directional angle θvb_aim1 of ↑Vb_aim1 determined immediately before the transition is an angular value in either one of the ranges 0°<θvb_aim1_p≦θth1+, θth1-≦θvb_aim1_p<0°, θth2+≦θvb_aim1_p<180°, −180°<θvb_aim1_p≦θth2−), during a period of time in which |↑Vb_aim1| decreases to zero, θvb_aim1 approaches the target conversion angle 0° or 180° or −180° at a constant temporal rate of change, and is finally maintained at the target conversion angle. Therefore, after the braking mode begins, and during the period of time in which the |↑Vb_aim1| decreases to zero, the direction of the base required center-of-gravity point velocity vector ↑Vb_aim continuously approaches the x axis. In other words, during this period of time, the ratio of the absolute value of the element Vb_y_aim1 in the y axis direction with respect to the absolute value of the element Vb_x_aim1 in the x axis direction of the base required center-of-gravity point velocity vector ↑Vb_aim approach zero. Further, when the direction of ↑Vb_aim1 reaches the same direction as the x axis direction (i.e., Vb_y_aim1=0) before |↑Vb_aim1| diminishes to zero, the direction of ↑Vb_aim1 is maintained to be equal to the direction of the x axis.

Therefore, ↑Vb_aim1 is determined so that its magnitude diminishes and that its direction approaches (converges) the direction of the x axis. When ↑Vb_aim1 is determined in this way, the required center-of-gravity point velocity vector ↑Vb_aim, determined to follow ↑Vb_aim1, also behaves so that its magnitude diminishes and that its direction approaches the direction of the x axis.

Further, when the direction of the base required center-of-gravity point velocity vector ↑Vb_aim1, determined immediately before the transition from the velocity hold mode to the braking mode, is different from the direction of the x axis, and is facing a direction relatively far apart from the direction of the x axis (in more precise terms, when the directional angle θvb_aim1 of ↑Vb_aim1 determined immediately before the transition is an angular value within either of the ranges of θth1+<θvb_aim1_p<θth2+ and θth2−<θvb_aim1_p<θth1−), θvb_aim1 is held constant held constant at the same angular value as the directional angle θvb_aim1 of ↑Vb_aim1 determined immediate before the transition, during the period in which |↑Vb_aim1| diminishes to zero.

Therefore, ↑Vb_aim1 is determined so that its magnitude diminishes and so that its direction is maintained to be constant. When ↑Vb_aim1 is determined in this manner, the required center-of-gravity point velocity vector ↑Vb_aim, which is determined to follow ↑Vb_aim1, is also determined so that its magnitude diminishes and so that its direction is maintained to be equal.

Further, according to the present embodiment, in the velocity holding mode, the magnitude and the direction of ↑Vb_aim1 is maintained to be constant. As a result, the base required center-of-gravity point velocity vector ↑Vb_aim1, determined immediately before the transition from the velocity hold mode to the braking mode, consequently matches with ↑Vb_aim1 which was determined immediately before the transition from the velocity following mode to the velocity hold mode (i.e., in the present embodiment, ↑Vb_aim1 determined in the control processing period in which the determination result of step S24-3 of FIG. 19 is positive).

The element in the x axis direction and the element in the y axis direction of the required center-of-gravity point velocity vector ↑Vb_aim determined as described above in the braking mode is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, when the computational processing mode before the braking mode is a velocity hold mode, the velocity of the wheel assembly 5 is controlled so that the actual magnitude of the velocity vector of the center-of-gravity point of the vehicle system diminishes continuously from the magnitude in the velocity hold mode even when the occupant is not actively performing an active maneuvering operation with the movement of his or her upper body.

In this case, when ↑Vb_aim1, determined immediately before the transition from the velocity hold mode to the braking mode (i.e., ↑Vb_aim1 being determined immediately before the transition from the velocity following mode to the velocity hold mode) is different from the direction of the x axis and is relatively close to the direction of the x axis, the magnitude of the velocity vector of the vehicle system center-of-gravity point diminishes, and the direction of this velocity vector automatically approaches the direction of the x axis (the fore-and-aft direction of the occupant), even when the occupant does not actively perform a maneuvering operation with the movement of his or her upper body. Therefore, the vehicle 1 runs straight to a greater degree with respect to the fore-and-aft direction of the occupant.

Here, when the vehicle 1 is to be accelerated, in most cases, it is required to accelerate the vehicle 1 in particularly the fore-and-aft direction of the occupant. In this case, the vehicle 1 according to the present invention runs straight to a greater degree with respect to the fore-and-aft direction, as described above. Therefore, even when the direction of the impellent force applied to the vehicle 1 is slightly deviated from the fore-and-aft direction, in the braking mode following the subsequent velocity hold mode, the velocity of the wheel assembly 5 is controlled so that the velocity vector of the vehicle system center-of-gravity point automatically faces the fore-and-aft direction.

Therefore, a discrepancy of the moving direction of the vehicle 1 is not likely to occur. Further, the vehicle 1 may run straight to a greater degree with respect to the fore-and-aft direction of the occupant (the vehicle 1 may move more easily in the fore-and-aft direction of the occupant). Further, when the vehicle 1 is moved in the fore-and-aft direction, the vehicle 1 may be moved in the fore-and-aft direction even when the impellent force applied to the vehicle 1 is not precisely facing the fore-and-aft direction. As a result, the maneuvering operation of running the vehicle 1 in the fore-and-aft direction may be executed more easily.

In addition, when the direction of the base required center-of-gravity point velocity vector ↑Vb_aim1 determined immediately before the transition from the velocity hold mode to the braking mode (=↑Vb_aim1 determined immediately before transitioning from the velocity following mode to the velocity hold mode) is different from the direction of the x axis and is relatively far apart from the direction of the x axis, the magnitude of the velocity vector of the vehicle system center-of-gravity point diminishes while the direction of the velocity vector is maintained approximately constant even when the occupant does not perform an active maneuvering operation with the movement of his or her upper body. In other words, when the direction of ↑Vb_aim1 determined immediately before the transition from the velocity hold mode to the braking mode is relatively far from the direction of the x axis, it is highly likely that the direction of the velocity vector of the vehicle system center-of-gravity point which was finally intended by the occupant in the velocity following mode is the same direction as the x axis direction. Therefore, after the velocity following mode, it is possible to prevent the vehicle system center-of-gravity point from moving in the direction different from a direction that the occupant intends.

Here, the correspondence between the present embodiment and the present invention is described as a supplement.

2. Technology for Motion in Alignment

This section provides a description of a technology for the inverted pendulum type moving body according to the present embodiment to move in alignment with another moving body. The basis for this technology is the basic characteristics described above regarding the motion control of the omnidirectional vehicle. In this section, an example is given in which the inverted pendulum type moving body is applied to a walking assistance device such as a crutch.

Incidentally, examples of an embodiment in which a plurality of moving bodies move in alignment with each other includes an embodiment in which the relative position of each moving body (i.e., the distance between each moving body) is maintained to be constant as the moving body moves in alignment with each other, an embodiment in which the moving body moves in alignment with each other while matching the posture (i.e., the tilt angle) of each moving body, and an embodiment of an alignment movement combining the above. Here, for ease of explanation, a description is provided primarily regarding an embodiment in which the posture (i.e., the tilt angle) of each moving body is matched. Embodiments of other alignment movement are described as variations.

Figure 21:
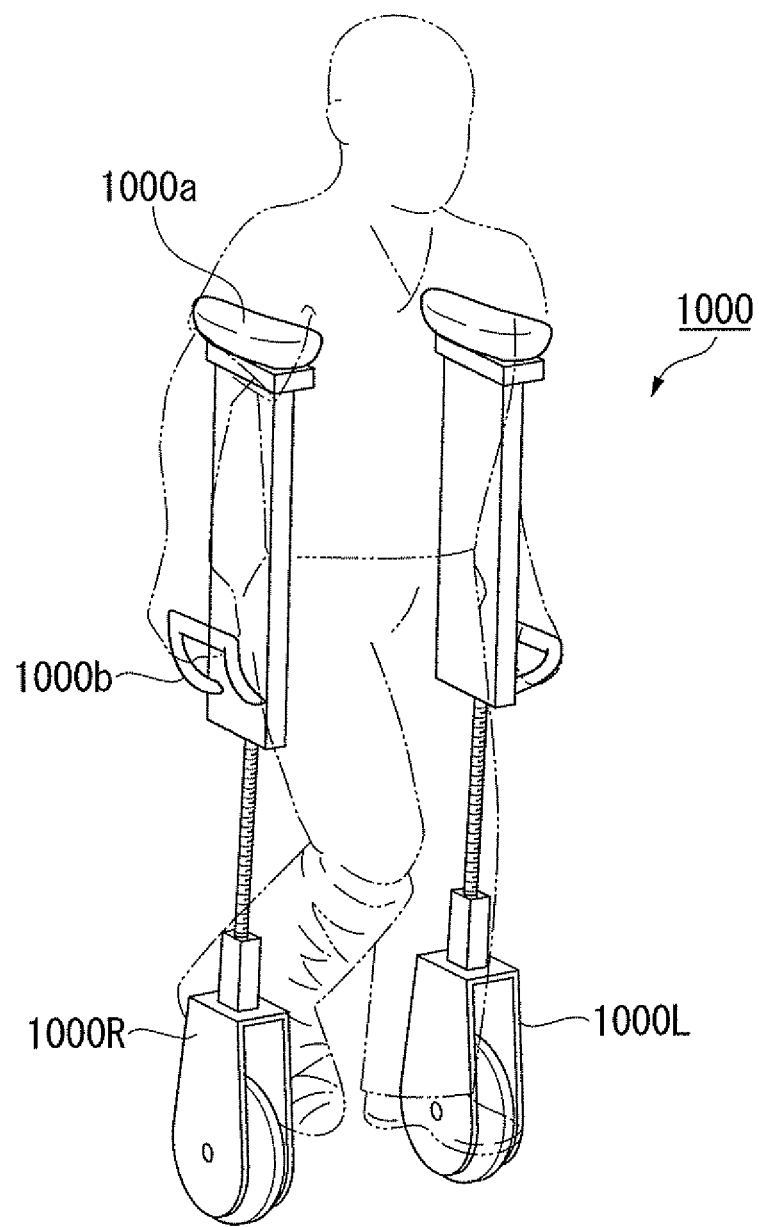
FIG. 21 is a diagram illustrating a way in which an inverted pendulum type moving according to an embodiment of the present invention is used as a walking assistance device.

FIG. 21 shows an embodiment in which an inverted pendulum type moving body according to the present invention is used as a walking assistance device 1000. In FIG. 21, the walking assistance device 1000 comprises two inverted pendulum type moving bodies 1000R and 1000L. Among these, the inverted pendulum type moving body 1000R corresponds to a crutch positioned at the right side of the user (i.e., the left side on paper). Meanwhile, the inverted pendulum type moving body 1000L corresponds to a crutch positioned at the left side of the user (i.e., the firth side on paper). Similar to the omnidirectional vehicle 1 described above as a technology on which the present invention is based, each of these inverted pendulum type moving bodies 1000R and 1000L is configured to move over a floor surface in a self standing state by executing a control of a center-of-gravity point movement based on the kinetics of an inverted pendulum model.

Except for the characteristics regarding the alignment movement, the inverted pendulum type moving bodies 1000R and 1000L are configured basically in the same manner as the omnidirectional vehicle 1 described above. However, since the inverted pendulum type moving bodies 1000R and 1000L are used as a walking assistance device, an armpit support member 1000a and a holding member 1000b shown in FIG. 21 are provided in place of, for example, the seat 3, the grips 17R and 17L, and the steps 25R and 25L. As described later, these two inverted pendulum type moving bodies 1000R, 1000L move in alignment with each other. As a result, the waking assistance device 1000 is used as a crutch, thereby assisting the walking movement of the user.

Incidentally, in the following, a description is provided regarding each component regarding particularly the inverted pendulum type moving body 1000R positioned at the right side of the user, among the inverted pendulum type moving bodies 1000R and 1000L. Unless specifically noted, each component represents the component of the inverted pendulum type moving body 1000R. Once the left-right concept is switched from one to the other, the inverted pendulum type moving body 1000L positioned at the left side of the user is configured in a same manner as the inverted pendulum type moving body 1000R.

Further, among the two inverted pendulum type moving bodies 1000R and 1000L, the inverted pendulum type moving body 1000R comprising the component specifically described in the present embodiment is referred to as a "self moving body 1000R." Meanwhile, the other inverted pendulum type moving body 1000L which moves in alignment with the inverted pendulum type moving body 1000R is referred to as "another moving body 1000L." From a standpoint of components for controlling an alignment movement, the term "self moving body" refers to a moving body which is to be controlled and which comprises the components. For example, from the standpoint of the posture control calculator 80 comprised in the inverted pendulum type moving body 1000R, a self moving body refers to the inverted pendulum type moving body 1000R. Meanwhile, from the standpoint of the posture control calculator 80 comprised in the inverted pendulum type moving body 1000L, a self moving body refers to the inverted pendulum type moving body 1000L. Further, the term "another moving body" refers to a moving body other than the self moving body which moves in alignment with the self moving body. The meaning of the terms "self moving body" and "another moving body" are also applicable to the claims defining the present invention.

Next, a configuration concerning an alignment movement is described with reference to the FIGS. 9 and 13 mentioned above.

In FIG. 9, the control unit 50 comprises components used in a processing regarding the alignment movement in a computational processing for controlling the vehicle. These components include a transmission unit 701 (information acquisition unit), an error calculator 702, 703, and 705, a distance sensor 704 (information acquisition unit), an external force sensor 706 (external force detection unit), a load sensor 707 (load detection unit), and a gain adjusting unit 708.

Here, the transmission unit 701 obtains from another moving body 1000L, information indicating the current state of another moving body 1000L (information acquisition unit). Here, the transmission unit 701 obtains information indicating the current posture of another moving body 1000L as the above information. In particular, the transmission unit 701 obtains the base tilt angle observed value θb_xy_s(L) with respect to the obtained perpendicular direction of another moving body 1000L and the base tilting angular velocity observed value θbdot_xy_s(L) as information on posture. Incidentally, the transmission unit 701 may be configured in many ways including a wireless configuration and a wired configuration as long as information from another moving body 1000L may be obtained.

Although not diagrammed in particular, the transmission unit 701 transmits a base tilt angle observed value θb_xy_s of the self moving body 1000R (hereinafter referred to as the base tilt angle observed value θb_xy_s(R)) and the base tilting angular velocity observed value θbdot_xy_s (hereinafter referred to as the base tilting angular velocity observed value θbdot_xy_s(R)) to another moving body 1000L as information showing a state (posture) of the self moving body 1000R. This information is used in a similar processing in another moving body 1000L.

The error calculator 702 computes a deviation (θb_xy_s(R)−θb_xy_s(L)) between the base tilt angle observed value θb_xy_s(R) of the self moving body 1000R and a base tilt angle observed value θb_xy_s(L) of another moving body 1000L. The error calculator 703 computes a deviation (θbdot_xy_s(R)−θbdot_xy_s(L)) between the base tilting angular velocity observed value θbdot_xy_s(R) of the self moving body 1000R and the base tilting angular velocity observed value θbdot_xy_s(L) of another moving body 1000L.

Figure 22A:
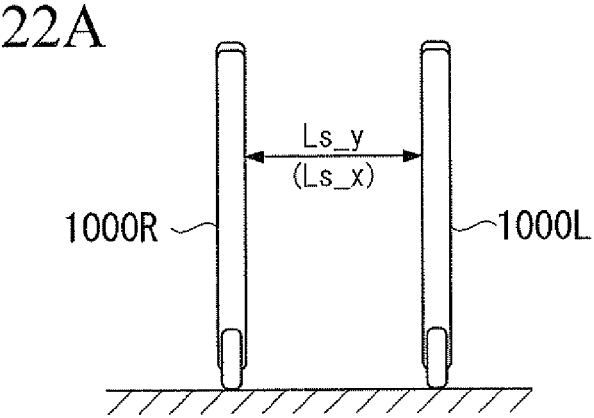
FIG. 22A is a diagram illustrating a variation of an embodiment of the present invention.
Figure 22B:
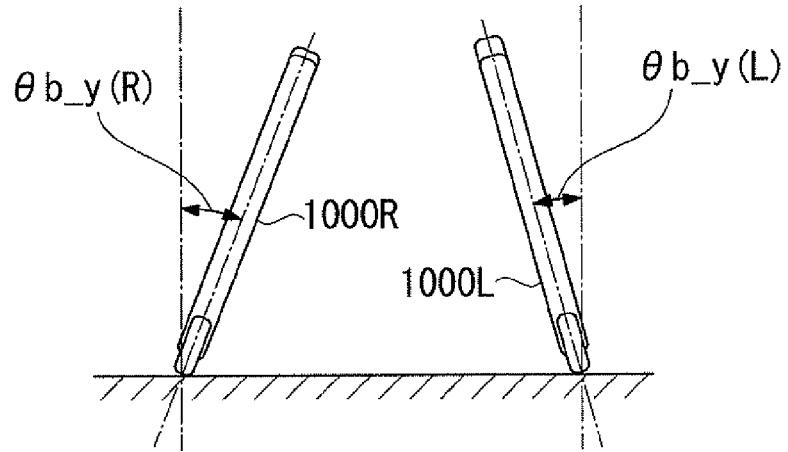
FIG. 22B is a diagram illustrating a variation of an embodiment of the present invention.
Figure 22C:
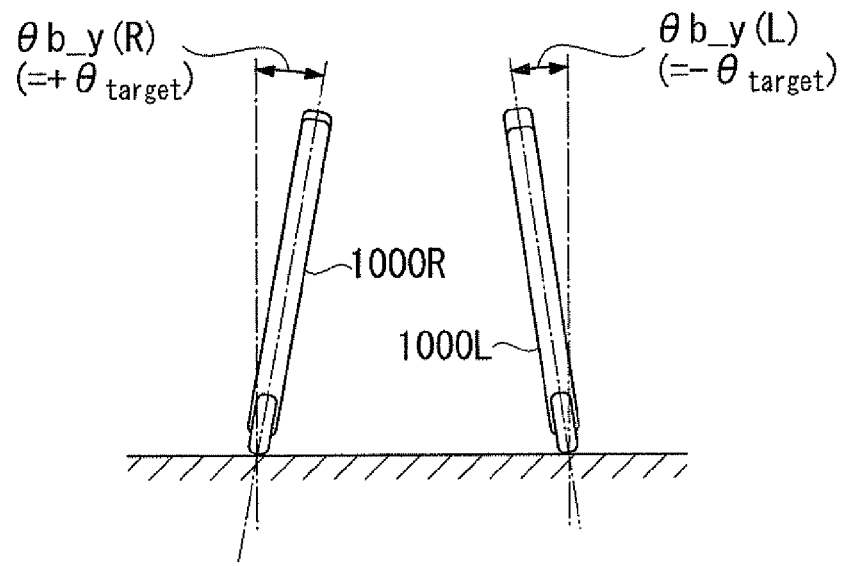
FIG. 22C is a diagram illustrating a variation of an embodiment of the present invention.

The distance sensor 704 (i.e., an information acquisition unit) obtains a position information indicating a position of another moving body 1000L with respect to the self moving body 1000R (or a position information indicating a position of the self moving body 1000R with respect to another moving body 1000L) as information indicating the current state of another moving body 1000L. As shown in FIG. 22A, the distance sensor 704 measures the distance Ls_xy between the self moving body 1000R and another moving body 1000L as the above position information. The error calculator 705 computes a deviation (Ls_xy−Ltarget_xy) between the distance Ls_xy measured by the distance sensor 704 and the predetermined target distance Ltarget_xy.

The target distance Ltarget_x may be set by the user. Further, the distance sensor 704 may be configured using known technology such as an infrared sensor and the like. Thus, the distance sensor 704 may be configured in various ways as long as the position of another moving body 1000L with respect to the self moving body 1000R may be obtained.

Incidentally, the distance sensor 704 and the error calculator 705 is necessary for an alignment movement in a first variation described later, in which the distance between moving bodies is maintained constant. The distance sensor 704 may be omitted in alignment movements which do not require the distance between moving bodies to be maintained constant.

The external force sensor 706 detects an external force Fhand acting on the base body 9 of the self moving body 1000R in a horizontal direction (external force detection unit). In other words, this external force sensor 706 detects the horizontal external force Fhand which is intentionally applied by the user to the holding member 1000b of the inverted pendulum type moving body 1000R. Since the user applied an external force Fhand to the holding member 1000b in the horizontal direction, the user may make instructions on the direction in which the inverted pendulum type moving body 1000R is to be moved, as described later.

The load sensor 707 detects the load Fweight acting on the base body 9 of the self moving body 1000R in the perpendicular direction (load detection unit). This load sensor 707 is provided on the armpit support member 1000a placed at the upper end of the inverted pendulum type moving body 1000R. Thus, the load sensor 707 detects the load Fweight in the perpendicular direction provided by the weight of a user applied from above to the armpit support member 1000a.

The gain adjusting unit 708 generates a gain adjustment parameter Kw_xy for a feedback of a movement control of the inverted pendulum type moving body 1000R. This gain adjustment parameter Kw_xy reduces the gain coefficient $K6\_xy$ shown in FIG. 13 described below, with respect to an increase in the load Fweight detected by the load sensor 707. The meaning of the gain coefficient $K6\_xy$ is described in detail later.

The posture control calculator 80 (movement control unit) receives the following outputs: the deviation (θb_xy_s(R)−θb_xy_s(L)) of the base tilt angle observed value computed by the error calculator 702, the deviation (θbdot_xy_s(R)−θbdot_xy_s(L)) between the base tilting angular velocity observed value computed by the error calculator 703, the deviation (Ls−Ltarget) of the distance computed by the error calculator 705, the value of the external force Fhand detected by the external force sensor 706, and the gain Kw_xy generated by the gain adjustor 708. These inputs are provided to the posture control calculator 80 as an input for controlling the alignment between the self moving body 1000R and another moving body 1000L.

The posture control calculator 80 is comprised in a movement control unit which controls the movement of the self moving body 1000R based on the above information. Further, the posture control calculator 80 controls the movement so that a state of the self moving body 1000R with respect to the current state of another moving body 1000L satisfies a predetermined condition. Here, the predetermined condition is set to achieve an alignment movement between the self moving body and another moving body. In particular, the predetermined condition is set by the fourth term or the seventh term of the right side of the equations 071x and 071y described later.

Next, a configuration of the posture control calculator 80 relating to an alignment motion is described with reference to FIG. 13.

As described in the explanation on the omnidirectional vehicle upon which the inverted pendulum type moving body according to the present embodiment is based, the posture control calculator 80 computes an imaginary wheel rotational angular acceleration commands ωwdot_x_cmd and ωwdot_y_cmd with respect to each input value. Here, a processing by the posture control calculator 80 with respect to the input values concerning the alignment movement is described. However, an explanation regarding the terms included in the equations 07x and 07y relating to the basic movement control of the omnidirectional vehicle is omitted.

The posture control calculator 80 uses the input values, and based on the following equations 071x and 071y computes the imaginary wheel rotational angular acceleration command ωwdot_xy_cmd, taking into consideration the input values relating to the alignment movement as an manipulated variable component of the feedback control.

$$\omega\text{wdot\_x\_cmd} = K1\_x \cdot \theta be\_x\_s + \\ K2\_x \cdot \theta bdot\_x\_s + K3\_x \cdot (Vb\_x\_s - Vb\_x\_mdfd) + \\ K4\_x \cdot (\theta b\_x\_s(R) - \theta b\_x\_s(L)) + \\ K5\_x \cdot (\theta bdot\_x\_s(R) - \theta bdot\_x\_s(L)) + \\ K6\_x \cdot Fhand\_x + K7\_x \cdot (Ls\_x - Ltarget\_x)$$ (equation 071x)

$$\omega\text{wdot\_y\_cmd} = K1\_y \cdot \theta be\_y\_s + \\ K2\_y \cdot \theta bdot\_y\_s + K3\_y \cdot (Vb\_y\_s - Vb\_y\_mdfd) + \\ K4\_y \cdot (\theta b\_y\_s(R) - \theta b\_y\_s(L)) + \\ K5\_y \cdot (\theta bdot\_y\_s(R) - \theta bdot\_y\_s(L)) + \\ K6\_y \cdot Fhand\_y + K7\_y \cdot (Ls\_y - Ltarget\_y)$$ (equation 071y)

According to the equations 071x and 071y, the first through third terms in the right side are the same as those in equations 07x and 07y described above. The fourth through seventh terms are newly added in equations 071x and 071y.

Here, the fourth term in the right side corresponds to the deviation ($\theta b\_xy\_s(R) - \theta b\_xy\_s(L)$) of the base tilt angle observed value. The fifth term in the right side corresponds to a deviation ($\theta bdot\_xy\_s(R) - \theta bdot\_xy\_s(L)$) of the base tilting angular velocity observed value. Since the movement of the inverted pendulum type moving body 1000R is controlled so that the fourth term and the fifth term of the right side converge to zero. As a result, the posture (tilt angle) of the self moving body 1000R and another moving body 1000L are matched.

Further, the sixth term in the right side corresponds to an external force Fhand_xy acting on the base body 9 through the holding member 1000b in a parallel direction. The feedback control is performed so as to converge this sixth term to zero. As a result, the self moving body 1000R moves in a direction in which the external force Fhand_xy applied to the base body 9 is reduced. In other words, the self moving body 1000R moves in a direction approximately matching the direction of the external force Fhand. Therefore, the user is able to give instructions on the direction in which the inverted pendulum type moving body 1000R moves by intentionally applying an external force Fhand_xy to the holding member 1000b in the horizontal direction.

The seventh term in the right side corresponds to a difference (Ls_xy−Ltarget_xy) in distance. The seventh term allows the distance between the self moving body 1000R and another moving body 1000L to remain constant. Since the movement of the inverted pendulum type moving body 1000R is controlled to converge this seventh term to zero, the distance Ls_xy between the self moving body 1000R and another moving body 1000L is maintained at the target distance Ltarget_xy.

According to the above feedback control the imaginary wheel rotational angular velocity command ωwdot_xy_cmd is determined so that all of the above first to seventh terms converge to zero. As a result, the self moving body 1000R moves in alignment with another moving body 1000L so that, according to the movement control of the self moving body 1000R, the distance between the self moving body 1000R and another moving body 1000L is maintained to be constant, and the tilt angle of the self moving body 1000R is matched with the tilt angle of another moving body 1000L. These characteristics apply to another moving body 1000L.

In this case, the gain coefficients K1__x, K2__x, K3__x, K4__x, and K5__x relating to each element of the manipulated variable in the equation 071x is set variably according to the gain adjustment parameter Kr_x. The gain coefficients K1__y, K2__y, K3__y, K4__y, and K5__y relating to each element of the manipulated variable in equation 071y are set variably according to the gain adjustment parameter Kr_y. In particular, similar to the gain coefficients K1__x, K2__x, and K3__x of the omnidirectional vehicle described above. The gain coefficients K4__x and K5__x are such that, when Kr_x=0, the following equations hold: K4__x=K4__a__x, K5__x=K5__a__x. When Kr_x=1, the following equations hold: K4__x=K4__b__x, K5__x=K5__b__x. Therefore, as Kr_x approaches "1" from "0," the i-th gain coefficient Ki_x (i=1, 2, 3, 4, 5) approaches Ki_b_x from Ki_a_x.

This characteristic also applies to the i-th gain coefficient Ki_y (i=1, 2, 3, 4, 5) used in the computation with respect to the equation 071y.

Further, the gain coefficient K6__xy is set variably according to the gain adjustment parameter Kw_xy. The gain coefficient K6__xy is controlled to indicate a tendency to decrease in response to an increase in the load Fweight. For example, when the load Fweight does not exist (i.e., when the user is not applying his or her weight to the armpit support member), K6__xy becomes equal to K6__a__xy. When the user applies his or her weight gradually to the armpit support member 1000a, the gain coefficient K6__xy decreases towards K6__b__xy in response to an increase in the load Fweight. In this way, by adjusting the gain coefficient K6__xy in the feedback control, under a condition in which the user has applied his or her weight to the armpit support member 1000a, the change in the displacement of the inverted pendulum type moving body 1000R with respect to a change in the external force Fhand (i.e., the change in the manipulated variable by the user) is restricted. Therefore, in this case, the behavior of the inverted pendulum type moving body 1000R becomes quiet. In this way, the operability as a walking assistance device may be enhanced.

The gain coefficient $K7\_xy$ is a constant which sets the responsiveness of a feedback control in order to maintain the distance between the self moving body 1000R and another moving body 1000L to be constant. In other words, when the gain coefficient $K7\_xy$ is increased, the responsiveness of the feedback control for maintaining the distance between the self moving body 1000R and another moving body 1000L constant is increased. On the other hand, when the gain coefficient $K7\_xy$ is decreased, the responsiveness is reduced. Therefore, although the gain coefficient $K7\_xy$ is appropriately set based on the above responsiveness, the gain coefficient $K7\_xy$ may be adjustable by the user.

According to the present embodiment, the feedback control of the movement of the self moving body 1000R is performed so that each term of the right side of the equations 071x and 071y are converged to "0." This indicates that a feedback control is performed so that a condition, set according to each term of the right side of the equations 071x and 071y, is satisfied. According to the present embodiment, the condition for the alignment movement (the predetermined condition) is expressed by a part of the terms in the right side of the equations 071x and 071y.

In other words, the right side of the equation 071x includes the following terms which set the condition for alignment movement: the fourth term ($K4\_x\cdot(\theta b\_x\_s(R)-\theta b\_x\_s(L))$), the fifth term ($K5\_x\cdot(\theta bdot\_x\_s(R)-\theta bdot\_x\_s(L))$), and the seventh term ($K7\_x\cdot(Ls\_x-Ltarget\_x)$). Among these terms, the fourth and fifth terms correspond to a condition for matching the posture of the self moving body 1000R to the posture of another moving body 1000L. The seventh term corresponds to a condition for keeping the distance between the self moving body 1000R and another moving body 1000L constant. These characteristics apply to equation 071y as well.

Incidentally, the seventh term in the right side in equations 071x and 071y has substantive meaning (i.e. relevance) in the first variation in which the distance between the moving bodies are kept constant. However, in this case, the distance between the moving bodies is considered not to be relevant to the alignment movement. Therefore, the seventh term in the right side of the equations 071x and 071y is unnecessary. Therefore, $K7\_xy$ is compulsorily set to zero. Thus, the seventh term in the right side of equations 071x and 071y is ignored.

The posture control calculator 80 performs a computation of the equation 071x using the gain coefficients $K1\_x$, $K2\_x$, and $K3\_x$ described above, as well as the gain coefficients $K4\_x$, $K5\_x$, $K6\_x$, and $K7\_x$ determined as described above and relating to the alignment movement. In this way, the posture control calculator 80 computes the imaginary wheel rotational angular acceleration command $\omega wdot\_x\_cmd$ relating to the imaginary wheel 62_$x$ rolling in the x axis direction in consideration of the alignment movement.

Here, a configuration regarding an alignment movement is described in further detail with reference to FIG. 13.

As shown in FIG. 13, the posture control calculator 80 comprises processors 80g-80j which are components relating to the alignment movement. Further, the posture control calculator 80 computes the manipulated variable components $u4\_x$, $u5\_x$, and $u6\_x$ respectively in the processors 80g, 80h, and 80i. The manipulated variable component $u4\_x$ is obtained by multiplying the fourth gain coefficient $K4\_x$ with the base tilt angle deviation observed value ($\theta b\_x\_s(R)-\theta be\_x\_s(L)$). The manipulated variable component $u5\_x$ is obtained by multiplying the base tilting angular velocity observed value ($\theta bdot\_x\_s(R)-\theta bdot\_x\_s(L)$) with the fifth gain coefficient $K5\_x$. The manipulated variable component $u6\_x$ is obtained by multiplying the sixth gain coefficient $K6\_x$ with the external force Fhand. Furthermore, the posture control calculator 80 computes the manipulated variable component $u7\_x$ at the processor 80j. The manipulated variable component $u7\_x$ is obtained by multiplying the gain coefficient $K7\_x$ with the deviation in distance (Ls-Ltarget). Further, the posture control calculator 80 computes the imaginary wheel rotational angular acceleration command $\omega wdot\_x\_cmd$ by adding up the basic manipulated variable components $u1\_x$, $u2\_x$, and $u3\_x$ relating to the movement control described above, and the manipulated variable components $u4\_x$, $u5\_x$, $u6\_x$, and $u7\_x$ relating to the alignment movement at the calculator 80e.

Similarly, the posture control calculator 80 performs the computation of the equation 071y by using the gain coefficients $K1\_y$, $K2\_y$, and $K3\_y$ described above, and the gain coefficients $K4\_y$, $K5\_y$, $K6\_y$, and $K7\_y$ relating to the alignment movement determined as described above. In this way, the posture control calculator 80 computes the imaginary wheel rotational angular acceleration command $\omega wdot\_y\_cmd$ concerning the imaginary wheel 62_$y$ rolling in the y axis direction, taking into consideration the alignment movement.

As described above, the posture control calculator 80 computes the imaginary wheel rotational velocity commands $\omega w\_x\_cmd$ and $\omega w\_y\_cmd$ by first computing the imaginary wheel rotational angular acceleration commands $\omega wdot\_x\_cmd$ and $\omega wdot\_y\_cmd$, taking into consideration the alignment movement, then integrating $\omega wdot\_x\_cmd$ and $\omega wdot\_y\_cmd$ by the integrator 80f.

Above is a detailed description of the processing by the posture control calculator 80 relating to the alignment movement.

Next, a movement of an inverted pendulum type moving body 1000R and 1000L according to the present embodiment used as a walking assistance device is described.

As shown in FIG. 21, in a standing posture, a user with a wounded right leg places the inverted pendulum type moving body 1000R to the right side, places the inverted pendulum type moving body 1000L to the left side, and holds the holding member 1000b so that the armpit supporting member 1000a contacts his or her armpit. Further, the user gradually applies his or her weight to the armpit support member 1000a, so that his or her weight is supported by the inverted pendulum type moving bodies 1000R and 1000L.

From this static condition, when the user kicks the floor with his or her uninjured leg, this left leg receives a reactive force from the floor. As a result, a pair of inverted pendulum type moving bodies 1000R, 1000L accelerates forward (a velocity following mode), and starts moving. Further, the velocity is maintained constant for a certain period of time (velocity hold mode), and thereafter, a deceleration occurs gradually (braking mode). Therefore, depending on need, if the user kicks the floor surface again, the movement starts again in a similar manner.

Here, the inverted pendulum type moving bodies 1000R, 1000L exchanges information regarding each other's postures during the process of controlling the movement. Thus, by executing the procedure relating to the alignment movement, the inverted pendulum type moving bodies 1000R, 1000L move in alignment with each other so as to match each other's postures (tilt angles). In this case, the two inverted pendulum type moving bodies 1000R, 1000L are maintained to be parallel to each other. Therefore, the two inverted pendulum type moving bodies 1000R, 1000L operates to the user as a walking assistance device in a similar way as a pair of crutches. In this way, the inverted pendulum type moving bodies 1000R, 1000L assists the walking movement of the user.

Incidentally, as described above regarding the omnidirectional vehicle, the user may operate the base body 9 so as to tilt the base body 9 from the basic posture, thereby starting the movement of the inverted pendulum type moving bodies 1000R, 1000L or halting the movement.

[First Variation]

In the embodiment described above, a condition of the alignment movement is to match the postures (tilt angles) of the self moving body 1000R and another moving body 1000L. Meanwhile, in this first variation, a condition of the alignment movement is to keep the distance Ls_xy between the self moving body 1000 and another moving body 1000R at a certain target distance Ltarget_xy, as shown in FIG. 22A. The condition for this alignment movement is given by the seventh term of the equations 071x and 071y.

In the embodiment described above, for ease of explanation, the seventh term of the right equation was set to "0," and this seventh term was ignored. However, according to the first variation, the gain coefficient K7_xy in the seventh term of the right side of the equations 071x and 071y is set to an appropriate constant other than "0," taking into consideration the responsiveness of the feedback control.

Incidentally, considering that the inverted pendulum type moving bodies 1000R, 1000L are used as a walking assistance device, it is preferable that the target distance Ltarget_y in the y axis direction be set to an appropriate value according to the physical type of the user. It is also preferable that the target distance Ltarget_x in the x axis direction be set to "0."

When the equations 071x and 071y are set in this way, the self moving body 1000R engages in an alignment movement so that the postures (i.e., tilt angles) are matched, and the distance L_xy between the self moving body 1000R and another moving body 1000L is maintained at a certain target value Ltarget_xy. In other words, the posture control calculator 80 executes a feedback control so that the distance Ls_xy obtained by the distance sensor 704 converges to a target value Ltarget_xy, which is given as a condition for alignment movement (i.e., so that the seventh term of the right side of equations 071x, 071y converges to "0"). As a result, the condition for alignment movement is satisfied. In addition, the distance Ls_xy between the self moving body 1000R and another moving body 1000L is maintained at a predetermined target distance Ltarget_xy.

According to this first variation, the distance between the self moving body 1000R and another moving body 1000L is maintained to be constant. Therefore, the user need not be burdened with carrying out an operation to correct the distance between the self moving body 1000R and another moving body 1000L. In this way, it is possible to enhance the operability and convenience of the inverted pendulum type moving body as a walking assistance device.

Further, according to the first variation, considering that the inverted pendulum type moving body is used as a walking assistance device, the distance in each of the x axis direction and the y axis direction is maintained to be a target value. However, a configuration is also possible in which another moving body 1000L is placed within a predetermined range, with the self moving body 1000R being the center.

[Second Variation]

In the above embodiment, the posture (tilt angle) of a self moving body 1000R was matched with the posture (tilt angle) of another moving body 1000L (i.e., the postures of the moving bodies were matched with one another). However, in the second variation, the condition for alignment movement is established so that the postures of each moving body are set. In particular, the condition for alignment movement is established so that, as indicated in FIG. 21B, the difference in the tilt angle (θb_y_s(R)−θb_y_s(L)) around the x axis of the moving space is set to be a predetermined value. In this case, the equation 071y is rewritten as equation 072y below. In this case, the only the difference between the tilt angles around the x axis is maintained at a predetermined value. The instance around the y axis is configured in a similar manner as the above embodiment.

$$\omega\text{wdot\_y\_cmd} = K1\_y \cdot \theta\text{be\_y\_s} + \\ K2\_y \cdot \theta\text{bdot\_y\_s} + K3\_y \cdot (Vb\_y\_s - Vb\_y\_mdfd) + \\ K4\_y \cdot (\theta b\_y\_s(R) - \theta b\_y\_s(L) - \theta c\_y) + \\ K5\_y \cdot (\theta\text{bdot\_y\_s}(R) - \theta\text{bdot\_y\_s}(L)) + \\ K6\_y \cdot \text{Fhand\_y} + K7\_y \cdot (Ls\_y - \text{Ltarget\_y})$$

(equation 072y)

Here, the difference between the equation 071y and the equation 072y is that the constant "−θc_y" is added within the parenthesis of the fourth term of the right side relating to the deviation in the tilt angle. This constant "−θc_y" is a predetermined value corresponding to a deviation in the tilt angle of the two inverted pendulum type moving bodies 1000R and 1000L around the x axis.

When the equation 072y including the constant "−θc_y" is set in this way, the movement of the inverted pendulum type moving body 1000R is controlled so that the fourth term converges to zero. As a result, the difference (θb_y_s(R)−θb_y_s(L)) between the tilt angle of the self moving body 1000R and another moving body 1000L matches with the predetermined value "θc_y." Therefore, the two inverted pendulum type moving bodies 1000R and 1000L are moved in alignment with each other so that the difference between the tilt angles of the two inverted pendulum type moving bodies 1000R and 1000L around the x axis are maintained to be equal to the predetermined value "θc_y."

Incidentally, when the difference between the tilt angles in the y axis direction is maintained at a predetermined value, a constant "−θc_x" corresponding to a predetermined value is added to the fourth term of the equation 071y.

According to the second variation, the difference between the tilt angle of the self moving body 1000R and the tilt angle of another moving body 1000L is maintained to be equal to a predetermined value. Therefore, it is possible to maintain the self moving body 1000R and another moving body 1000L in positions so that the moving bodies are tilting in directions that are different from one another. Therefore, for example, the distance between the lower end sides of a pair of inverted pendulum type moving bodies may be maintained to be wider than the distance between the upper end sides. In this way, it is possible to enhance the stability of the walking assistance device.

[Third Variation]

According to the third variation, the condition of the alignment movement is established so that the posture of each moving body is set. This aspect is similar to the second variation. However, in the third variation, the posture of each moving body is set individually. In particular, as a condition for the alignment movement, as shown in FIG. 21C, a setting is made so that the tilt angle θb_y_s(R) of the self moving body 1000R is maintained to be equal to a predetermined target tilt angle "+θtarget." Further, the tilt angle θb_y_s(L) of another moving body 1000L is set to be maintained at a predetermined target tilt angle "−θtarget." In this case, the equation 071y regarding the self moving body 1000R is rewritten as indicated in the following equation 073y(R). The equation 071y regarding another moving body 1000L is rewritten as the following equation 073(L). Incidentally, for ease of explanation, only the tilt angle around the x axis is maintained at the target tilt angle. The instance around the y axis is configured in a similar manner as the above embodiment.

$$\omega\text{wdot\_y\_cmd} = K1\_y \cdot \theta\text{be\_y\_s} + K2\_y \cdot \theta\text{bdot\_y\_s} + \\ K3\_y \cdot (Vb\_y\_s - Vb\_y\_mdfd) + \\ K4\_y \cdot (\theta b\_y\_s(R) - \theta\text{target}) + \\ K5\_y \cdot (\theta\text{bdot\_y\_s}(R) - \theta\text{bdot\_y\_s}(L)) + \\ K6\_y \cdot \text{Fhand\_y} + K7\_y \cdot (Ls\_y - L\text{target\_y})$$ (equation 073y(R))

$$\omega\text{wdot\_y\_cmd} = K1\_y \cdot \theta\text{be\_y\_s} + K2\_y \cdot \theta\text{bdot\_y\_s} + \\ K3\_y \cdot (Vb\_y\_s - Vb\_y\_mdfd) + \\ K4\_y \cdot (\theta b\_y\_s(L) - \theta\text{target}) + \\ K5\_y \cdot (\theta\text{bdot\_y\_s}(R) - \theta\text{bdot\_y\_s}(L)) + \\ K6\_y \cdot \text{Fhand\_y} + K7\_y \cdot (Ls\_y - L\text{target\_y})$$ (equation 073y(L))

Here, the difference between the equation 071y and the equation 073y (R) is the fourth term in the right side. This is true regarding the difference between the equation 071y and the equation 073y(L). According to the equation 073y(R), a feedback control is performed so that the fourth term is converged to zero. As a result, the tilt angle (θb_y_s(R)) of the self moving body 1000R matches the target tilt angle "θtarget." On the other hand, according to the equation 074y(L), a feedback control is performed so as to converge the fourth term to zero. As a result, the tilt angle (θb_y_s(L)) of another moving body 1000L matches the target tilt angle "−θtarget." Therefore, the two inverted pendulum type moving bodies 1000R and 1000L are moved in alignment so that each tilt angle of the two inverted pendulum type moving bodies 1000R and 1000L around the x axis is maintained to be equal to the target tilt angle.

According to the third variation, each tilt angle of the two inverted pendulum type moving bodies 1000R and 1000L around the x axis is maintained to be equal to the target tilt angle. Therefore, the user need not be burdened with carrying out an operation to correct the tilt angle of the two self moving bodies 1000R and 1000L. In this way, it is possible to enhance the operability and stability of the inverted pendulum type moving body as a walking assistance device.

Incidentally, the first variation and the third variation may be combined. In this case, the distance between the self moving body 1000R and another moving body 1000L is maintained to be constant. At the same time, the tilt angle of each moving body is maintained to be constant. Therefore, the stability as a walking assistance device may be further enhanced.

In this way, an embodiment and variations of the present invention have been described. It should be understood that these are exemplary of the invention and are not to be considered as limiting the present invention. Additions, omissions, substitutions, and other modifications can be made without departing from the scope of the present invention. For example, in the above embodiment, a six-axis sensor may be employed as the load sensor 704. In this way, by analyzing each component of the six-axis sensor, the load Fweight due to the body weight applied to the armpit support member 1000a and the external force Fhand applied to the holding member 1000b may be both estimated. Therefore, the external force sensor 706 may be omitted, thereby simplifying the configuration.

Further, in the above embodiment, the self moving body 1000R and another moving body 1000L are moved in alignment with each other. However, another moving body may be moved so as to depend on the movement of a moving body. Describing this example even further, in FIG. 21, a certain distance may be maintained between the two moving inverted pendulum type moving bodies 1000R and 1000L, while another inverted pendulum type moving body (not diagrammed) depends on their movements. The two inverted pendulum type moving bodies 1000R and 1000L do not move in alignment with respect to this other inverted pendulum type moving body (not diagrammed). In this example, regarding the inverted pendulum type moving body depending on the inverted pendulum type moving bodies 1000R and 1000L, it is necessary to specify the direction of the dependent movement. However, when, for example, the preceding inverted pendulum type moving body 1000R comprises a device emitting a signal with a particular frequency, it is possible to discern the direction in which the subsequent inverted pendulum type moving body should follow, based on the direction from which the signal is received. In this way, a following movement with respect to the inverted pendulum type moving body 1000R is possible.

What is claimed is:

1. An inverted pendulum type moving body system, comprising:
    a self moving body member and an another moving body member, each operable to move over a floor surface in a self standing manner;
    an information acquisition unit for obtaining a state information indicating a current state of the another moving body member including at least a posture information indicating a posture of the another moving body member, said information acquisition unit being operatively attached to one of the self moving body member and the another moving body member; and
    a movement control unit for controlling a movement of the self moving body member, based on the state information, so that a state of the self moving body member with respect to the current state of the another moving body member satisfies a predetermined condition established so that the self moving body member and the another moving body member move in alignment, said movement control unit being operatively attached to one of the self moving body member and the another moving body member;
    wherein said another moving body member is different from the self moving body member.

2. An inverted pendulum type moving body moving over a floor surface in a self standing manner, the inverted pendulum type moving body comprising:
    an information acquisition unit obtaining a state information indicating a current state of an another moving body;
    a movement control unit controlling a movement of a self moving body, based on the state information, so that a state of the self moving body with respect to the current state of the another moving body satisfies a predetermined condition established so that the self moving body and the another moving body moves in alignment; and an external force detection unit detecting an external force in a horizontal direction acting on a base body of the self moving body, wherein the movement control unit executes a feedback control of the self moving body so that the self moving body moves in a direction so as to reduce the external force detected by the external force detection unit.

3. The inverted pendulum type moving body according to claim 2 further comprising:

a load detection unit detecting a load in a perpendicular direction acting on a body of the self moving body, wherein the movement control unit reduces the gain coefficient of the feedback control with respect to an increase in a load detected by the load detection unit.

4. The inverted pendulum type moving body according to claim 2, wherein the information acquisition unit obtains, as the state information, a position information representing a distance between the self moving body and the another moving body; and the movement control unit controls a movement of the self moving body so that the distance between the self moving body and the another moving body converges to a predetermined target value provided as the predetermined condition.

5. An inverted pendulum type moving body moving over a floor surface in a self standing manner, the inverted pendulum type moving body comprising:

an information acquisition unit obtaining a state information indicating a current state of an another moving body; and a movement control unit controlling a movement of a self moving body, based on the state information, so that a state of the self moving body with respect to the current state of the another moving body satisfies a predetermined condition established so that the self moving body and the another moving body moves in alignment; wherein the information acquisition unit obtains, as the state information, a posture information indicating a posture of the another moving body; and the movement control unit controls a movement of the self moving body so that a posture of the self moving body and a posture of the another moving body are maintained at a posture provided as the predetermined condition.

6. The inverted pendulum type moving body according to claim 5, wherein the predetermined condition is established so that a tilt angle of the self moving body and a tilt angle of the another moving body are equal.

7. The inverted pendulum type moving body according to claim 5, wherein the predetermined condition is established so that a difference between a tilt angle of the self moving body and a tilt angle of the another moving body are equal to a predetermined value.

8. The inverted pendulum type moving body according to claim 5, wherein the predetermined condition is established so that a tilt angle of the self moving body is equal to a predetermined value.

* * * * *